(12) United States Patent
Shimmo et al.

(10) Patent No.: US 10,795,066 B2
(45) Date of Patent: Oct. 6, 2020

(54) INFRARED-CUT FILTER AND IMAGING OPTICAL SYSTEM

(71) Applicant: Nippon Sheet Glass Company, Limited, Tokyo (JP)

(72) Inventors: Katsuhide Shimmo, Kanagawa (JP); Yuichiro Kubo, Tokyo (JP); Lei Cai, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 114 days.

(21) Appl. No.: 16/311,096

(22) PCT Filed: Jun. 26, 2017

(86) PCT No.: PCT/JP2017/023451
§ 371 (c)(1),
(2) Date: Dec. 18, 2018

(87) PCT Pub. No.: WO2018/003756
PCT Pub. Date: Jan. 4, 2018

(65) Prior Publication Data
US 2019/0219749 A1    Jul. 18, 2019

(30) Foreign Application Priority Data

Jun. 30, 2016   (JP) ................... 2016-129878

(51) Int. Cl.
*F21V 9/04*      (2018.01)
*F21V 9/06*      (2018.01)
(Continued)

(52) U.S. Cl.
CPC ............... *G02B 5/208* (2013.01); *B32B 7/02* (2013.01); *G02B 5/26* (2013.01); *G02B 5/28* (2013.01); *G02B 5/282* (2013.01)

(58) Field of Classification Search
CPC ........ G02B 5/208; G02B 5/282; G02B 5/089; G02B 5/26; G02B 5/281; G02B 5/0816;
(Continued)

(56) References Cited

U.S. PATENT DOCUMENTS

2005/0068433 A1    3/2005   Aotsuka
2008/0197773 A1*   8/2008   Cha ...................... H05K 9/0096
                                                                   313/582
(Continued)

FOREIGN PATENT DOCUMENTS

JP      2005109196 A      4/2005
JP      2011100084 A      5/2011
(Continued)

OTHER PUBLICATIONS

International Search Report issued for International Patent Application No. PCT/JP2017/023451, dated Sep. 19, 2017, 5 pages including English translation.

*Primary Examiner* — William R Alexander
*Assistant Examiner* — Tamara Y. Washington
(74) *Attorney, Agent, or Firm* — Hamre, Schumann, Mueller & Larson, P.C.

(57) ABSTRACT

An infrared-cut filter (1*a*) includes a near-infrared reflecting film (20) and an absorbing film (30). The near-infrared reflecting film (20) and the absorbing film (30) have the following features (A) to (E); (A) 700 nm$\leq \lambda^H_R$ (0°, 70%)$<\lambda^H_R$ (0°, 20%)$\leq$770 nm; (B) 650 nm$\leq \lambda^H_R$ (40°, 70%)$<\lambda^H_R$ (40°, 20%)$\leq$720 nm; (C) $\lambda^H_A$ (40°, 20%)$<\lambda^H_R$ (40°, 20%); (D) the spectral transmittance of light incident on the absorbing film (30) is 15% or less at $\lambda^H_R$ (0°, 20%) and $\lambda^H_R$ (40°, 20%); and (E) an average of the spectral transmittance of light incident on the near-infrared reflecting film (20) and an average of the spectral transmittance of light
(Continued)

incident on the absorbing film (30) are 75% or more in the wavelength range of 450 to 600 nm.

10 Claims, 27 Drawing Sheets

(51) Int. Cl.
  *G02B 5/08* (2006.01)
  *G02B 5/20* (2006.01)
  *G02B 5/26* (2006.01)
  *G02B 5/28* (2006.01)
  *B32B 7/02* (2019.01)

(58) Field of Classification Search
  CPC ........ G02B 5/0808; G02B 5/085; G02B 5/28; G02B 1/11; G02B 1/04; G02B 1/14; B82Y 10/00; C03C 17/3639; C03C 17/3652; C03C 17/366; G03F 7/70958; G03F 7/7015; G03F 1/24; G03F 1/60; G21K 1/062; G21K 1/06; G21K 1/067; G21K 2201/061
  USPC .......................................................... 359/359
  See application file for complete search history.

(56) References Cited

U.S. PATENT DOCUMENTS

| | | | |
|---|---|---|---|
| 2008/0241508 A1* | 10/2008 | Kuwabara | G02B 5/02 428/323 |
| 2014/0063597 A1 | 3/2014 | Shimmo et al. | |
| 2014/0300956 A1 | 10/2014 | Kubo et al. | |
| 2015/0293284 A1 | 10/2015 | Tatemura | |
| 2016/0141156 A1* | 5/2016 | Watanabe | B32B 38/0008 204/192.27 |
| 2016/0145736 A1* | 5/2016 | Watanabe | G02B 5/282 204/192.27 |
| 2016/0195651 A1 | 7/2016 | Yoshioka et al. | |
| 2017/0219750 A1* | 8/2017 | Nakanishi | B32B 15/04 |
| 2017/0227694 A1* | 8/2017 | Nakanishi | B32B 15/01 |
| 2017/0343710 A1 | 11/2017 | Shiono et al. | |
| 2018/0017721 A1 | 1/2018 | Nagaya et al. | |

FOREIGN PATENT DOCUMENTS

| | | |
|---|---|---|
| JP | 2014052482 A | 3/2014 |
| JP | 2014203044 A | 10/2014 |
| JP | 2016090781 A | 5/2016 |
| JP | 2017072748 A | 4/2017 |
| WO | 2013042738 A1 | 3/2013 |
| WO | 2014104370 A1 | 7/2014 |
| WO | 2015099060 A1 | 7/2015 |
| WO | 2017018419 A1 | 2/2017 |
| WO | 2017094858 A1 | 6/2017 |

* cited by examiner

INFRARED-CUT FILTER AND IMAGING OPTICAL SYSTEM

TECHNICAL FIELD

The present invention relates to an infrared-cut filter and an imaging optical system.

BACKGROUND ART

In imaging apparatuses such as digital cameras, silicon (Si)-based two-dimensional image sensors such as a charge coupled device (CCD) and a complementary metal oxide semiconductor (CMOS) are used as imaging sensors. Such a Si-based imaging sensor is sensitive to light of wavelengths in the infrared region and has wavelength characteristics incompatible with the visual sensitivity of humans. In imaging apparatuses, therefore, a filter (infrared-cut filter) for shielding against incident light of wavelengths in the infrared region is typically disposed ahead of an imaging sensor so that an image to be obtained comes closer to an image as perceived by humans.

For example, an infrared-cut filter in which a film capable of reflecting infrared light is laminated on a transparent substrate is known. Such an infrared-cut filter can be endowed with a variety of spectral characteristics such as the ability to reflect not only infrared light but also ultraviolet light by adjusting the material and thickness of the film capable of reflecting infrared light. However, with such an infrared-cut filter, the transmittance spectrum is shifted to the shorter wavelength side when light is incident on the infrared-cut filter at a large incident angle. This may cause a difference in hue between the central portion and peripheral portion of the image obtained using the infrared-cut filter. Various proposals have therefore been made to reduce the incident angle dependence of the transmittance spectrum.

For example, Patent Literature 1 describes a near-infrared-cut filter including: a transparent resin substrate containing a particular absorber; and a near-infrared reflecting film. The absorber has the feature that an absorption peak is in the wavelength range of 600 to 800 nm and that the absolute value of the difference between a wavelength (Aa) and a wavelength (Ab) is less than 75 nm, where the wavelength (Aa) is a wavelength which is equal to or shorter than the absorption peak wavelength and which, in the wavelength range of 430 to 800 nm, is the longest among wavelengths at which the transmittance is 70%, and the wavelength (Ab) is a wavelength which, in the wavelength range of 580 nm or more, is the shortest among wavelengths at which the transmittance is 30%. The near-infrared reflecting film is, for example, a deposited aluminum film, a thin noble metal film, a resin film in which fine metal oxide particles containing indium oxide as a main component and containing a small amount of tin oxide are dispersed, or a multilayer dielectric film composed of high refractive index material layers and low refractive index material layers that are alternately arranged.

The near-infrared-cut filter of Patent Literature 1 has the feature that the absolute value of the difference between Ya and Yb is less than 15 nm. Ya denotes a wavelength which is in the wavelength range of 560 to 800 nm and at which the light transmittance of the near-infrared-cut filter is 50% as measured in a direction perpendicular to the near-infrared-cut filter. Yb denotes a wavelength which is in the wavelength range of 560 to 800 nm and at which the light transmittance of the near-infrared-cut filter is 50% as measured at an angle of 30° with respect to the direction perpendicular to the near-infrared-cut filter.

CITATION LIST

Patent Literature

Patent Literature 1: JP 2011-100084 A

SUMMARY OF INVENTION

Technical Problem

In the near-infrared-cut filter described in Patent Literature 1, the absolute value of the difference between Ya and Yb is less than 15 nm as described above. However, Patent Literature 1 fails to specifically discuss any feature concerning the transmittance of light incident on the near-infrared-cut filter at an incident angle more than 30°. In recent years, imaging lenses have come to have a wide angle of view, which has created a demand for achieving a high level of image quality even when light is incident on an infrared-cut filter at an incident angle more than 30°. Accordingly, a technique is desired which can limit the change in transmittance in a particular wavelength range (from 600 to 700 nm, for example) even when light is incident on an infrared-cut filter at a larger incident angle (40°, for example).

Under such circumstances, the present invention provides an infrared-cut filter that includes a near-infrared reflecting film and that shows only a sufficiently small change in transmittance spectrum in a particular wavelength range (from 600 to 700 nm, for example) when the incident angle of light varies from 0° to 40°.

Solution to Problem

The present invention provides an infrared-cut filter including:

a near-infrared reflecting film; and an absorbing film lying parallel to the near-infrared reflecting film, wherein the near-infrared reflecting film and the absorbing film have the following features (A) to (E):

(A) when a wavelength which is in the wavelength range of 600 to 800 nm and at which spectral transmittance of light perpendicularly incident on the near-infrared reflecting film is 70% is defined as a wavelength $\lambda^H_R$ (0°, 70%) and a wavelength which is in the wavelength range of 600 to 800 nm and at which the spectral transmittance of light perpendicularly incident on the near-infrared reflecting film is 20% is defined as a wavelength $\lambda^H_R$ (0°, 20%), the spectral transmittance of light perpendicularly incident on the near-infrared reflecting film monotonically decreases in the range from the wavelength $\lambda^H_R$ (0°, 70%) to the wavelength $\lambda^H_R$ (0°, 20%) in such a manner that the wavelength $\lambda^H_R$ (0°, 70%) is 700 nm or longer and the wavelength $\lambda^H_R$ (0°, 20%) is 770 nm or shorter and is longer than the wavelength $\lambda^H_R$ (0°, 70%);

(B) when a wavelength which is in the wavelength range of 600 to 800 nm and at which spectral transmittance of light incident on the near-infrared reflecting film at an incident angle of 40° is 70% is defined as a wavelength $\lambda^H_R$ (40°, 70%) and a wavelength which is in the wavelength range of 600 to 800 nm and at which the spectral transmittance of light incident on the near-infrared reflecting film at an incident angle of 40° is 20% is defined as a wavelength $\lambda^H_R$ (40°, 20%), the spectral transmittance of light incident on the near-infrared reflecting film at an incident angle of 40° monotonically decreases in the range from the wavelength $\lambda^H_R$ (40°, 70%) to the wavelength $\lambda^H_R$ (40°, 20%) in such a manner that the wavelength $\lambda^H_R$ (40°, 70%) is 650 nm or longer and the wavelength $\lambda^H_R$ (40°, 20%) is 720 nm or shorter and is longer than the wavelength $\lambda^H_R$ (40°, 70%);

(C) spectral transmittance of light incident on the absorbing film at an incident angle of 40° is 20% at a wavelength $\lambda^H_A$ (40°, 20%) which is in the wavelength range of 600 to 800 nm and which is shorter than the wavelength $\lambda^H_R$ (40°, 20%);

(D) spectral transmittance of light perpendicularly incident on the absorbing film is 15% or less at the wavelength $\lambda^H_R$ (0°, 20%), and the spectral transmittance of light incident on the absorbing film at an incident angle of 40° is 15% or less at the wavelength $\lambda^H_R$ (40°, 20%); and (E) an average of the spectral transmittance of light perpendicularly incident on the near-infrared reflecting film and an average of the spectral transmittance of light incident on the near-infrared reflecting film at an incident angle of 40° are 75% or more in the wavelength range of 450 to 600 nm, and an average of the spectral transmittance of light perpendicularly incident on the absorbing film and an average of the spectral transmittance of light incident on the absorbing film at an incident angle of 40° are 75% or more in the wavelength range of 450 to 600 nm.

The present invention also provides an imaging optical system including the above infrared-cut filter.

Advantageous Effects of Invention

The above infrared-cut filter includes a near-infrared reflecting film and shows only a sufficiently small change in transmittance spectrum in a particular wavelength range (600 to 700 nm, for example) when the incident angle of light varies from 0° to 40°.

DESCRIPTION OF EMBODIMENTS

Hereinafter, embodiments of the present invention will be described with reference to the drawings. The following description relates to examples of the present invention, and the present invention is not limited to the examples.

Figure 1:
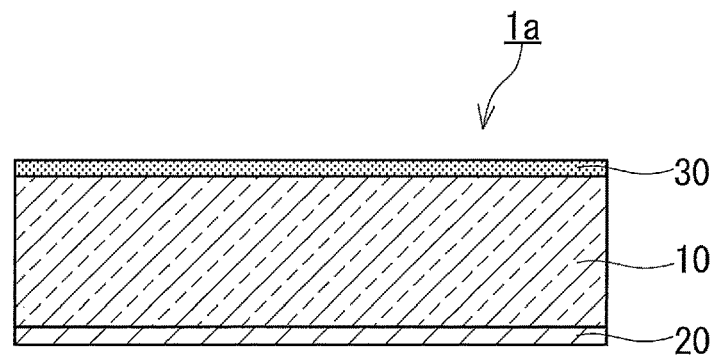
FIG. 1 is a cross-sectional view of an infrared-cut filter according to an embodiment of the present invention.

As shown in FIG. 1, an infrared-cut filter 1a includes a near-infrared reflecting film 20 and an absorbing film 30. The absorbing film 30 lies parallel to the near-infrared reflecting film 20. The near-infrared reflecting film 20 and the absorbing film 30 have the following features (A) to (E).

(A) When a wavelength which is in the wavelength range of 600 to 800 nm and at which spectral transmittance of light perpendicularly incident on the near-infrared reflecting film 20 is 70% is defined as a wavelength $\lambda^H_R$ (0°, 70%) and a wavelength which is in the wavelength range of 600 to 800 nm and at which the spectral transmittance of light perpendicularly incident on the near-infrared reflecting film 20 is 20% is defined as a wavelength $\lambda^H_R$ (0°, 20%), the spectral transmittance of light perpendicularly incident on the near-infrared reflecting film 20 monotonically decreases in the range from the wavelength $\lambda^H_R$ (0°, 70%) to the wavelength $\lambda^H_R$ (0°, 20%) in such a manner that the wavelength $\lambda^H_R$ (0°, 70%) is 700 nm or longer and the wavelength $\lambda^H_R$ (0°, 20%) is 770 nm or shorter and is longer than the wavelength $\lambda^H_R$ (0°, 70%).

(B) When a wavelength which is in the wavelength range of 600 to 800 nm and at which spectral transmittance of light incident on the near-infrared reflecting film 20 at an incident angle of 40° is 70% is defined as a wavelength $\lambda^H_R$ (40°, 70%) and a wavelength which is in the wavelength range of 600 to 800 nm and at which the spectral transmittance of light incident on the near-infrared reflecting film 20 at an incident angle of 40° is 20% is defined as a wavelength $\lambda^H_R$ (40°, 20%), the spectral transmittance of light incident on the near-infrared reflecting film 20 at an incident angle of 40° monotonically decreases in the range from the wavelength $\lambda^H_R$ (40°, 70%) to the wavelength $\lambda^H_R$ (40°, 20%) in such a manner that the wavelength $\lambda^H_R$ (40°, 70%) is 650 nm or longer and the wavelength $\lambda^H_R$ (40°, 20%) is 720 nm or shorter and is longer than the wavelength $\lambda^H_R$ (40°, 70%).

(C) Spectral transmittance of light incident on the absorbing film 30 at an incident angle of 40° is 20% at a wavelength $\lambda^H_A$ (40°, 20%) which is in the wavelength range of 600 to 800 nm and which is shorter than the wavelength $\lambda^H_R$ (40°, 20%).

(D) Spectral transmittance of light perpendicularly incident on the absorbing film 30 is 15% or less at the wavelength $\lambda^H_R$ (0°, 20%), and the spectral transmittance of light incident on the absorbing film 30 at an incident angle of 40° is 15% or less at the wavelength $\lambda^H_R$ (40°, 20%).

(E) An average of the spectral transmittance of light perpendicularly incident on the near-infrared reflecting film 20 and an average of the spectral transmittance of light incident on the near-infrared reflecting film 20 at an incident angle of 40° are 75% or more in the wavelength range of 450 to 600 nm, and an average of the spectral transmittance of light perpendicularly incident on the absorbing film 30 and an average of the spectral transmittance of light incident on the absorbing film 30 at an incident angle of 40° are 75% or more in the wavelength range of 450 to 600 nm.

Since the near-infrared reflecting film 20 has the features (A) and (B), the spectral transmittance of light incident on the near-infrared reflecting film 20 at an incident angle of 0° to 40° sharply decreases in the wavelength range of 650 nm to 770 nm. The spectral transmittance of light perpendicularly incident on the near-infrared reflecting film 20 and the spectral transmittance of light incident on the near-infrared reflecting film 20 at an incident angle of 40° are, for example, 1% or less on average in the wavelength range of 770 to 1100 nm. Thus, the infrared-cut filter 1a can effectively reflect near-infrared light. The difference $\Delta\lambda^H_R$ (70%) ($=\lambda^H_R$ (0°, 70%)$-\lambda^H_R$ (40°, 70%)) obtained by subtracting the wavelength $\lambda^H_R$ (40°, 70%) from the wavelength $\lambda^H_R$ (0°, 70%) is, for example, 40 to 60 nm. The difference $\Delta\lambda^H_R$ (20%) ($=\lambda^H_R$ (0°, 20%)$-\lambda^H_R$ (40°, 20%)) obtained by subtracting the wavelength $\lambda^H_R$ (40°, 20%) from the wavelength $\lambda^H_R$ (0°, 20%) is, for example, 40 to 55 nm. Thus, the transmittance spectrum of light incident on the near-infrared reflecting film 20 is shifted to the shorter wavelength side as the angle of light incident on the near-infrared reflecting film 20 varies from 0° to 40°.

Due to the absorbing film 30 having the features (C) and (D), the change in transmittance spectrum in a particular wavelength range, namely the wavelength range of 600 to 700 nm, is small when the angle of light incident on the infrared-cut filter 1a varies from 0° to 40°. For example, the absolute value $|\Delta\lambda^H$ (50%)$|$ of the difference between a wavelength which is in the wavelength range of 600 to 700 nm and at which the spectral transmittance of light perpendicularly incident on the infrared-cut filter 1a is 50% and a wavelength which is in the wavelength range of 600 to 700 nm and at which the spectral transmittance of light incident on the infrared-cut filter at an incident angle of 40° is 50% is 10 nm or less. The spectral transmittance of light incident on the absorbing film 30 changes little when the angle of light incident on the absorbing film 30 varies in the range of 0° to 40°. In other words, the spectral transmittance of light perpendicularly incident on the absorbing film 30 is substantially identical to the spectral transmittance of light incident on the absorbing film 30 at an incident angle of 40°.

Due to the near-infrared reflecting film 20 and absorbing film 30 having the feature (E), the infrared-cut filter 1a has high spectral transmittance in the wavelength range of 450 to 600 nm. The average of the spectral transmittance of light perpendicularly incident on the near-infrared reflecting film 20 and the average of the spectral transmittance of light incident on the near-infrared reflecting film 20 at an incident angle of 40° are desirably 85% or more and more desirably 90% or more in the wavelength range of 450 to 600 nm. The average of the spectral transmittance of light perpendicularly incident on the absorbing film 30 and the average of the spectral transmittance of light incident on the absorbing film 30 at an incident angle of 40° are desirably 85% or more and more desirably 90% or more in the wavelength range of 450 to 600 nm.

As shown in FIG. 1, the infrared-cut filter 1a further includes, for example, a transparent dielectric substrate 10. In this case, the near-infrared reflecting film 20 and absorbing film 30 lie parallel to the principal surfaces of the transparent dielectric substrate 10. The transparent dielectric substrate 10 may be omitted.

In the infrared-cut filter 1a, as shown in FIG. 1, the near-infrared reflecting film 20 is in contact with one principal surface of the transparent dielectric substrate 10. It is desirable that the material of the transparent dielectric substrate 10 have, for example, resistance to a hot or humid environment and high chemical resistance. In particular, when the transparent dielectric substrate 10 is exposed to a hot environment during the step of forming the near-infrared reflecting film 20, the transparent dielectric substrate 10 needs to have sufficient resistance to such a hot environment. The material of the transparent dielectric substrate 10 is, for example, glass such as borosilicate glass, polyolefin resin, acrylic resin, polyester resin, aramid resin, imide resin, amide resin, polycarbonate (PC), acetylcellulose, polyvinyl chloride, polyvinyl acetal (PVA), or polyvinyl butyral. The thickness of the transparent dielectric substrate 10 is, for example, 50 to 400 μm.

The near-infrared reflecting film 20 has a transmittance spectrum showing high light transmittance in the visible region and low light transmittance in the infrared region. In other words, the transmittance spectrum of the near-infrared reflecting film 20 has a transmission band in the visible region and an infrared reflection band in the infrared region and has a transition band between the transmission band and the infrared reflection band.

The near-infrared reflecting film 20 may, for example, have low light transmittance at wavelengths of 400 nm or shorter. For example, the average of the spectral transmittance of light perpendicularly incident on the near-infrared reflecting film 20 is 20% or less in the wavelength range of 350 to 380 nm. In this case, a transmission band, an infrared reflection band, and an ultraviolet reflection band exist in the visible region, infrared region, and ultraviolet region of the transmittance spectrum of the near-infrared reflecting film 20, respectively. Additionally, a transition band where the transmittance sharply decreases with increasing wavelength exists between the transmission band and the infrared reflection band, and between the ultraviolet reflection band and the transmission band there exists a transition band where the transmittance sharply increases with increasing wavelength. In this case, for example, ultraviolet exposure of a component contained in the absorbing film 30 can be reduced.

The near-infrared reflecting film 20 is formed, for example, by providing a layer of an inorganic material or organic material on one principal surface of the transparent dielectric substrate 10. The near-infrared reflecting film 20 may be formed by placing one material in a layer on the one principal surface of the transparent dielectric substrate 10 or may be formed by alternately arranging two or more different materials in layers on the one principal surface of the transparent dielectric substrate 10. The near-infrared reflecting film 20 may be formed, for example, by placing a layer of one material selected from $SiO_2$, $TiO_2$, $Ta_2O_5$, and MgF on the one principal surface of the transparent dielectric substrate 10. Alternatively, the near-infrared reflecting film 20 may be formed, for example, by alternately arranging, on the one principal surface of the transparent dielectric substrate 10, layers of two or more materials differing in refractive index which are selected from $SiO_2$, $TiO_2$, $Ta_2O_5$, and MgF. In this case, the flexibility in design of the near-infrared reflecting film 20 is high, and the characteristics of the near-infrared reflecting film 20 can be finely adjusted easily. This allows the near-infrared reflecting film 20 to easily exhibit desired optical characteristics. The near-infrared reflecting film 20 may, for example, be formed of two or more separate reflecting films. In this case, the two or more reflecting films may reflect light in different wavelength ranges, or light in a certain wavelength range may be reflected by two or more of the reflecting films. For example, a first reflecting film is designed and produced so as to mainly reflect relatively short wavelength light in a near-infrared wavelength range such as the wavelength range of 750 to 1100 nm, a second reflecting film is designed and produced so as to mainly reflect relatively long wavelength light in the above wavelength range, and the reflection characteristics of the first reflecting film and the second reflecting film are combined. In this manner, the near-infrared reflecting film 20 can be designed and produced so as to reflect light of wavelengths in the wavelength range of 750 to 1100 nm and also reflect, in some cases, light in the wavelength range below 400 nm. When the characteristics of either the first reflecting film or second reflecting film are only exhibited, for example, the transmittance may exceed a baseline in a portion of the wavelength range of 750 to 1100 nm where light should be blocked by the reflecting film, and consequently leak light may occur. To reduce or prevent this phenomenon, reflecting films differing in reflection characteristics may be combined. The thickness of the near-infrared reflecting film 20 is, for example, 4 to 10 µm.

The near-infrared reflecting film 20 is formed, for example, by (i) a physical process such as vapor deposition, sputtering, ion plating, or ion-assisted deposition (IAD), (ii) a chemical process such as chemical vapor deposition (CVD), or (iii) a wet process such as a sol-gel process.

The near-infrared reflecting film 20 and the absorbing film 30 further have the following features (F) to (I).

(F) In the wavelength range of 350 to 450 nm, the spectral transmittance of light perpendicularly incident on the near-infrared reflecting film 20 monotonically increases in the range from a wavelength $\lambda^L_R$ (0°, 20%) at which the spectral transmittance is 20% to a wavelength $\lambda^L_R$ (0°, 70%) at which the spectral transmittance is 70% in such a manner that the wavelength $\lambda^L_R$ (0°, 20%) is 390 nm or longer and is shorter than the wavelength $\lambda^L_R$ (0°, 70%).

(G) In the wavelength range of 350 to 450 nm, the spectral transmittance of light incident on the near-infrared reflecting film 20 at an incident angle of 40° monotonically increases in the range from a wavelength $\lambda^L_R$ (40°, 20%) at which the spectral transmittance is 20% to a wavelength $\lambda^L_R$ (40°, 70%) at which the spectral transmittance is 70% in such a manner that the wavelength $\lambda^L_R$ (40°, 20%) is 370 nm or longer and is shorter than the wavelength $\lambda^L_R$ (40°, 70%).

(H) In the wavelength range of 350 to 450 nm, the spectral transmittance of light incident on the absorbing film 30 at an incident angle of 40° monotonically increases in the range from a wavelength $\lambda^L_A$ (40°, 20%) at which the spectral transmittance is 20% to a wavelength $\lambda^L_A$ (40°, 50%) at which the spectral transmittance is 50% in such a manner that the wavelength $\lambda^L_A$ (40°, 20%) is 370 nm or longer and is shorter than the wavelength $\lambda^L_A$ (40°, 50%).

(I) In the wavelength range of 350 to 450 nm, the spectral transmittance of light incident on the absorbing film 30 at an incident angle of 40° is 60% or less at a wavelength $\lambda^L_R$ (0°, 50%) at which the spectral transmittance of light perpendicularly incident on the near-infrared reflecting film 20 is 50%.

Due to the absorbing film 30 having the features (H) and (I), the change in transmittance spectrum in a particular wavelength range, namely the wavelength range of 350 to 450 nm, in particular the wavelength range around 400 nm, is small when the angle of light incident on the infrared-cut filter 1a varies from 0° to 40°.

When the near-infrared reflecting film 20 and the absorbing film 30 have the features (F) to (I), for example, the absolute value $|\Delta\lambda^L$ (50%)$|$ of the difference between a wavelength which is in the wavelength range of 350 to 450 nm and at which the spectral transmittance of light perpendicularly incident on the infrared-cut filter 1a is 50% and a wavelength which is in the wavelength range of 350 to 450 nm and at which the spectral transmittance of light incident on the infrared-cut filter 1a at an incident angle of 40° is 50% is 10 nm or less.

The near-infrared reflecting film 20 may have the following feature (J).

(J) The spectral transmittance of light incident on the near-infrared reflecting film 20 at an incident angle of 40° has a spectrum which has a minimum differing by 10 points or more from a baseline in the wavelength range of 400 to 450 nm, in which the half-width for the minimum is 10 nm or more, and in which, when the half-width is defined as $\Delta\lambda_c$, a maximum exists in the range from (400−$\Delta\lambda_c$/2) to (450−$\Delta\lambda_c$/2) nm.

As the angle of light incident on the infrared-cut filter 1a increases from 0° to 40°, the transition band between the ultraviolet reflection band and transmission band is shifted to the shorter wavelength side. Thus, the amount of short wavelength light transmitted through the infrared-cut filter 1a tends to increase with an increase in the angle of light incident on the infrared-cut filter 1a. When the near-infrared reflecting film 20 has the above feature (J), such an increase in the amount of short wavelength light can be counterbalanced. This can, for example, improve the color reproduction in an image obtained by an imaging apparatus equipped with the infrared-cut filter 1a or enhance the hue uniformity in the plane of the image.

Assume that the infrared-cut filter 1a is used with a given imaging sensor and that the B/G ratio representing the spectral sensitivity ratio of the imaging sensor is 1 when determined by making light incident on the infrared-cut filter 1a at an incident light of 0°. Then, for example, the B/G ratio is 0.97 or more and 1.03 or less when determined by making light incident on the infrared-cut filter 1a at an incident angle of 40°.

In a transmittance spectrum of light incident on the near-infrared reflecting film 20, a so-called "ripple", which is a spectrum protruding from the baseline, may appear in each of the transmission band, reflection band, and transition band. When the infrared-cut filter 1a is used in an imaging apparatus such as a digital camera, light showing bright-line spectra such as light from a fluorescent lamp may be incident on the infrared-cut filter 1a. In this case, the ripple appearing in the transmittance spectrum of light incident on the near-infrared reflecting film 20 affects the transmittance spectrum of light incident on the infrared-cut filter 1a. Thus, it is desirable that this ripple not overlap the bright-line spectra. If the ripple and the bright-line spectra overlap each other, the amount of light transmitted through the infrared-cut filter 1a when light is incident on the infrared-cut filter 1a from a light source such as a fluorescent lamp may, in a particular wavelength range, significantly differ from the amount of light transmitted through the infrared-cut filter 1a when light is incident on the infrared-cut filter 1a from another light source.

For example, the spectral transmittance of light perpendicularly incident on the infrared-cut filter 1a and the spectral transmittance of light incident on the infrared-cut filter 1a at an incident angle of 40° do not have a spectrum that overlaps bright-line spectra of illuminant TL84 which appear in the vicinity of 440 nm, in the vicinity of 550 nm, and in the vicinity of 610 nm, that has an extremum differing by 4 or more points from the baseline, and that has a half-width of 15 nm. In this case, the infrared-cut filter 1a has no ripple overlapping the bright-line spectra of illuminant TL84, and thus the amount of light transmitted through the infrared-cut filter 1a can be prevented from significantly varying from light source to light source at particular wavelengths.

As shown in FIG. 1, for example, the absorbing film 30 is in contact with the other principal surface of the transparent dielectric substrate 10. Namely, the absorbing film 30 is formed opposite to the near-infrared reflecting film 20 with respect to the transparent dielectric substrate 10. The absorbing film 30 is formed, for example, by applying a solution containing a binder resin in which is dispersed a substance (absorbing substance) having an absorption peak in a particular wavelength range (from $\lambda^H{}_R$ (40°, 70%) to $\lambda^H{}_R$ (0°, 20%), for example), and then by drying and hardening the film of the applied solution. The binder resin for forming the absorbing film 30 has, for example, a spectral transmittance of 85% or more for light with wavelengths of 400 to 1100 nm. The binder resin for forming the absorbing film 30 has, for example, resistance to a hot or humid environment. The binder resin for forming the absorbing film 30 is, for example, acrylic resin, polystyrene resin, polyurethane resin, fluorine resin, PC resin, polyimide resin, polyamide resin, polyolefin resin, silicone resin, or epoxy resin. These resins may each be formed from one monomer, one oligomer, or one polymer or may each be formed from a combination of two or more monomers, two or more oligomers, or two or more polymers. The thickness of the absorbing film 30 is, for example, 1 to 200 μm.

When the absorbing film 30 is in contact with the transparent dielectric substrate 10, it is desirable, from the viewpoint of reducing reflection at the interface between the absorbing film 30 and transparent dielectric substrate 10, that the difference between the refractive index na of the binder resin for forming the absorbing film 30 and the refractive index ns of the material of the transparent dielectric substrate 10 be small. For example, |na−ns| is 0.1 or less.

The solution containing the binder resin in which an absorbing substance is dispersed is applied by a technique such as spin coating, dipping, gravure coating, spray coating, die coating, bar coating, or ink jetting. This solution is prepared, for example, by mixing the absorbing substance and the binder resin in a solvent such as methyl ethyl ketone, toluene, cyclohexane, cyclohexanone, or tetrahydrofuran. In the preparation of the solution, two or more solvents may be used as a mixture.

Examples of the absorbing substance include: (i) metal complexes in which a phosphorus-containing compound such as a phosphoric acid ester, phosphinic acid, or phosphonic acid or a sulfur-containing compound such as sulfuric acid or sulfonic acid coordinates to ions of a metal such as copper (Cu) or cobalt (Co); (ii) metal oxides such as indium tin oxide (ITO) and antimony tin oxide (ATO); and (iii) organic dyes such as organic dyes based on azo compounds, organic dyes based on phthalocyanine, organic dyes based on naphthalocyanine, organic dyes based on diimonium, organic dyes based on methines such as cyanine, organic dyes based on anthraquinone, and organic dyes based on squarylium. These substances may be used alone, or two or more of these substances may be used as a mixture.

The absorbing film 30 may contain an ultraviolet-absorbing substance. In this case, for example, the ultraviolet-absorbing substance is added to the solution containing the binder resin in which the absorbing substance is dispersed. Alternatively, the solution containing the binder resin in which the absorbing substance is dispersed may be mixed with a solution containing the ultraviolet-absorbing substance. The ultraviolet-absorbing substance is, for example, a benzophenone-based compound, benzotriazole-based compound, or benzoate-based compound. These compounds may be used alone, or a combination of two or more of these compounds may be used. A film containing the ultraviolet-absorbing substance and a film containing the absorbing substance may be formed separately. If the ultraviolet-absorbing substance and the absorbing substance coexist in the same layer, interaction may occur between the substances to cause decrease in absorbing ability or weather resistance or deterioration of the dye. Such a defect can be avoided by separately forming the film containing the ultraviolet-absorbing substance and the film containing the absorbing substance.

A coating liquid prepared by incorporating an ultraviolet-absorbing substance in a resin such as PVB which is sufficiently transparent to visible light is applied to a transparent dielectric substrate having an average spectral transmittance of 90% or more in the wavelength range of 400 to 1100 nm, and the film of the applied liquid is dried or hardened to produce a laminate of an ultraviolet-absorbing film and the transparent dielectric substrate. A transmittance spectrum of this laminate can be measured to evaluate the characteristics of a laminate containing the ultraviolet-absorbing substance. The laminate containing the ultraviolet-absorbing substance desirably has the following features (K) and (L).

(K) The average spectral transmittance in the wavelength range of 450 to 1100 nm is 85% or more.

(L) The spectral transmittance at a wavelength of 390 nm is lower than that at a wavelength of 420 nm.

A dispersant may be further added to the solution containing the binder resin in which the absorbing substance is dispersed, depending on the combination of the absorbing substance, binder resin, and solvent. The addition of the dispersant can prevent the absorbing substance from being aggregated in the solution. Dispersants that can be used include: (i) anionic surfactants such as dodecylbenzenesulfonic acid salts; (ii) nonionic surfactants, including polyoxyethylene alkyl ethers such as polyoxyethylene alkyl ether sulfuric acid esters and polyoxyethylene alkyl ether phosphoric acid salts and polyacrylic acid salts; (iii) silicone surfactants; and (iv) fluorosurfactants. These dispersants may be used alone, or a combination of two or more of these dispersants may be used. These surfactants can act to reduce the viscosity of the solution containing the binder resin in which the absorbing substance is dispersed, increase the wettability of the solution on the surface to be coated, and make it easy to level the film of the applied solution. This can prevent defects of the film of the applied solution containing the binder resin in which the absorbing substance is dispersed. The amount of the dispersant added to the solution containing the binder resin in which the absorbing substance is dispersed is, for example, 0.001 to 5 wt % with respect to the solid content of the solution.

An antioxidant may be further added to the solution containing the binder resin in which the absorbing substance is dispersed, depending on the combination of the absorbing substance, binder resin, and solvent. The addition of the antioxidant can inhibit deterioration of the absorbing substance or binder resin. Examples of the antioxidant include phenol-based antioxidants, hindered phenol-based antioxidants, amine-based antioxidants, hindered amine-based antioxidants, sulfur-based compounds, nitro group-containing compounds, and phosphorous acid. These antioxidants may be used alone, or a combination of two or more of these antioxidants may be used. The amount of the antioxidant added to the solution containing the binder resin is, for example, 0.001 to 5 wt % with respect to the solid content of the solution.

The absorbing film 30 may be formed as a laminate of a plurality of films. In this case, the absorbing substance contained in one film and the absorbing substance contained in another film may be the same or different.

For passivation, a protective film made of an inorganic material or resin may be further formed on the absorbing film 30. The formation of the protective film can prevent deterioration of the binder resin and absorbing substance of the absorbing film 30 in a hot or humid environment.

Infrared-cut filters 1b to 1h according to other embodiments of the present invention will be described. The infrared-cut filters 1b to 1e and 1h are configured in the same manner as the infrared-cut filter 1a, unless otherwise stated. Those components of the infrared-cut filters 1b to 1e and 1h which are the same as or correspond to the components of the infrared-cut filter 1a are denoted by the same reference characters and will not be described in detail. The description given of the infrared-cut filter 1a applies also to the infrared-cut filters 1b to 1e and 1h, unless any technical inconsistency occurs. The infrared-cut filters 1f and 1g are configured in the same manner as the infrared-cut filter 1a, except for not having the transparent dielectric substrate 10, and those components of the infrared-cut filters 1f and 1g which are the same as or correspond to the components of the infrared-cut filter 1a are denoted by the same reference characters and will not be described in detail.

Figure 2:
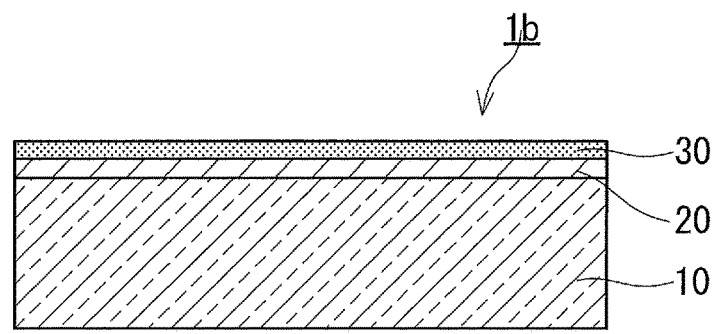
FIG. 2 is a cross-sectional view of an infrared-cut filter according to another embodiment of the present invention.

As shown in FIG. 2, the absorbing film 30 of the infrared-cut filter 1b is in contact with the principal surface of the near-infrared reflecting film 20 that is opposite to the principal surface in contact with the transparent dielectric substrate 10.

Figure 3:
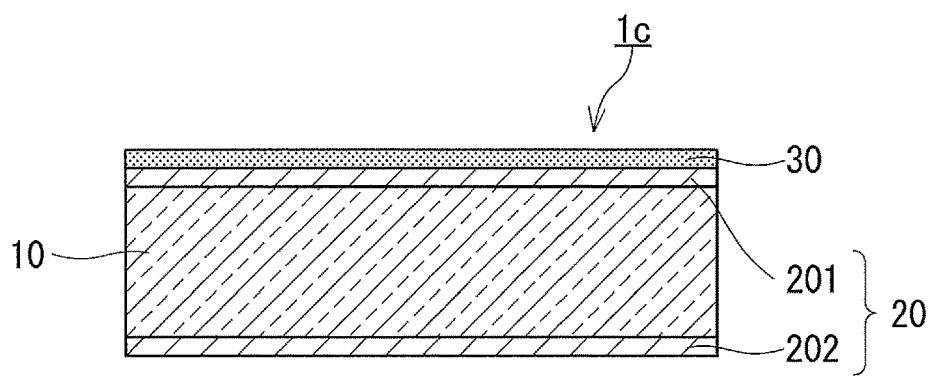
FIG. 3 is a cross-sectional view of an infrared-cut filter according to yet another embodiment of the present invention.

As shown in FIG. 3, the infrared-cut filter 1c includes a pair of near-infrared reflecting films 20, and the pair of near-infrared reflecting films 20 includes a first reflecting film 201 and a second reflecting film 202. The first reflecting film 201 and the second reflecting film 202 are formed respectively in contact with the two principal surfaces of the transparent dielectric substrate 10. If one near-infrared reflecting film 20 is formed only in contact with one principal surface of the transparent dielectric substrate 10, the transparent dielectric substrate 10 may be warped due to stress occurring in the near-infrared reflecting film 20. When paired reflecting films such as the near-infrared reflecting films 20 including the first reflecting film 201 and second reflecting film 202 are formed respectively in contact with the two principal surfaces of the transparent dielectric substrate 10, stress occurring in the first reflecting film 201 and stress occurring in the second reflecting film 202 are combined, so that warping of the transparent dielectric substrate 10 can be prevented. In particular, when one near-infrared reflecting film 20 is a laminate of a large number of (for example, 16 or more) layers, the stress occurring in the near-infrared reflecting film 20 is large, and it is thus desirable that paired near-infrared reflecting films 20 be formed respectively in contact with the two principal surfaces of the transparent dielectric substrate 10.

Figure 4:
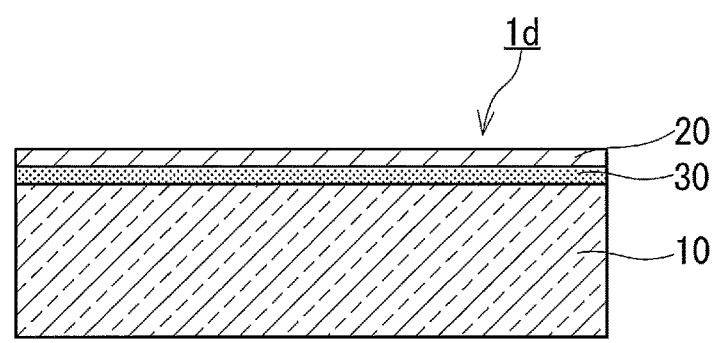
FIG. 4 is a cross-sectional view of an infrared-cut filter according to yet another embodiment of the present invention.

As shown in FIG. 4, the near-infrared reflecting film 20 of the infrared-cut filter 1d is in contact with the principal surface of the absorbing film 30 that is opposite to the principal surface in contact with the transparent dielectric substrate 10.

Figure 5:
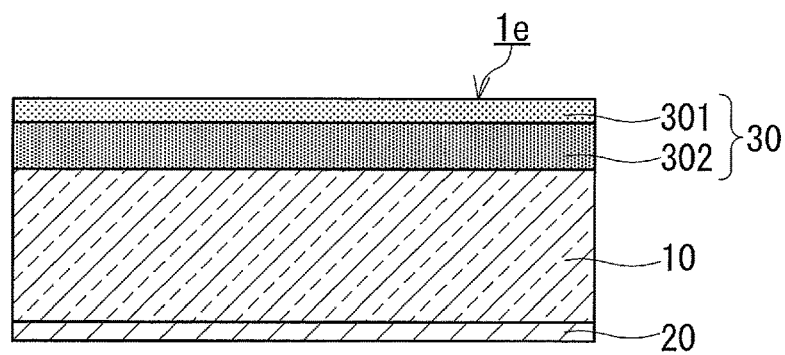
FIG. 5 is a cross-sectional view of an infrared-cut filter according to yet another embodiment of the present invention.

As shown in FIG. 5, the absorbing film 30 of the infrared-cut filter 1e includes a first absorbing film 301 and a second absorbing film 302. The second absorbing film 302 is in contact with the transparent dielectric substrate 10. The first absorbing film 301 is in contact with the principal surface of the second absorbing film 302 that is opposite to the principal surface in contact with the transparent dielectric substrate 10. The first absorbing film 301 contains a first absorbing substance, and the second absorbing film 302 contains a second absorbing substance. The second absorbing substance is typically an absorbing substance different from the first absorbing substance. This makes it easier to impart desired properties to the absorbing film 30. The first absorbing substance is, for example, an organic dye. The second absorbing substance may be, for example, a complex of a phosphorus-containing compound such as a phosphoric acid ester, phosphinic acid, or phosphonic acid and a metal element such as Cu or Co. The thickness of the second absorbing film 302 is, for example, greater than the thickness of the first absorbing film 301. The thickness of the first absorbing film 301 is, for example, 1 μm to 3 μm, and the thickness of the second absorbing film 302 is, for example, 30 μm to 150 μm.

Figure 6:
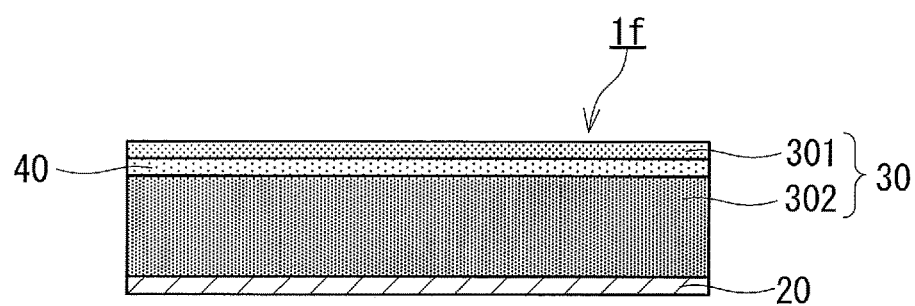
FIG. 6 is a cross-sectional view of an infrared-cut filter according to yet another embodiment of the present invention.

As shown in FIG. 6, the infrared-cut filter 1f does not include the transparent dielectric substrate 10. The absorbing film 30 of the infrared-cut filter 1f includes a first absorbing film 301 and a second absorbing film 302. The first absorbing film 301 contains a first absorbing substance, and the second absorbing film 302 contains a second absorbing substance. The second absorbing substance is typically an absorbing substance different from the first absorbing substance. This makes it easier to impart desired properties to the absorbing film 30. The first absorbing substance is, for example, an organic dye. The second absorbing substance may be, for example, a complex of a phosphorus-containing compound such as a phosphoric acid ester, phosphinic acid, or phosphonic acid and a metal element such as Cu or Co. A $SiO_2$ film 40 is formed between the first absorbing film 301 and second absorbing film 302 in the thickness direction of the infrared-cut filter 1f. The two principal surfaces of the $SiO_2$ film 40 are respectively in contact with the first absorbing film 301 and the second absorbing film 302. The $SiO_2$ film 40 is formed, for example, by a technique such as vapor deposition. The near-infrared reflecting film 20 of the infrared-cut filter 1f is in contact with the second absorbing film 302. The thickness of the first absorbing film 301 is, for example, 1 μm to 3 μm, the thickness of the second absorbing film 302 is, for example, 50 μm to 150 μm, and the thickness of the $SiO_2$ film 40 is, for example, 0.5 μm to 3 μm.

Figure 7:
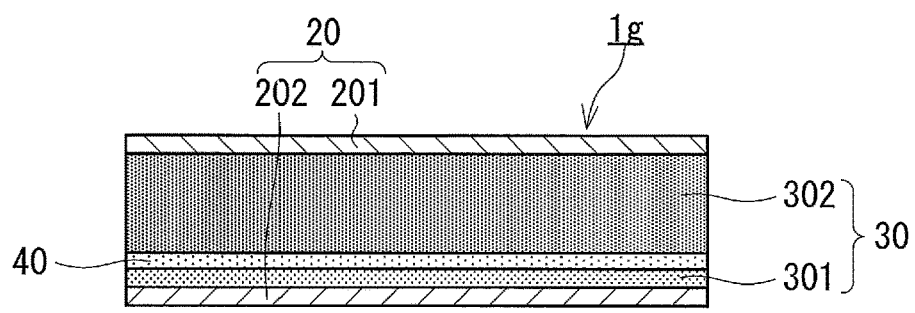
FIG. 7 is a cross-sectional view of an infrared-cut filter according to yet another embodiment of the present invention.

As shown in FIG. 7, the infrared-cut filter 1g, like the infrared-cut filter 1f, includes: the absorbing film 30 including the first absorbing film 301 and the second absorbing film 302; and the $SiO_2$ film 40. The near-infrared reflecting film 20 of the infrared-cut filter 1g includes the first reflecting film 201 and the second reflecting film 202. The first reflecting film 201 and the second reflecting film 202 have different reflection characteristics. The near-infrared reflecting film 20 exhibits desired near-infrared reflection performance by virtue of the combination of the first reflecting film 201 and second reflecting film 202. The first reflecting film 201 is, for example, in contact with the second absorbing film 302, and the second reflecting film 202 is, for example, in contact with the first absorbing film 301. The thickness of the first reflecting film 201 is, for example, 2 μm to 4 μm, and the thickness of the second reflecting film 202 is, for example, 2 μm to 4 μm.

Figure 8:
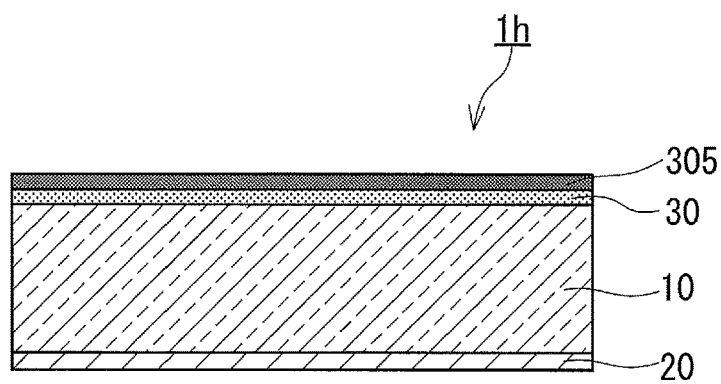
FIG. 8 is a cross-sectional view of an infrared-cut filter according to yet another embodiment of the present invention.

As shown in FIG. 8, an ultraviolet-absorbing substance-containing film 305 may be disposed on top of the absorbing film 30 of the infrared-cut filter 1h. The ultraviolet-absorbing substance-containing film 305 contains an ultraviolet-absorbing substance such as a benzophenone-based compound, benzotriazol-based compound, or benzoate-based compound. For example, the ultraviolet-absorbing substance-containing film 305 is disposed in contact with the principal surface of the absorbing film 30 that is opposite to the principal surface in contact with the transparent dielectric substrate 10. The thickness of the ultraviolet-absorbing substance-containing film 305 is, for example, 1 μm to 10

μm. In this case, the infrared-cut filter 1h easily exhibits desired ultraviolet-absorbing performance.

Figure 9:
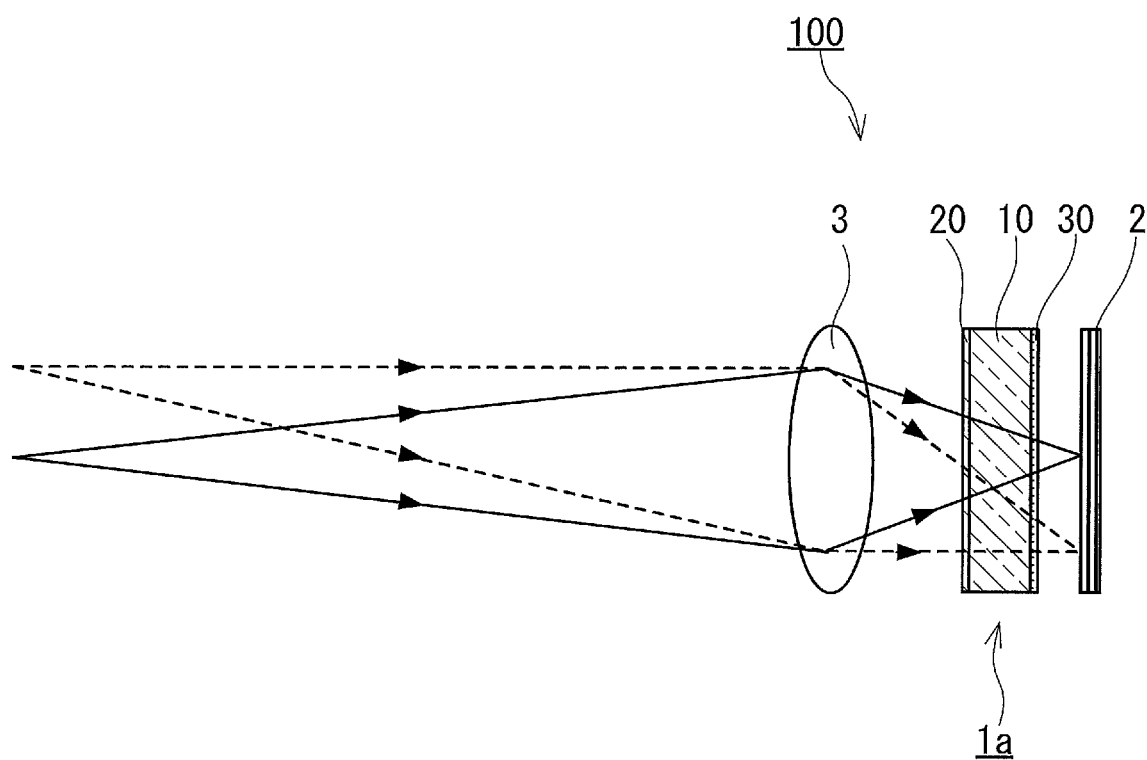
FIG. 9 is a diagram showing an imaging optical system according to an embodiment of the present invention.

Next, an imaging optical system 100 according to an embodiment of the present invention will be described. As shown in FIG. 9, the imaging optical system 100 includes, for example, the infrared-cut filter 1a. The imaging optical system 100 further includes, for example, an imaging lens 3. The imaging optical system 100 is disposed ahead of an imaging sensor 2 in an imaging apparatus such as a digital camera. The imaging sensor 2 is, for example, a solid-state imaging sensor such as a CCD or CMOS. As shown in FIG. 9, light coming from an object is focused by the imaging lens 3, the infrared portion of the light is cut by the infrared-cut filter 1a, and then the light is incident on the imaging sensor 2. A favorable image with good color reproduction can thus be obtained. Additionally, the quality of the resulting image is high even when the imaging apparatus including the imaging optical system 100 has a wide angle of view and the light to be delivered to the imaging sensor 2 is incident on the infrared-cut filter 1a, for example, at an incident angle of 40°. In particular, the hue uniformity of the resulting image is maintained between the central portion and peripheral portion of the image. The imaging optical system 100 may include any one of the infrared-cut filters 1b to 1h instead of the infrared-cut filter 1a.

EXAMPLES

The present invention will be described in more detail by Examples. The present invention is not limited to Examples described below.

Example 1

(First Laminate)

Figure 10:
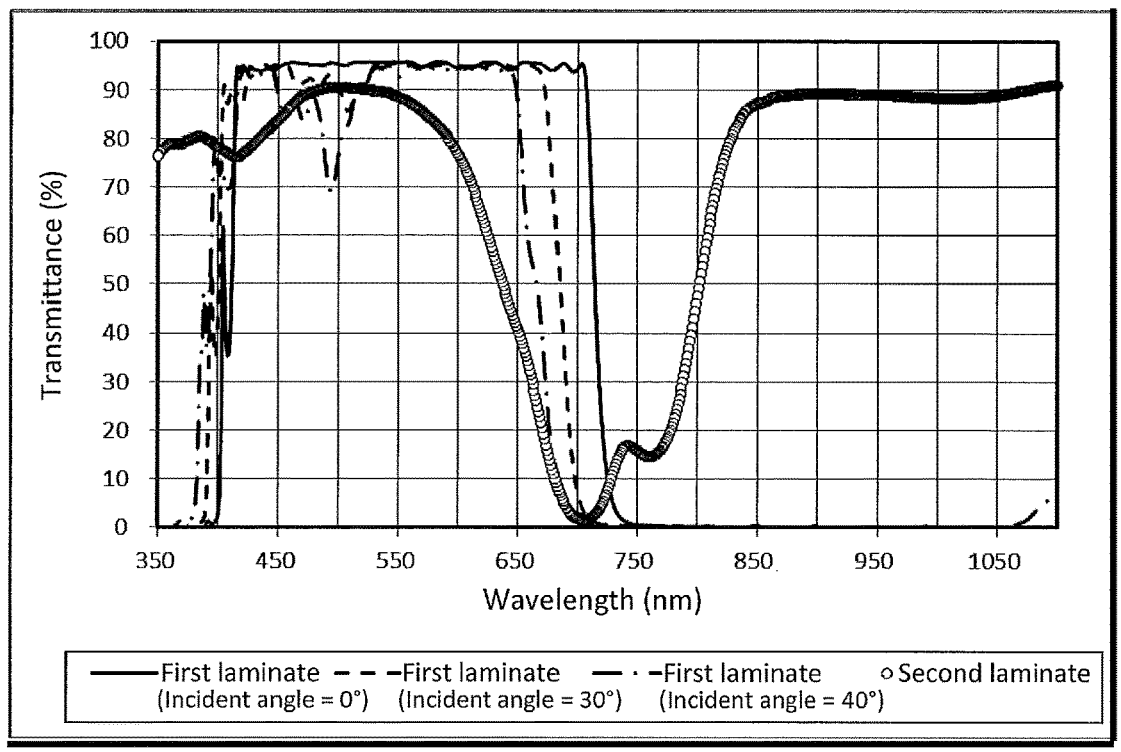
FIG. 10 is a graph showing the spectral transmittance of a first laminate and a second laminate according to Example 1.

A near-infrared reflecting film R1 composed of alternately arranged $SiO_2$ films and $TiO_2$ films was formed by vapor deposition on one principal surface of a transparent glass substrate made of borosilicate glass and having a thickness of 0.21 mm (manufactured by SCHOTT AG under the product name "D 263"). In this manner, a first laminate according to Example 1 was produced. The thickness of the near-infrared reflecting film R1 of the first laminate according to Example 1 was 5 μm. The near-infrared reflecting film R1 of the first laminate according to Example 1 included 17 $SiO_2$ films and 17 $TiO_2$ films. The spectral transmittance of the first laminate according to Example 1 in the wavelength range of 350 to 1100 nm was measured using a spectrophotometer (manufactured by JASCO Corporation under the model number "V-670"). In this measurement, light was incident on the first laminate according to Example 1 at incident angles of 0°, 30°, and 40°. The transmittance spectra obtained are shown in FIG. 10. The transparent glass substrate (D 263) used in the first laminate according to Example 1 has high spectral transmittance in the wavelength range of 350 nm to 1100 nm, and the transmittance spectra of the first laminate according to Example 1 can be considered as transmission spectra of the near-infrared reflecting film R1. This applies to the other Examples and Comparative Examples described below.

The average of the spectral transmittance of the first laminate according to Example 1 in the wavelength range of 450 to 600 nm was more than 80% for all of the incident angles of light, although a ripple appeared in the vicinity of a wavelength of 490 nm in the transmittance spectrum of light incident on the first laminate at an incident angle of 40°. In the transmittance spectrum obtained for the first laminate according to Example 1 when the incident angle was 40°, the spectral transmittance had a minimum of about 69% at a wavelength of about 410 nm. Assuming that the baseline of this transmittance spectrum was at a spectral transmittance of 95%, the downward-convex portion containing the minimum had a spectral transmittance lowered by 20 or more points from the baseline and had a half-width of about 16 nm.

For a transmittance spectrum obtained when the angle of light incident on the first laminate is X°, a wavelength which is in the wavelength range of 600 to 800 nm and at which the transmittance is Y % is defined as a specified wavelength $\lambda^H_R$ (X°, Y %). The specified wavelengths in the wavelength range of 600 to 800 nm in the transmittance spectra of the first laminate according to Example 1 are shown in Table 1. The following definitions were also made: $\Delta\lambda^H_R$ (70%)=$\lambda^H_R$ (0°, 70%)−$\lambda^H_R$ (40°, 70%), $\Delta\lambda^H_R$ (50%)=$\lambda^H_R$ (0°, 50%)−$\lambda^H_R$ (40°, 50%), and $\Delta\lambda^H_R$ (20%)=$\Delta\lambda^H_R$ (0°, 20%)−$\Delta\lambda^H_R$ (40°, 20%). For the first laminate according to Example 1, $\Delta\lambda^H_R$ (70%), $\Delta\lambda^H_R$ (50%), and $\Delta\lambda^H_R$ (20%) are shown in Table 1.

For a transmittance spectrum obtained when the angle of light incident on the first laminate is W°, a wavelength which is in the wavelength range of 350 to 450 nm and at which the transmittance is Z % is also defined as a specified wavelength $\lambda^L_R$ (W°, Z %). The specified wavelengths in the wavelength range of 350 to 450 nm in the transmittance spectra of the first laminate according to Example 1 are shown in Table 1. The following definitions were also made: $\Delta\lambda^L_R$ (70%)=$\lambda^L_R$ (0°, 70%)−$\lambda^L_R$ (40°, 70%), $\Delta\lambda^L_R$ (50%)= $\lambda^L_R$ (0°, 50%)−$\lambda^L_R$ (40°, 50%), and $\Delta\lambda^L_R$ (20%)=$\lambda^L_R$ (0°, 20%)−$\lambda^L_R$ (40°, 20%). For the first laminate according to Example 1, $\Delta\lambda^L_R$ (70%), $\Delta\lambda^L_R$ (50%), and $\Delta\lambda^L_R$ (20%) are shown in Table 1.

(Second Laminate)

Organic dyes having an absorption peak in the wavelength range of 700 to 750 nm, having low absorption in the visible region, and soluble in methyl ethyl ketone (MEK) (one or more organic dyes selected from cyanine-based, squarylium-based, phthalocyanine-based, and diimmonium-based organic dyes) were used in combination, and MEK was used as a solvent. Polyvinyl butyral (PVB) was added in a solid content ratio of 99 wt %, followed by stirring for 2 hours to obtain a coating liquid a1. The amounts and proportions of the organic dyes were set so that the characteristic spectrum as shown in FIG. 10 for a second laminate would be obtained when the spectral characteristics were measured after the coating liquid a1 was formed into a film.

The coating liquid a1 was applied by spin coating to one principal surface of a transparent glass substrate made of borosilicate glass and having a thickness of 0.21 mm (manufactured by SCHOTT AG under the product name "D 263"), and a film was thus formed. This film was exposed to a 140° C. environment for 0.5 hours, and thus dried and hardened to form an absorbing film A1. In this manner, a second laminate according to Example 1 was produced. The thickness of the absorbing film A1 was 3 The spectral transmittance of the second laminate according to Example 1 in the wavelength range of 350 to 1100 nm was measured using a spectrophotometer (manufactured by JASCO Corporation under the model number "V-670"). In this measurement, light was incident on the second laminate according to Example 1 at incident angles of 0°, 30°, and 40°, and substantially identical transmittance spectra were obtained for all of the incident angles. The transmittance spectrum obtained when the incident angle was 0° is shown in FIG. 10. As shown in FIG. 10, the average of the spectral transmittance of the second laminate according to Example 1 in the wavelength range of 450 to 600 nm was more than 75%. The second laminate according to Example 1 had absorption peaks at a wavelength of about 700 nm and a wavelength of about 760 nm. Additionally, the second laminate according to Example 1 had an absorption peak at a wavelength of about 410 nm. The transparent glass substrate (D 263) used in the second laminate according to Example 1 has high spectral transmittance in the wavelength range of 350 nm to 1100 nm, and the transmittance spectra of the second laminate according to Example 1 can be considered as transmittance spectra of the absorbing film A1. The same applies to the other Examples and Comparative Examples described below.

For a transmittance spectrum obtained when the angle of light incident on the second laminate is X°, a wavelength which is in the wavelength range of 600 to 800 nm and at which the transmittance is Y % is defined as a specified wavelength $\lambda^H_A$ (X°, Y %). The specified wavelengths in the wavelength range of 600 to 800 nm in the transmittance spectra of the second laminate according to Example 1 are shown in Table 1. For the transmittance spectra of the second laminate according to Example 1, transmittances at a wavelength of 711 nm ($=\lambda^H_R$ (0°, 70%)), a wavelength of 714 nm ($=\lambda^H_R$ (0°, 50%)), a wavelength of 721 nm ($=\lambda^H_R$ (0°, 20%)), a wavelength of 655 nm ($=\lambda^H_R$ (40°, 70%)), a wavelength of 666 nm ($=\lambda^H_R$ (40°, 50%)), a wavelength of 677 nm ($=\lambda^H_R$ (40°, 20%)), a wavelength of 413 nm ($=\lambda^L_R$ (0°, 70%)), a wavelength of 411 nm ($=\lambda^L_R$ (0°, 50%)), a wavelength of 403 nm ($=\lambda^L_R$ (0°, 20%)), a wavelength of 410 nm ($=\lambda^L_R$ (40°, 70%)), a wavelength of 393 nm ($=\lambda^L_R$ (40°, 50%)), and a wavelength of 384 nm ($=\lambda^L_R$ (40°, 20%)) are shown in Table 1.

(Infrared-Cut Filter)

Figure 11:
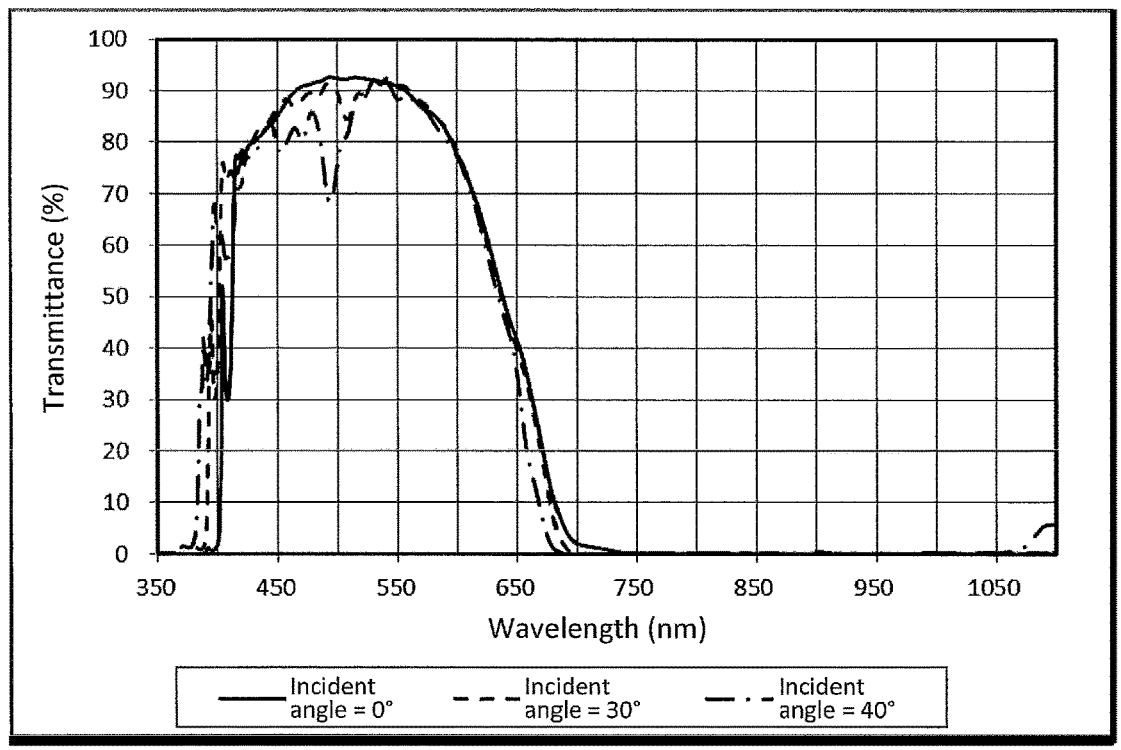
FIG. 11 is a graph showing the spectral transmittance of an infrared-cut filter according to Example 1.

An absorbing film A1 was formed, in the same manner as in production of the second laminate, on that principal surface of the transparent glass substrate of the first laminate according to Example 1 on which the near-infrared reflecting film R1 was not formed. In this manner, an infrared-cut filter according to Example 1 was produced. The spectral transmittance of the infrared-cut filter according to Example 1 in the wavelength range of 350 nm to 1100 nm was measured using a spectrophotometer (manufactured by JASCO Corporation under the model number "V-670"). In this measurement, light was incident on the infrared-cut filter according to Example 1 at incident angles of 0°, 30°, and 40°. The transmittance spectra obtained are shown in FIG. 11.

For a transmittance spectrum obtained when the angle of light incident on the infrared-cut filter is X°, a wavelength which is in the wavelength range of 600 to 800 nm and at which the transmittance is Y % is defined as a specified wavelength $\lambda^H$ (X°, Y %). As shown in Table 4, the wavelength $\lambda^H$ (0°, 70%) was 614 nm, and the wavelength $\lambda^H$ (40°, 70%) was 612 nm. When the absolute value of the difference between these wavelengths is defined as $|\Delta\lambda^H$ (70%)|, $|\Delta\lambda^H$ (70%)| was 2 nm. The wavelength $\lambda^H$ (0°, 50%) was 638 nm, and the wavelength $\lambda^H$ (40°, 50%) was 635 nm. When the absolute value of the difference between these wavelengths is defined as $|\Delta\lambda^H$ (50%)|, $|\Delta\lambda^H$ (50%)| was 3 nm. The wavelength $\lambda^H$ (0°, 20%) was 672 nm, and the wavelength $\lambda^H$ (40°, 20%) was 658 nm. When the absolute value of the difference between these wavelengths is defined as $|\Delta\lambda^H$ (20%)|, $|\Delta\lambda^H$ (20%)| was 14 nm.

Example 2

(First Laminate)

Figure 12:
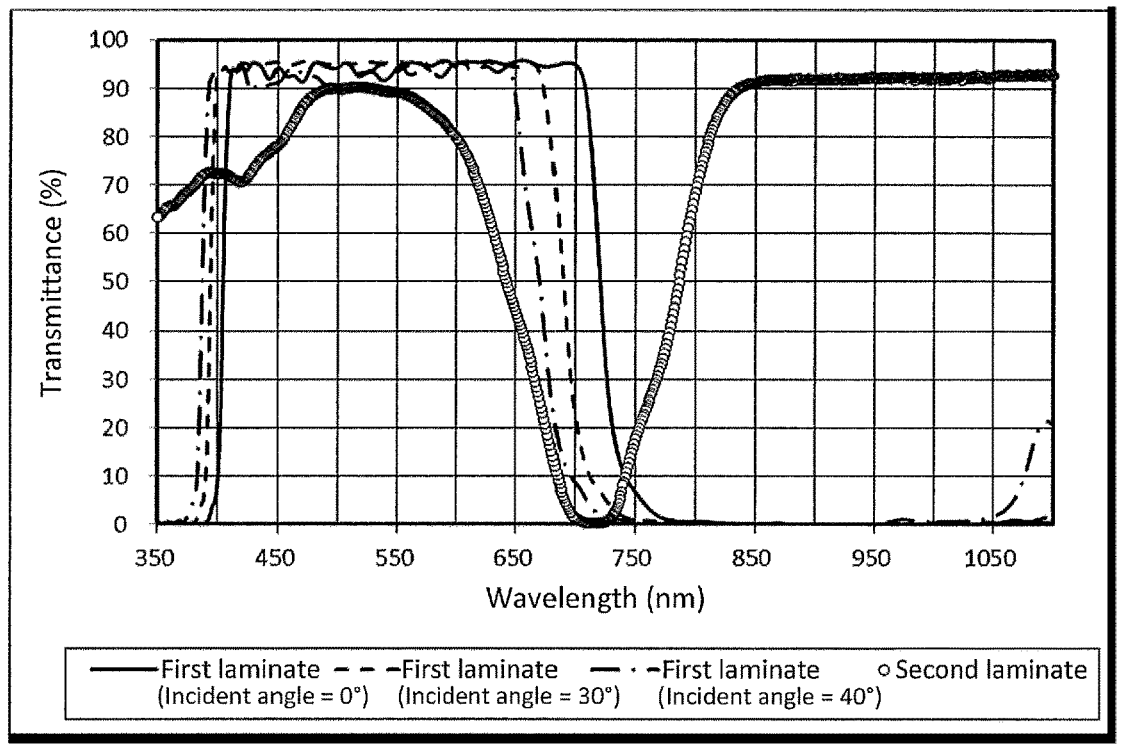
FIG. 12 is a graph showing the spectral transmittance of a first laminate and a second laminate according to Example 2.

A near-infrared reflecting film R2 composed of alternately arranged $SiO_2$ films and $TiO_2$ films and different from the near-infrared reflecting film R1 described in Example 1 was formed by vapor deposition on one principal surface of a transparent glass substrate made of borosilicate glass and having a thickness of 0.21 mm (manufactured by SCHOTT AG under the product name "D 263"). In this manner, a first laminate according to Example 2 was produced. The thickness of the near-infrared reflecting film R2 of the first laminate according to Example 2 was 5 μm. The near-infrared reflecting film R2 of the first laminate according to Example 2 included 17 $SiO_2$ films and 17 $TiO_2$ films. For the first laminate according to Example 2, the spectral transmittance in the wavelength range of 350 to 1100 nm was measured in the same manner as in Example 1. The transmittance spectra obtained are shown in FIG. 12.

In the transmittance spectra obtained for the first laminate according to Example 2, the average of the spectral transmittance in the wavelength range of 450 to 600 nm was more than 80% for all of the incident angles. For the transmittance spectra of the first laminate according to Example 2, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 1. For the transmittance spectra of the first laminate according to Example 2, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 1.

(Second Laminate)

Absorbing substances composed of organic dyes having an absorption peak in the wavelength range of 700 to 750 nm, having low absorption in the visible region, and soluble in MEK were used in combination. This combination of absorbing substances is different from the combination of organic dyes used in Example 1. MEK was used as a solvent, and PVB was added in a solid content ratio of 99 wt %, followed by stirring for 2 hours to obtain a coating liquid a2. The amounts and proportions of the organic dyes were set so that the characteristic spectrum as shown in FIG. 12 for a second laminate would be obtained when the spectral characteristics were measured after the coating liquid a2 was formed into a film.

The coating liquid a2 was applied by spin coating to one principal surface of a transparent glass substrate made of borosilicate glass and having a thickness of 0.21 mm (manufactured by SCHOTT AG under the product name "D 263"), and a film was thus formed. This film was exposed to a 140° C. environment for 0.5 hours, and thus dried and hardened to form an absorbing film A2. In this manner, a second laminate according to Example 2 was produced. The thickness of the absorbing film A1 was 3 μm. For the second laminate according to Example 2, the spectral transmittance in the wavelength range of 350 to 1100 nm was measured in the same manner as in Example 1. In this measurement, light was incident on the second laminate according to Example 2 at incident angles of 0°, 30°, and 40°, and substantially identical transmittance spectra were obtained for all of the incident angles. The transmittance spectrum obtained when the incident angle was 0° is shown in FIG. 12. As shown in FIG. 12, the average of the spectral transmittance of the second laminate according to Example 2 in the wavelength range of 450 to 600 nm was more than 75%. The second laminate according to Example 2 had an absorption peak at a wavelength of about 710 nm. Additionally, the second laminate according to Example 2 had an absorption peak at a wavelength of about 420 nm.

For a transmittance spectrum obtained when the angle of light incident on the second laminate is W°, a wavelength which is in the wavelength range of 350 to 450 nm and at which the transmittance is Z % is defined as a specified wavelength $\lambda^L_A$ (W , Z %). The specified wavelengths in the wavelength range of 600 to 800 nm and $\lambda^L_A$ (0°, 70%) in the transmittance spectra of the second laminate according to Example 2 are shown in Table 1. For the transmittance spectra of the second laminate according to Example 2, transmittances at a wavelength of 715 nm (=$\lambda^H_R$ (0°, 70%)), a wavelength of 720 nm (=$\lambda^H_R$ (0°, 50%)), a wavelength of 731 nm (=$\lambda^H_R$ (0°, 20%)), a wavelength of 658 nm (=$\lambda^H_R$ (40°, 70%)), a wavelength of 670 nm (=$\lambda^H_R$ (40°, 50%)), a wavelength of 684 nm (=$\lambda^H_R$ (40°, 20%)), a wavelength of 406 nm (=$\lambda^L_R$ (0°, 70%)), a wavelength of 405 nm (=$\lambda^L_R$ (0°, 50%)), a wavelength of 402 nm (=$\lambda^L_R$ (0°, 20%)), a wavelength of 389 nm (=$\lambda^L_R$ (40°, 70%)), a wavelength of 387 nm (=$\lambda^L_R$ (40°, 50%)), and a wavelength of 385 nm (=$\lambda^L_R$ (40°, 20%)) are shown in Table 1.

(Infrared-Cut Filter)

Figure 13:
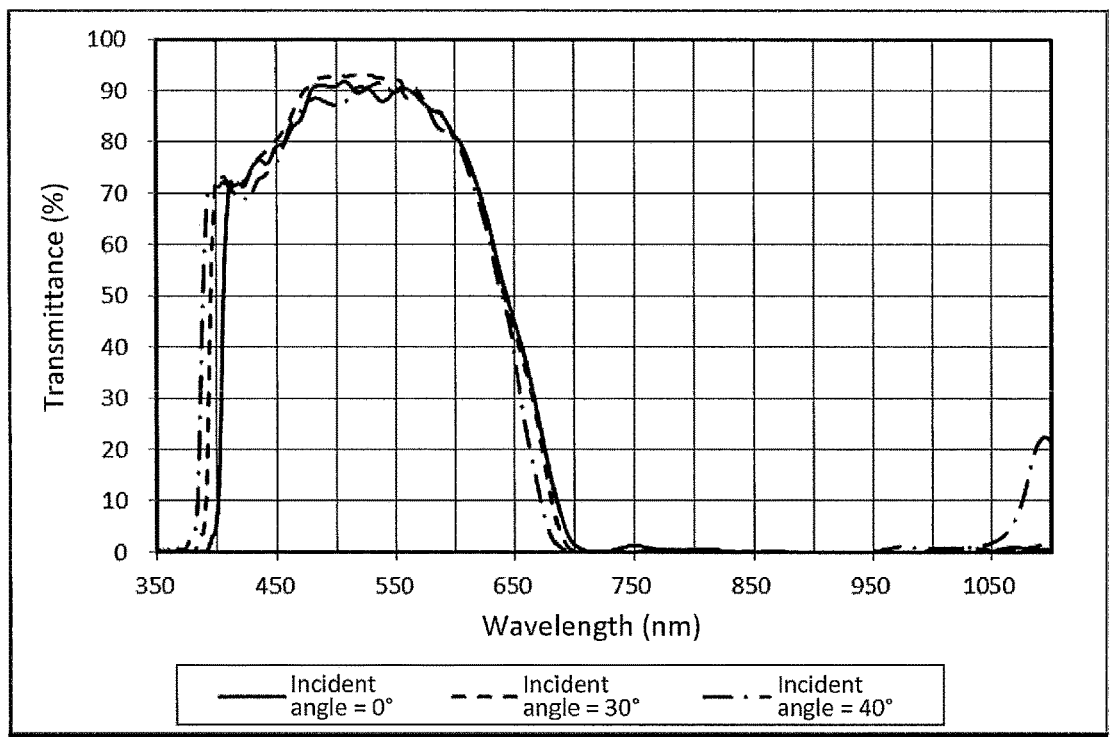
FIG. 13 is a graph showing the spectral transmittance of an infrared-cut filter according to Example 2.

An absorbing film A2 was formed, in the same manner as in production of the second laminate, on that principal surface of the transparent glass substrate of the first laminate according to Example 2 on which the near-infrared reflecting film R2 was not formed. For the infrared-cut filter according to Example 2, the spectral transmittance in the wavelength range of 350 to 1100 nm was measured in the same manner as in Example 1. The transmittance spectra obtained are shown in FIG. 13.

For the transmittance spectra of the infrared-cut filter according to Example 2, as shown in Table 4, the wavelength $\lambda^H$ (0°, 70%) was 621 nm, the wavelength $\lambda^H$ (40°, 70%) was 618 nm, and the absolute value $|\Delta\lambda^H$ (70%)$|$ of the difference between these wavelengths was 3 nm. The wavelength $\lambda^H$ (0°, 50%) was 644 nm, the wavelength $\lambda^H$ (40°, 50%) was 640 nm, and the absolute value $|\Delta\lambda^H$ (50%)$|$ of the difference between these wavelengths was 4 nm. The wavelength $\lambda^H$ (0°, 20%) was 676 nm, the wavelength $\lambda^H$ (40°, 20%) was 663 nm, and the absolute value $|\Delta\lambda^H$ (20%)$|$ of the difference between these wavelengths was 13 nm.

Example 3

(First Laminate)

Figure 14:
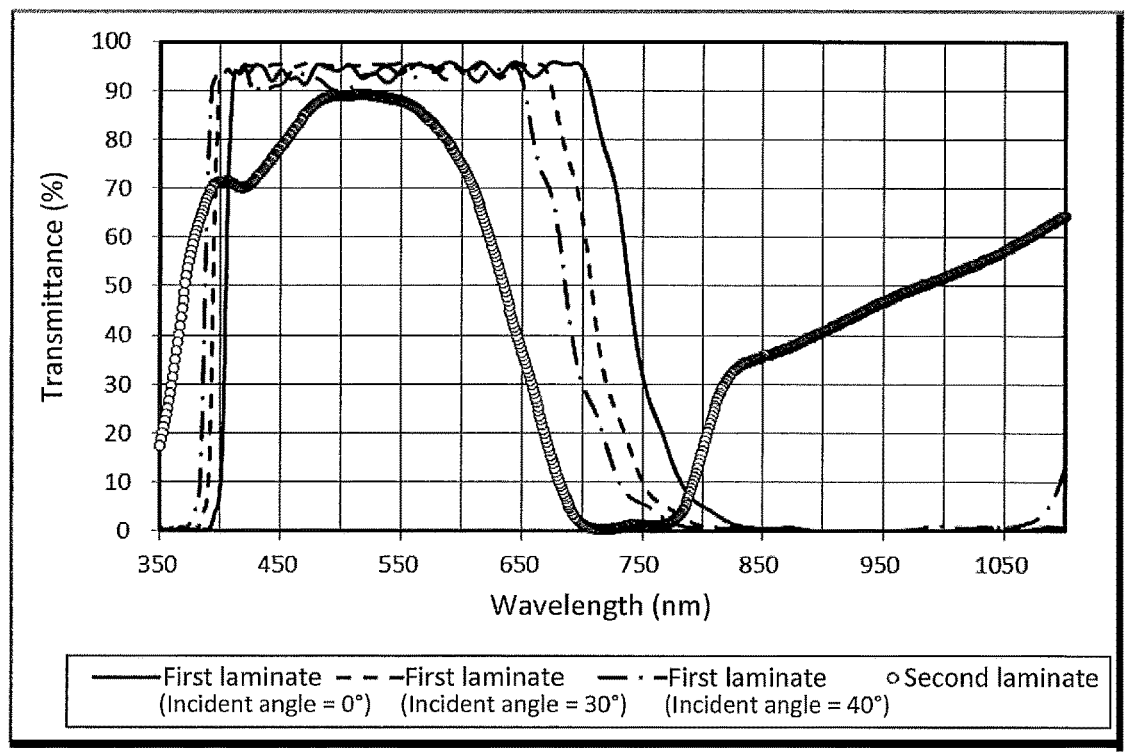
FIG. 14 is a graph showing the spectral transmittance of a first laminate and a second laminate according to Example 3.

A near-infrared reflecting film R3 composed of alternately arranged $SiO_2$ films and $TiO_2$ films and different from the near-infrared reflecting films R1 and R2 described in Examples 1 and 2 was formed by vapor deposition on one principal surface of a transparent glass substrate made of borosilicate glass and having a thickness of 0.21 mm. In this manner, a first laminate according to Example 3 was produced. The thickness of the near-infrared reflecting film R3 of the first laminate according to Example 3 was 6 μm. The near-infrared reflecting film R3 of the first laminate according to Example 3 included 20 $SiO_2$ films and 20 $TiO_2$ films. For the first laminate according to Example 3, the spectral transmittance in the wavelength range of 350 to 1100 nm was measured in the same manner as in Example 1. The transmittance spectra obtained are shown in FIG. 14.

The average of the spectral transmittance of the first laminate according to Example 3 in the wavelength range of 450 to 600 nm was more than 80% for all of the incident angles. For the transmittance spectra of the first laminate according to Example 3, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 1. For the transmittance spectra of the first laminate according to Example 3, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 1.

(Second Laminate)

A coating liquid b1 containing fine copper phenylphosphonate particles was applied to one principal surface of a transparent glass substrate made of borosilicate glass and having a thickness of 0.21 mm (manufactured by SCHOTT AG under the product name "D 263"). The film of the applied liquid was dried and hardened to form an absorbing film B1 (second absorbing film).

The coating liquid b1 was prepared as follows. First, 1.1 g of copper acetate monohydrate and 60 g of tetrahydrofuran (THF) were mixed, and the mixture was stirred for 3 hours to obtain a copper acetate solution. Next, 2.3 g of PLYSURF A208F (manufactured by DKS Co., Ltd.) was added to the obtained copper acetate solution, which was stirred for 30 minutes to obtain a liquid b11. A liquid b12 was also obtained by addition of 10 g of THF to 0.6 g of phenylphosphonic acid (manufactured by Tokyo Chemical Industry Co., Ltd.) followed by stirring for 30 minutes. Next, the liquid b12 was added to the liquid b11 while the liquid b11 was stirred, and the mixed liquid was stirred at room temperature for 1 minute. To the resulting solution was then added 45 g of toluene, and the solution was stirred at room temperature for 1 minute to obtain a liquid b13. This liquid b13 was placed in a flask and subjected to solvent removal using a rotary evaporator (manufactured by Tokyo Rikakikai Co. Ltd. under the model number "N-1110SF") for 25 minutes under heating by an oil bath (manufactured by Tokyo Rikakikai Co. Ltd. under the model number "OSB-2100"). The temperature of the oil bath was set to 120° C. After that, the solution subjected to the solvent removal was taken out of the flask. An amount of 4.4 g of silicone resin (manufactured by Shin-Etsu Chemical Co., Ltd. under the product name "KR-300") was added to the solution, which was stirred at room temperature for 30 minutes to obtain the coating liquid b1.

The coating liquid b1 thus obtained was applied to one principal surface of the transparent glass substrate by die coating. Next, the transparent glass substrate with an undried film of the coating liquid b1 was placed in an oven, and the film was heat-treated at 85° C. for 3 hours, then at 125° C. for 3 hours, then at 150° C. for 1 hour, and then at 170° C. for 3 hours. The film was thus hardened to form an absorbing film B1 (second absorbing film). The thickness of the absorbing film B1 as the second absorbing film was 50 μm. Next, the coating liquid a2 as used in Example 2 was applied by spin coating onto the absorbing film B1 as the second absorbing film to form a film. This film was exposed to a 140° C. environment for 0.5 hours, and thus dried and hardened to form an absorbing film A2 (first absorbing film). The thickness of the absorbing film A2 was 3 μm. In this manner, a second laminate according to Example 3 was produced. That is, the absorbing film of the second laminate according to Example 3 included the absorbing film B1 (second absorbing film) with a thickness of 50 μm and the absorbing film A2 (first absorbing film) with a thickness of 3 μm.

For the second laminate according to Example 3, the spectral transmittance in the wavelength range of 350 to 1100 nm was measured in the same manner as in Example 1. In this measurement, light was incident on the second laminate according to Example 3 at incident angles of 0°, 30°, and 40°, and substantially identical transmittance spectra were obtained for all of the incident angles. The transmittance spectrum obtained when the incident angle was 0° is shown in FIG. 14. As shown in FIG. 14, the average of the spectral transmittance of the second laminate according to Example 3 in the wavelength range of 450 to 600 nm was more than 75%. The transmittance spectra of the second laminate according to Example 3 had a broad absorption peak extending over the wavelength range of about 700 to about 770 nm. The second laminate according to Example 3 had an absorption peak at a wavelength of about 410 nm.

For the transmittance spectra of the second laminate according to Example 3, the specified wavelengths in the wavelength range of 600 to 800 nm and the specified wavelengths in the wavelength range of 350 to 450 nm are shown in Table 1. For the transmittance spectra of the second laminate according to Example 3, transmittances at a wavelength of 727 nm ($=\lambda^H_R$ (0°, 70%)), a wavelength of 738 nm ($=\lambda^H_R$ (0°, 50%)), a wavelength of 766 nm ($=\lambda^H_R$ (0°, 20%)), a wavelength of 672 nm ($=\lambda^H_R$ (40°, 70%)), a wavelength of 685 nm ($=\lambda^H_R$ (40°, 50%)), a wavelength of 717 nm ($=\lambda^H_R$ (40°, 20%)), a wavelength of 406 nm ($=\lambda^L_R$ (0°, 70%)), a wavelength of 405 nm ($=\lambda^L_R$ (0°, 50%)), a wavelength of 402 nm ($=\lambda^L_R$ (0°, 20%)), a wavelength of 389 nm ($=\lambda^L_R$ (40°, 70%)), a wavelength of 387 nm ($=\lambda^L_R$ (40°, 50%)), and a wavelength of 385 nm ($=\lambda^L_R$ (40°, 20%)) are shown in Table 1.

(Infrared-Cut Filter)

Figure 15:
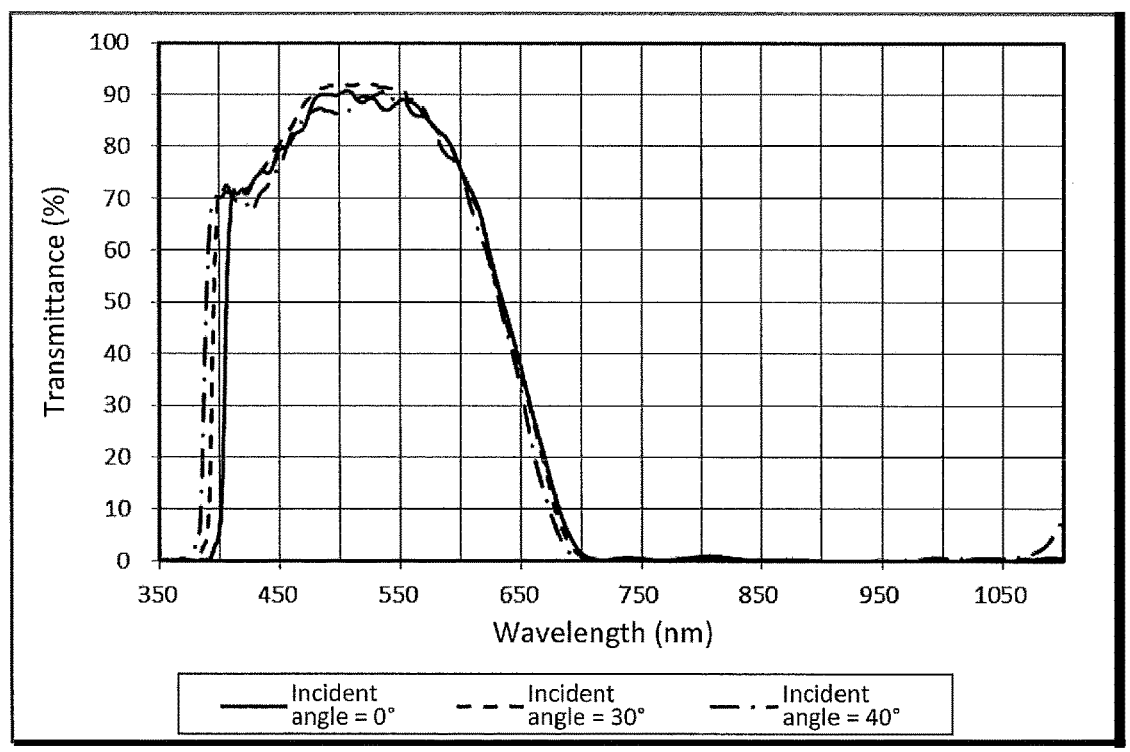
FIG. 15 is a graph showing the spectral transmittance of an infrared-cut filter according to Example 3.

An absorbing film including the absorbing film A2 (first absorbing film) and absorbing film B1 (second absorbing film) was formed, in the same manner as in production of the second laminate, on that principal surface of the transparent glass substrate of the first laminate according to Example 3 on which the near-infrared reflecting film was not formed. For the infrared-cut filter according to Example 3, the spectral transmittance in the wavelength range of 350 to 1100 nm was measured in the same manner as in Example 1. The transmittance spectra obtained are shown in FIG. 15.

For the transmittance spectra of the infrared-cut filter according to Example 3, as shown in Table 4, the wavelength $\lambda^H$ (0°, 70%) was 612 nm, the wavelength $\lambda^H$ (40°, 70%) was 607 nm, and the absolute value $|\Delta\lambda^H$ (70%)$|$ of the difference between these wavelengths was 5 nm. The wavelength $\lambda^H$ (0°, 50%) was 635 nm, the wavelength $\lambda^H$ (40°, 50%) was 632 nm, and the absolute value $|\Delta\lambda^H$ (50%)$|$ of the difference between these wavelengths was 3 nm. The wavelength $\lambda^H$ (0°, 20%) was 669 nm, the wavelength $\lambda^H$ (40°, 20%) was 661 nm, and the absolute value $|\Delta\lambda^H$ (20%)$|$ of the difference between these wavelengths was 8 nm.

Example 4

(First Laminate)

Figure 16:
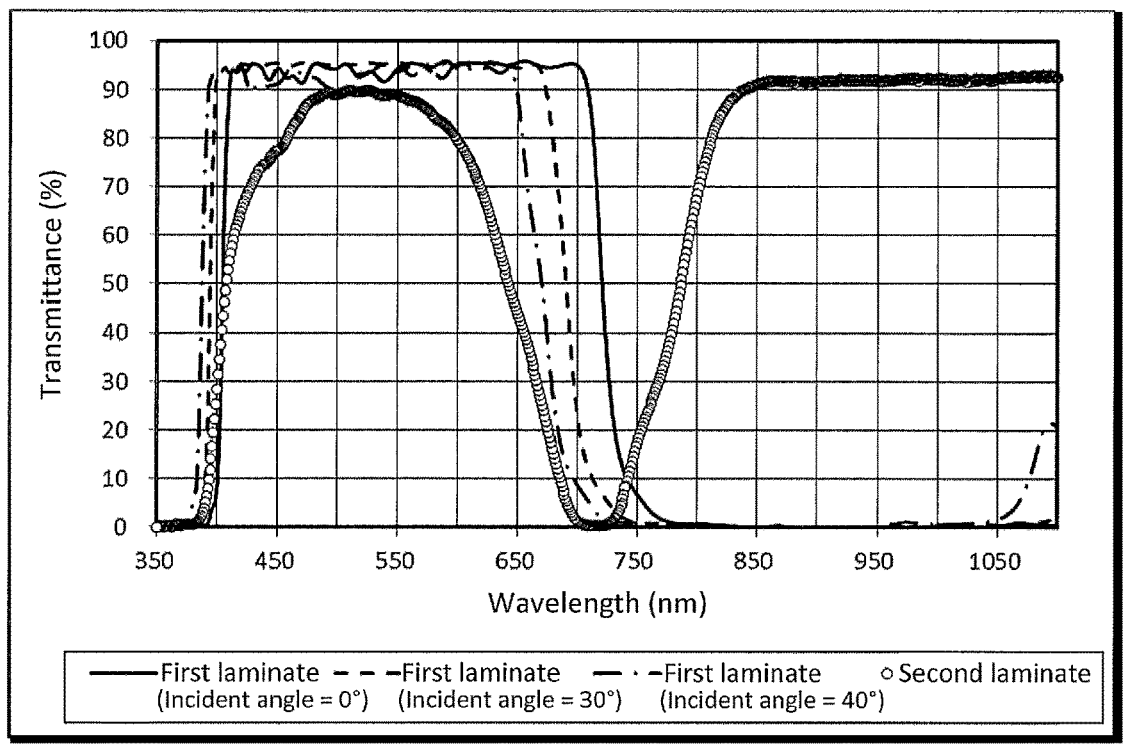
FIG. 16 is a graph showing the spectral transmittance of a first laminate and a second laminate according to Example 4.

A near-infrared reflecting film R2 composed of alternately arranged SiO$_2$ films and TiO$_2$ films and identical to the near-infrared reflecting film according to Example 2 was formed by vapor deposition on one principal surface of a transparent glass substrate made of borosilicate glass and having a thickness of 0.21 mm (manufactured by SCHOTT AG under the product name "D 263"). In this manner, a first laminate according to Example 4 was produced. For the first laminate according to Example 4, the spectral transmittance in the wavelength range of 350 to 1100 nm was measured in the same manner as in Example 1. The transmittance spectra obtained are shown in FIG. 16. The transmittance spectra obtained for the first laminate according to Example 4 were identical to the transmittance spectra obtained for the first laminate according to Example 2.

(Second Laminate)

Figure 56:
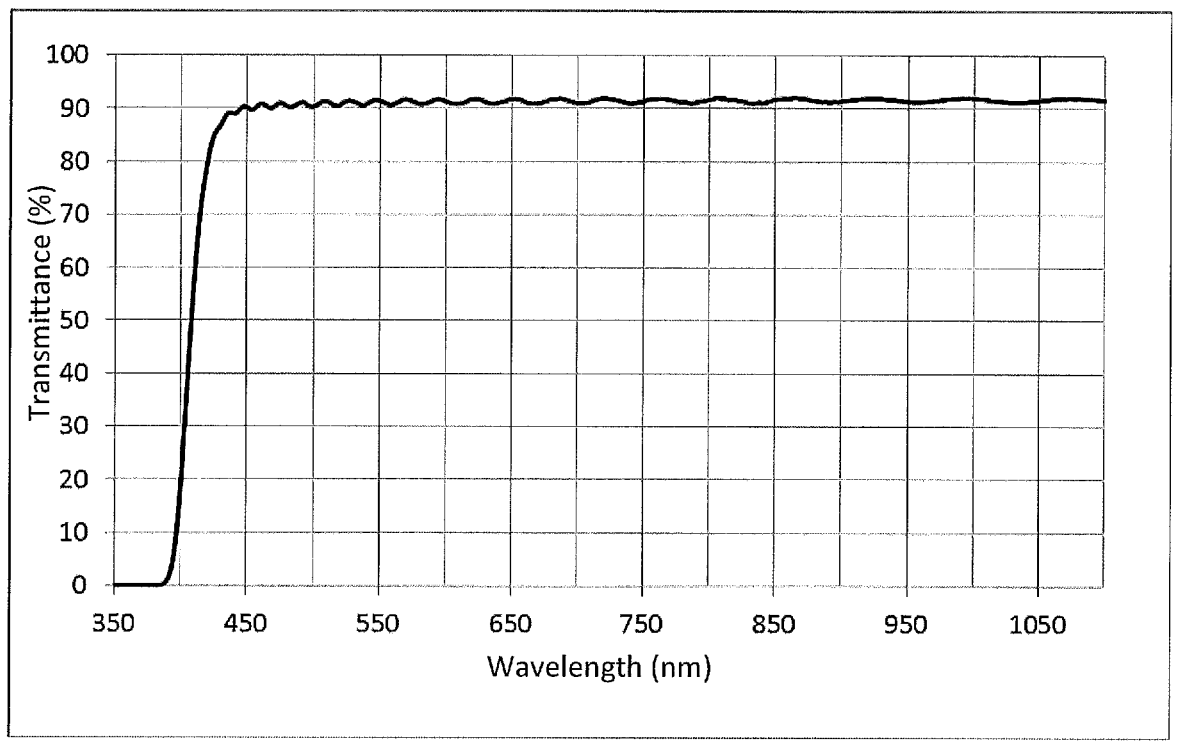
FIG. 56 is a graph showing the spectral transmittance of a laminate composed of an absorbing film containing only an ultraviolet-absorbing substance and a transparent dielectric substrate.

An absorbing substance composed of a combination of organic dyes having an absorption peak in the wavelength range of 700 to 750 nm, having low absorption in the visible region, and soluble in methyl ethyl ketone (MEK) was used in combination with an ultraviolet-absorbing substance composed of a benzophenone-based ultraviolet-absorbing substance having low absorption in the visible region and soluble in methyl ethyl ketone (MEK). The combination of organic dyes was the same as the combination of organic dyes contained in the absorbing film of Example 2. MEK was used as a solvent, and PVB was added in a solid content ratio of 99 wt %. The mixing was followed by stirring for 2 hours to obtain a coating liquid a3. The benzophenone-based ultraviolet-absorbing substance used for preparation of the coating liquid a3 had characteristics such that the spectral transmittance of an ultraviolet-absorbing film produced by embedding the benzophenone-based ultraviolet-absorbing substance alone in polyvinyl butyral increases from 10% or less to 70% or more in the wavelength range of 350 to 450 nm. The transmittance spectrum of the ultraviolet-absorbing film is shown in FIG. 56.

The amounts and proportions of the organic dyes and benzophenone-based ultraviolet-absorbing substance in the coating liquid a3 were set so that the characteristic spectrum as shown in FIG. 16 for a second laminate would be obtained when the spectral characteristics were measured after the coating liquid a3 was formed into a film. This coating liquid a3 was applied by spin coating to one principal surface of a transparent glass substrate made of borosilicate glass and having a thickness of 0.21 mm (manufactured by SCHOTT AG under the product name "D 263"), and a film was thus formed. This film was exposed to a 140° C. environment for 0.5 hours, and thus dried and hardened to form an absorbing film A3. In this manner, a second laminate according to Example 4 was produced. The thickness of the absorbing film A3 was 3 μm.

For the second laminate according to Example 4, the spectral transmittance in the wavelength range of 350 to 1100 nm was measured in the same manner as in Example 1. In this measurement, light was incident on the second laminate according to Example 4 at incident angles of 0°, 30°, and 40°, and substantially identical transmittance spectra were obtained for all of the incident angles. The transmittance spectrum obtained when the incident angle was 0° is shown in FIG. 16. As shown in FIG. 16, the average of the spectral transmittance of the second laminate according to Example 4 in the wavelength range of 450 to 600 nm was more than 75%. The transmittance spectra of the second laminate according to Example 4 had an absorption peak at a wavelength of about 710 nm. The transmittance spectra of the second laminate according to Example 4 had characteristics such that the spectral transmittance decreases from 70% to 10% or less in the wavelength range of 350 to 450 nm.

For the transmittance spectra of the second laminate according to Example 4, the specified wavelengths in the wavelength range of 600 to 800 nm and the specified wavelengths in the wavelength range of 350 to 450 nm are shown in Table 1. For the transmittance spectra of the second laminate according to Example 4, transmittances at a wavelength of 715 nm ($=\lambda^H_R$ (0°, 70%)), a wavelength of 720 nm ($=\lambda^H_R$ (0°, 50%)), a wavelength of 731 nm ($=\lambda^H_R$ (0°, 20%)), a wavelength of 658 nm ($=\lambda^H_R$ (40°, 70%)), a wavelength of 670 nm ($=\lambda^H_R$ (40°, 50%)), a wavelength of 684 nm ($=\lambda^H_R$ (40°, 20%)), a wavelength of 406 nm ($=\lambda^L_R$ (0°, 70%)), a wavelength of 405 nm ($=\lambda^L_R$ (0°, 50%)), a wavelength of 402 nm ($=\lambda^L_R$ (0°, 20%)), a wavelength of 389 nm ($=\lambda^L_R$ (40°, 70%)), a wavelength of 387 nm (=$\lambda^L_R$ (40°, 50%)), and a wavelength of 385 nm (=$\lambda^L_R$ (40°, 20%)) are shown in Table 1.

(Infrared-Cut Filter)

Figure 17:
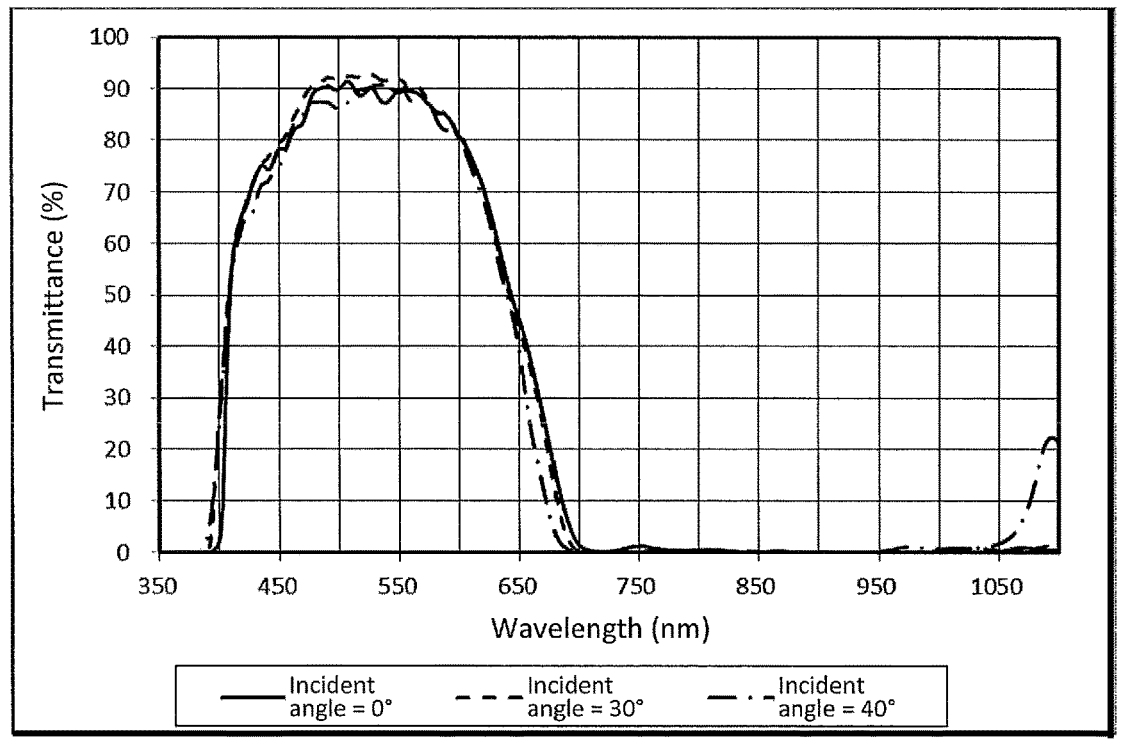
FIG. 17 is a graph showing the spectral transmittance of an infrared-cut filter according to Example 4.

An absorbing film A3 was formed, in the same manner as in production of the second laminate, on that principal surface of the transparent glass substrate of the first laminate according to Example 4 on which the near-infrared reflecting film R2 was not formed. An infrared-cut filter according to Example 4 was thus obtained. For the infrared-cut filter according to Example 4, the spectral transmittance in the wavelength range of 350 to 1100 nm was measured in the same manner as in Example 1. The transmittance spectra obtained are shown in FIG. 17.

For the transmittance spectra of the infrared-cut filter according to Example 4, as shown in Table 4, the wavelength $\lambda^H$ (0°, 70%) was 621 nm, the wavelength $\lambda^H$ (40°, 70%) was 620 nm, and the absolute value |$\Delta\lambda^H$ (70%)| of the difference between these wavelengths was 1 nm. The wavelength $\lambda^H$ (0°, 50%) was 643 nm, the wavelength $\lambda^H$ (40°, 50%) was 642 nm, and the absolute value |$\Delta\lambda^H$ (50%)| of the difference between these wavelengths was 1 nm. The wavelength $\lambda^H$ (0°, 20%) was 676 nm, the wavelength $\lambda^H$ (40°, 20%) was 663 nm, and the absolute value |$\Delta\lambda^H$ (20%)| of the difference between these wavelengths was 13 nm. For a transmittance spectrum obtained when the angle of light incident on the infrared-cut filter was W°, a wavelength which is in the wavelength range of 350 to 450 nm and at which the transmittance is Z % is defined as $\lambda^L$ (W°, Z %). As shown in Table 4, the wavelength $\lambda^L$ (0°, 70%) was 426 nm, and the wavelength $\lambda^L$ (40°, 70%) was 433 nm. When the absolute value of the difference between these wavelengths is defined as |$\Delta\lambda^L$ (70%)|, |$\Delta\lambda^L$ (70%)| was 7 nm. The wavelength $\lambda^L$ (0°, 50%) was 409 nm, and the wavelength $\lambda^L$ (40°, 50%) was 408 nm. When the absolute value of the difference between these wavelengths is defined as |$\Delta\lambda^L$ (50%)|, |$\Delta\lambda^L$ (50%)| was 1 nm. The wavelength $\lambda^L$ (0°, 20%) was 404 nm, and the wavelength $\lambda^L$ (40°, 20%) was 398 nm. When the absolute value of the difference between these wavelengths is defined as |$\Delta\lambda^L$ (20%)|, |$\Delta\lambda^L$ (20%)| was 6 nm.

Example 5

(First Laminate)

Figure 18:
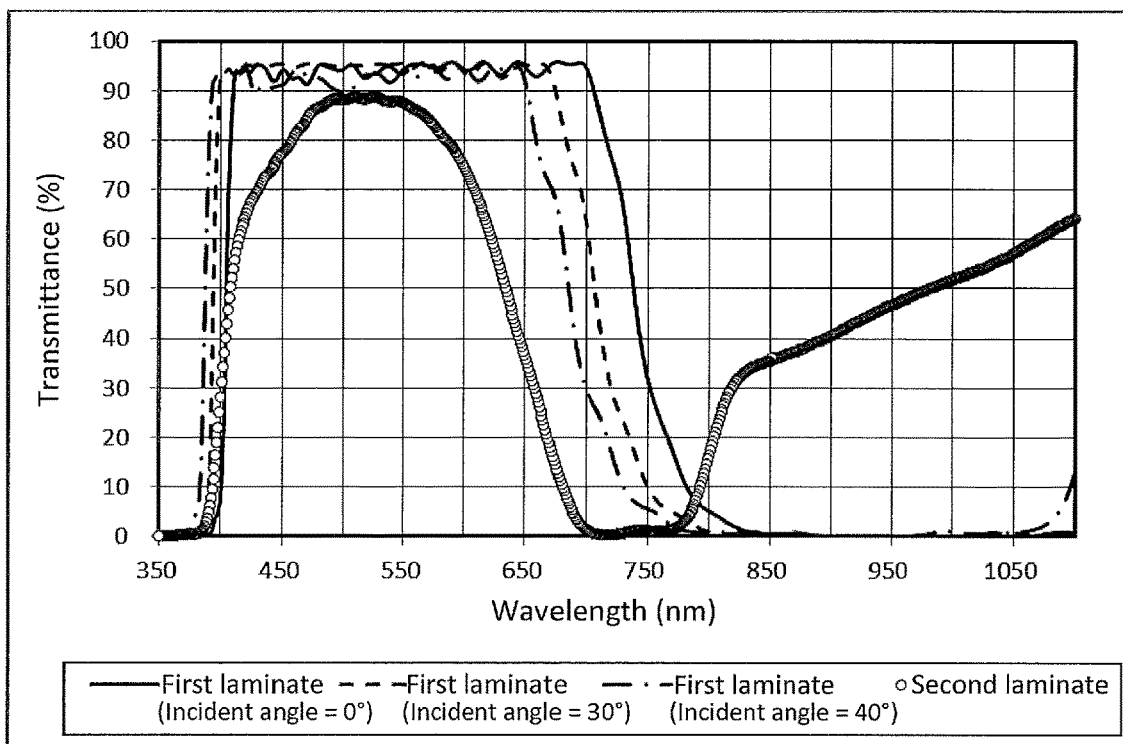
FIG. 18 is a graph showing the spectral transmittance of a first laminate and a second laminate according to Example 5.

A near-infrared reflecting film R4 composed of alternately arranged $SiO_2$ films and $TiO_2$ films and different from the near-infrared reflecting films R1 to R3 described in Examples 1 to 4 was formed by vapor deposition on one principal surface of a transparent glass substrate made of borosilicate glass and having a thickness of 0.21 mm (manufactured by SCHOTT AG under the product name "D 263"). In this manner, a first laminate according to Example 5 was produced. The thickness of the near-infrared reflecting film of the first laminate according to Example 5 was 6 μm. The near-infrared reflecting film R4 of the first laminate according to Example 5 included 20 $SiO_2$ films and 20 $TiO_2$ films. For the first laminate according to Example 5, the spectral transmittance in the wavelength range of 350 to 1100 nm was measured in the same manner as in Example 1. The transmittance spectra obtained are shown in FIG. 18.

In the transmittance spectra of the first laminate according to Example 5, the average of the spectral transmittance in the wavelength range of 450 to 600 nm was more than 80% for all of the incident angles. For the transmittance spectra of the first laminate according to Example 5, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 2. For the transmittance spectra of the first laminate according to Example 5, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 2.

(Second Laminate)

The coating liquid b1 as used in Example 3 was applied by die coating to one principal surface of a transparent glass substrate made of borosilicate glass and having a thickness of 0.21 mm (manufactured by SCHOTT AG under the product name "D 263"), and a film was thus formed. This film was heat-treated at 85° C. for 3 hours, then at 125° C. for 3 hours, then at 150° C. for 1 hour, and then at 170° C. for 3 hours to form an absorbing film B1 as in Example 3. The thickness of the absorbing film B1 was 50 μm. In this manner, an absorbing film B1 as the second absorbing film of the second laminate according to Example 5 was produced. Next, the coating liquid a3 as used in Example 4 was applied by spin coating onto the absorbing film B1 to form a film. This film was exposed to a 140° C. environment for 0.5 hours, and thus dried and hardened to form an absorbing film A3 as in Example 4. In this manner, an absorbing film A3 as the first absorbing film of the second laminate according to Example 5 was produced. The thickness of the absorbing film A3 was 3 μm. In this manner, the second laminate according to Example 5 was produced. That is, the absorbing film of the second laminate according to Example 5 included the absorbing film B1 (second absorbing film) with a thickness of 50 μm and the absorbing film A3 (first absorbing film) with a thickness of 3 μm.

For the second laminate according to Example 5, the spectral transmittance in the wavelength range of 350 to 1100 nm was measured in the same manner as in Example 1. In this measurement, light was incident on the second laminate according to Example 5 at incident angles of 0°, 30°, and 40°, and substantially identical transmittance spectra were obtained for all of the incident angles. The transmittance spectrum obtained when the incident angle was 0° is shown in FIG. 18. As shown in FIG. 18, the average of the spectral transmittance of the second laminate according to Example 5 in the wavelength range of 450 to 600 nm was more than 75%. The transmittance spectra of the second laminate according to Example 5 had a broad absorption peak extending over the wavelength range of about 700 to about 770 nm. The transmittance spectra of the second laminate according to Example 5 had characteristics such that the spectral transmittance increases from 10% or less to 70% or more in the wavelength range of 350 to 450 nm.

For the transmittance spectra of the second laminate according to Example 5, the specified wavelengths in the wavelength range of 600 to 800 nm and the specified wavelengths in the wavelength range of 350 to 450 nm are shown in Table 2. For the transmittance spectra of the second laminate according to Example 5, transmittances at a wavelength of 727 nm (=$\lambda^H_R$ (0°, 70%)), a wavelength of 738 nm (=$\lambda^H_R$ (0°, 50%)), a wavelength of 766 nm (=$\lambda^H_R$ (0°, 20%)), a wavelength of 672 nm (=$\lambda^H_R$ (40°, 70%)), a wavelength of 685 nm (=$\lambda^H_R$ (40°, 50%)), a wavelength of 717 nm (=$\lambda^H_R$ (40°, 20%)), a wavelength of 406 nm (=$\lambda^L_R$ (0°, 70%)), a wavelength of 405 nm (=$\lambda^L_R$ (0°, 50%)), a wavelength of 402 nm (=$\lambda^L_R$ (0°, 20%)), a wavelength of 389 nm (=$\lambda^L_R$ (40°, 70%)), a wavelength of 387 nm (=$\lambda^L_R$ (40°, 50%)), and a wavelength of 385 nm (=$\lambda^L_R$ (40°, 20%)) are shown in Table 2.

(Infrared-Cut Filter)

Figure 19:
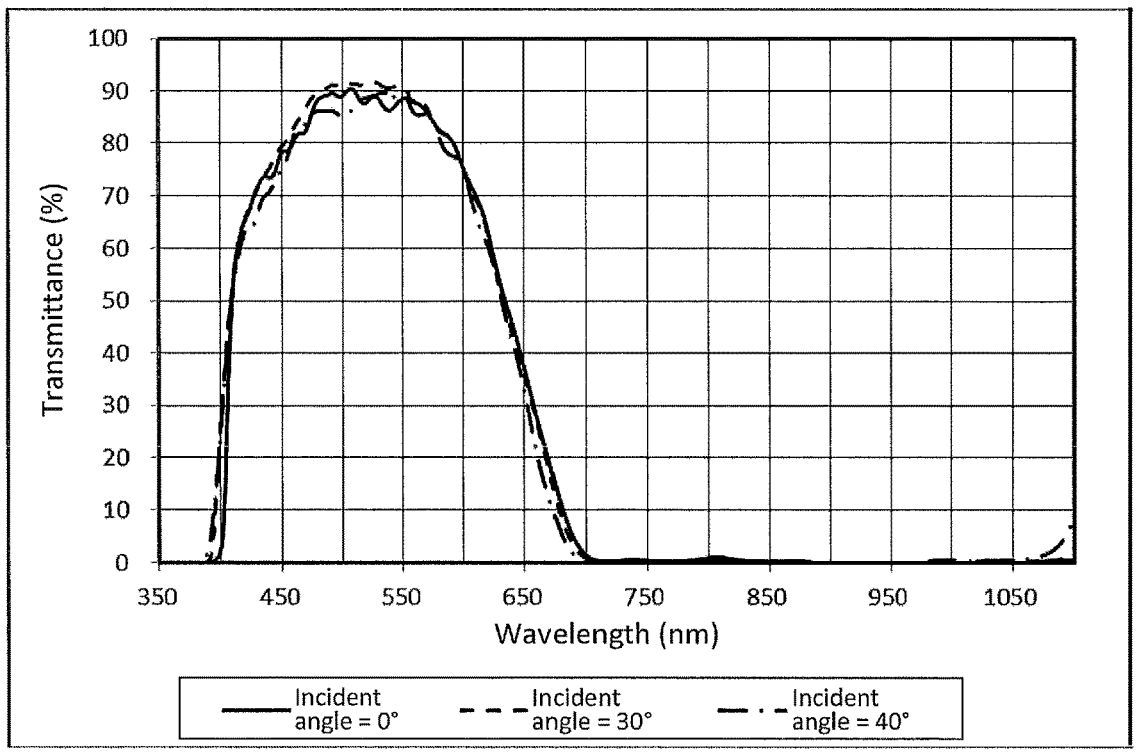
FIG. 19 is a graph showing the spectral transmittance of an infrared-cut filter according to Example 5.

An absorbing film composed of the absorbing film A3 (first absorbing film) and absorbing film B1 (second absorbing film) was formed, in the same manner as in production of the second laminate, on that principal surface of the transparent glass substrate of the first laminate according to Example 5 on which the near-infrared reflecting film R4 was not formed. For the infrared-cut filter according to Example 5, the spectral transmittance in the wavelength range of 350 to 1100 nm was measured in the same manner as in Example 1. The transmittance spectra obtained are shown in FIG. 19.

For the transmittance spectra of the infrared-cut filter according to Example 5, as shown in Table 5, the wavelength $\lambda^H$ (0°, 70%) was 611 nm, the wavelength $\lambda^H$ (40°, 70%) was 606 nm, and the absolute value $|\Delta\lambda^H (70\%)|$ of the difference between these wavelengths was 5 nm. The wavelength $\lambda^H$ (0°, 50%) was 634 nm, the wavelength $\lambda^H$ (40°, 50%) was 632 nm, and the absolute value $|\Delta\lambda^H (50\%)|$ of the difference between these wavelengths was 2 nm. The wavelength $\lambda^H$ (0°, 20%) was 669 nm, the wavelength $\lambda^H$ (40°, 20%) was 661 nm, and the absolute value $|\Delta\lambda^H (20\%)|$ of the difference between these wavelengths was 8 nm. For the transmittance spectra of the infrared-cut filter according to Example 5, as shown in Table 5, the wavelength $\lambda^L$ (0°, 70%) was 427 nm, the wavelength $\lambda^L$ (40°, 70%) was 436 nm, and the absolute value $|\Delta\lambda^L (70\%)|$ of the difference between these wavelengths was 9 nm. The wavelength $\lambda^L$ (0°, 50%) was 409 nm, the wavelength $\lambda^L$ (40°, 50%) was 409 nm, and the absolute value $|\Delta\lambda^L (50\%)|$ of the difference between these wavelengths was 0 nm. The wavelength $\lambda^L$ (0°, 20%) was 404 nm, the wavelength $\lambda^L$ (40°, 20%) was 398 nm, and the absolute value $|\Delta\lambda^L (20\%)|$ of the difference between these wavelengths was 6 nm.

Example 6

(First Laminate)

Figure 20:
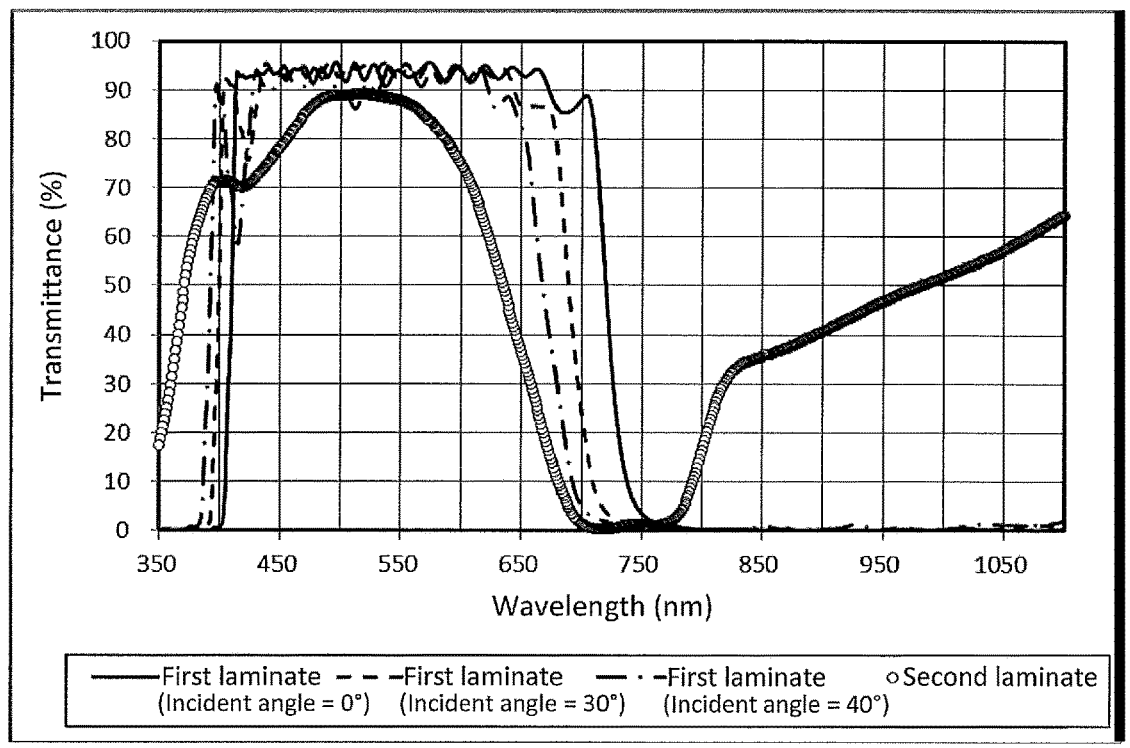
FIG. 20 is a graph showing the spectral transmittance of a first laminate and a second laminate according to Example 6.

A near-infrared reflecting film R5 composed of alternately arranged $SiO_2$ films and $TiO_2$ films and different from the near-infrared reflecting films R1 to R4 described in Examples 1 to 5 was formed by vapor deposition on one principal surface of a transparent glass substrate made of borosilicate glass and having a thickness of 0.21 mm (manufactured by SCHOTT AG under the product name "D 263"). In this manner, a first laminate according to Example 6 was produced. The thickness of the near-infrared reflecting film R5 of the first laminate according to Example 6 was 5.5 μm. The near-infrared reflecting film of the first laminate according to Example 6 included 18 $SiO_2$ films and 18 $TiO_2$ films. For the first laminate according to Example 6, the spectral transmittance in the wavelength range of 350 to 1100 nm was measured in the same manner as in Example 1. The transmittance spectra obtained are shown in FIG. 20.

In the transmittance spectra of the first laminate according to Example 6, the average of the spectral transmittance in the wavelength range of 450 to 600 nm was more than 80% for all of the incident angles. In the transmittance spectrum obtained for the first laminate according to Example 6 when the incident angle was 30°, the spectral transmittance had a minimum of about 71% at a wavelength of about 422 nm. Assuming that the baseline of this transmittance spectrum was at a spectral transmittance of 93%, the downward-convex portion containing the minimum had a spectral transmittance lowered by 15 or more points from the baseline and had a half-width of about 14 nm. In the transmittance spectrum obtained for the first laminate according to Example 6 when the incident angle was 40°, the spectral transmittance had a minimum of about 55% at a wavelength of about 415 nm. Likewise, assuming that the baseline of this transmittance spectrum was at a spectral transmittance of 93%, the downward-convex portion containing the minimum had a spectral transmittance lowered by 30 or more points from the baseline and had a half-width of about 16 nm.

For the transmittance spectra of the first laminate according to Example 6, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 2. For the transmittance spectra of the first laminate according to Example 6, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 2.

(Second laminate)

The coating liquid b1 as used in Example 3 was applied by die coating to one principal surface of a transparent glass substrate made of borosilicate glass and having a thickness of 0.21 mm (manufactured by SCHOTT AG under the product name "D 263"), and a film was thus formed. This film was heat-treated at 85° C. for 3 hours, then at 125° C. for 3 hours, then at 150° C. for 1 hour, and then at 170° C. for 3 hours to form an absorbing film B1 as in Example 3. The thickness of the absorbing film B1 was 50 In this manner, an absorbing film B1 as the second absorbing film of the second laminate according to Example 6 was produced. Next, the coating liquid a2 as used in Example 2 was applied by spin coating onto the absorbing film B1 to form a film. This film was exposed to a 140° C. environment for 0.5 hours, and thus dried and hardened to form an absorbing film A2 as in Example 2. In this manner, an absorbing film A2 as the first absorbing film of the second laminate according to Example 6 was produced. The thickness of the absorbing film A2 was 3 In this manner, the second laminate according to Example 6 was produced. That is, the absorbing film of the second laminate according to Example 6 included the absorbing film B1 (second absorbing film) with a thickness of 50 μm and the absorbing film A3 (first absorbing film) with a thickness of 3 and was identical to the absorbing film of the second laminate according to Example 3.

For the second laminate according to Example 6, the spectral transmittance in the wavelength range of 350 to 1100 nm was measured in the same manner as in Example 1. In this measurement, light was incident on the second laminate according to Example 6 at incident angles of 0°, 30°, and 40°, and substantially identical transmittance spectra were obtained for all of the incident angles. The transmittance spectra obtained were identical to those of the second laminate according to Example 3. The transmittance spectrum obtained when the incident angle was 0° is shown in FIG. 20. As shown in FIG. 20, the average of the spectral transmittance of the second laminate according to Example 6 in the wavelength range of 450 to 600 nm was more than 75%. The transmittance spectra of the second laminate according to Example 6 had a broad absorption peak extending over the wavelength range of about 700 to about 770 nm. The transmittance spectra of the second laminate according to Example 6 had an absorption peak at a wavelength of about 410 nm. For the transmittance spectra of the second laminate according to Example 6, the specified wavelengths in the wavelength range of 600 to 800 nm, and the specified wavelengths in the wavelength range of 350 to 450 nm are shown in Table 2. For the transmittance spectra of the second laminate according to Example 6, transmittances at a wavelength of 714 nm ($=\lambda^H_R$ (0°, 70%)), a wavelength of 720 nm ($=\lambda^H_R$ (0°, 50%)), a wavelength of 730 nm ($=\lambda^H_R$ (0°, 20%)), a wavelength of 659 nm ($=\lambda^H_R$ (40°, 70%)), a wavelength of 668 nm ($=\lambda^H_R$ (40°, 50%)), a wavelength of 685 nm ($=\lambda^H_R$ (40°, 20%)), a wavelength of 411 nm ($=\lambda^L_R$ (0°, 70%)), a wavelength of 410 nm (=$\lambda^L_R$ (0°, 50%)), a wavelength of 406 nm (=$\lambda^L_R$ (0°, 20%)), a wavelength of 394 nm (=$\lambda^L_R$ (40°, 70%)), a wavelength of 392 nm (=$\lambda^L_R$ (40°, 50%)), and a wavelength of 388 nm (=$\lambda^L_R$ (40°, 20%)) are shown in Table 2.

(Infrared-Cut Filter)

Figure 21:
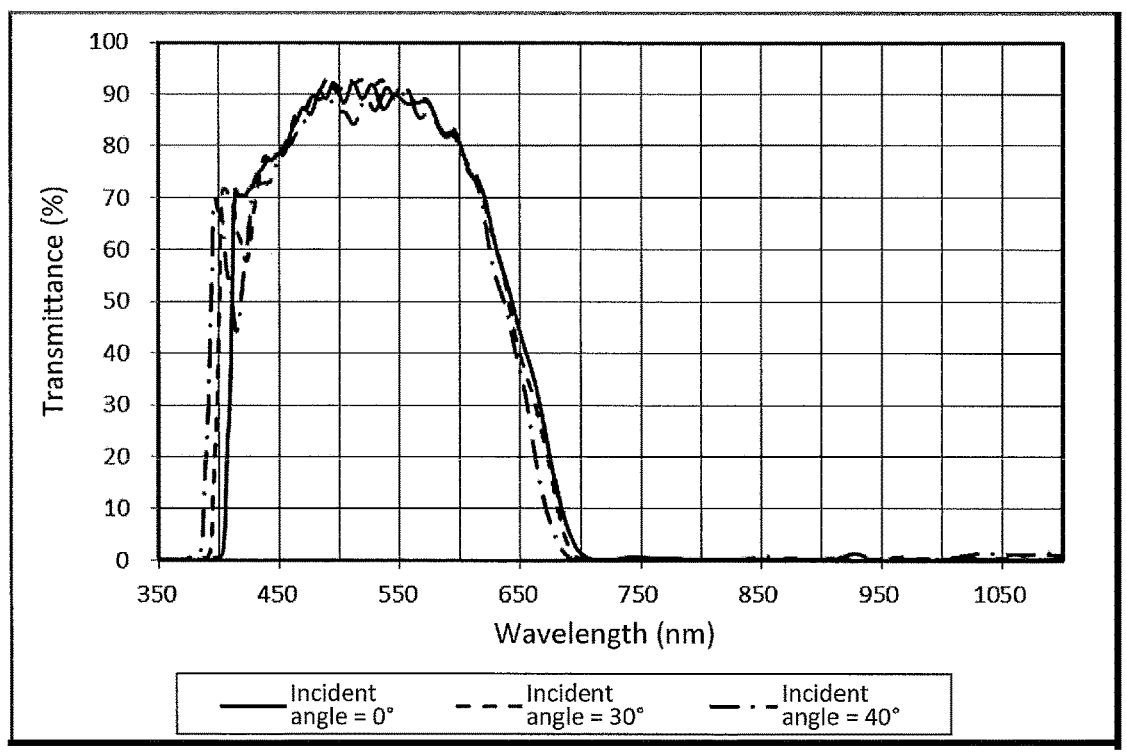
FIG. 21 is a graph showing the spectral transmittance of an infrared-cut filter according to Example 6.

An absorbing film composed of the absorbing film A2 (first absorbing film) and absorbing film B1 (second absorbing film) was formed, in the same manner as in production of the second laminate, on that principal surface of the transparent glass substrate of the first laminate according to Example 6 on which the near-infrared reflecting film R5 was not formed. In this manner, an infrared-cut filter according to Example 6 was produced. For the infrared-cut filter according to Example 6, the spectral transmittance in the wavelength range of 350 to 1100 nm was measured in the same manner as in Example 1. The transmittance spectra obtained are shown in FIG. 21.

For the transmittance spectra of the infrared-cut filter according to Example 6, as shown in Table 5, the wavelength $\lambda^H$ (0°, 70%) was 621 nm, the wavelength $\lambda^H$ (40°, 70%) was 617 nm, and the absolute value |$\Delta\lambda^H$ (70%)| of the difference between these wavelengths was 4 nm. The wavelength $\lambda^H$ (0°, 50%) was 643 nm, the wavelength $\lambda^H$ (40°, 50%) was 637 nm, and the absolute value |$\Delta\lambda^H$ (50%)| of the difference between these wavelengths was 6 nm. The wavelength $\lambda^H$ (0°, 20%) was 675 nm, the wavelength $\lambda^H$ (40°, 20%) was 663 nm, and the absolute value |$\Delta\lambda^H$ (20%)| of the difference between these wavelengths was 12 nm. For the transmittance spectra of the infrared-cut filter according to Example 6, the wavelength $\lambda^L$ (0°, 70%) was 413 nm, the wavelength $\lambda^L$ (40°, 70%) was 397 nm, and the absolute value |$\Delta\lambda^L$ (70%)| of the difference between these wavelengths was 16 nm. The wavelength $\lambda^L$ (0°, 50%) was 411 nm, the wavelength $\lambda^L$ (40°, 50%) was 394 nm, and the absolute value |$\Delta\lambda^L$ (50%)| of the difference between these wavelengths was 17 nm. The wavelength $\lambda^L$ (0°, 20%) was 407 nm, the wavelength $\lambda^L$ (40°, 20%) was 389 nm, and the absolute value |$\Delta\lambda^L$ (20%)| of the difference between these wavelengths was 18 nm.

Example 7

(First Laminate)

Figure 22:
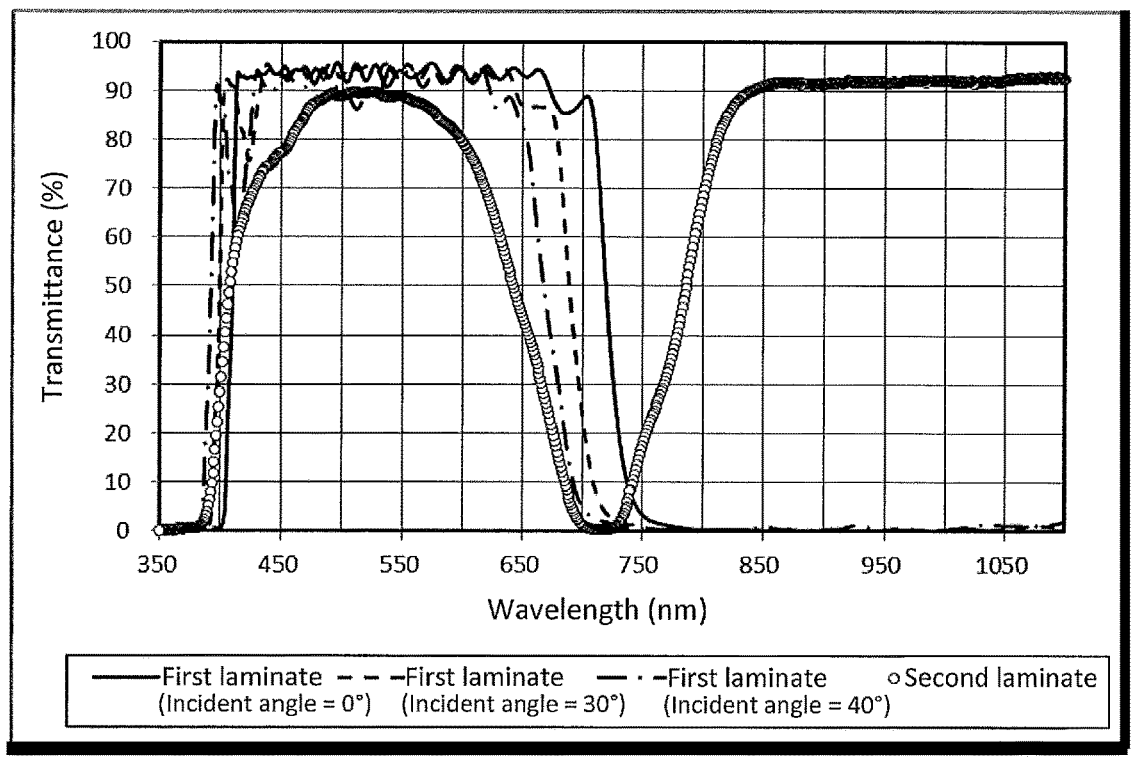
FIG. 22 is a graph showing the spectral transmittance of a first laminate and a second laminate according to Example 7.

A near-infrared reflecting film R6 composed of alternately arranged SiO$_2$ films and TiO$_2$ films and different from the near-infrared reflecting films R1 to R5 described in Examples 1 to 6 was formed by vapor deposition on one principal surface of a transparent glass substrate made of borosilicate glass and having a thickness of 0.21 mm (manufactured by SCHOTT AG under the product name "D 263"). In this manner, a first laminate according to Example 7 was produced. The thickness of the near-infrared reflecting film R6 of the first laminate according to Example 7 was 5.5 µm. The near-infrared reflecting film R6 of the first laminate according to Example 7 included 18 SiO$_2$ films and 18 TiO$_2$ films. For the first laminate according to Example 7, the spectral transmittance in the wavelength range of 350 to 1100 nm was measured in the same manner as in Example 1. The transmittance spectra obtained are shown in FIG. 22.

In the transmittance spectra of the first laminate according to Example 7, the average of the spectral transmittance in the wavelength range of 450 to 600 nm was more than 80% for all of the incident angles. In the transmittance spectrum obtained for the first laminate according to Example 7 when the incident angle was 30°, the spectral transmittance had a minimum of about 75% at a wavelength of about 425 nm. Assuming that the baseline of this transmittance spectrum was at a spectral transmittance of 93%, the downward-convex portion containing the minimum had a spectral transmittance lowered by 15 or more points from the baseline and had a half-width of about 12 nm. In the transmittance spectrum obtained for the first laminate according to Example 7 when the incident angle was 40°, the spectral transmittance had a minimum of about 58% at a wavelength of about 415 nm. Likewise, assuming that the baseline of this transmittance spectrum was at a spectral transmittance of 93%, the downward-convex portion containing the minimum had a spectral transmittance lowered by 30 or more points from the baseline and had a half-width of about 14 nm.

For the transmittance spectra of the first laminate according to Example 7, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 2. For the transmittance spectra of the first laminate according to Example 7, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 2.

(Second Laminate)

The coating liquid a3 as used in Example 4 was applied by spin coating to one principal surface of a transparent glass substrate made of borosilicate glass and having a thickness of 0.21 mm (manufactured by SCHOTT AG under the product name "D 263"), and a film was thus formed. This film was exposed to a 140° C. environment for 0.5 hours, and thus dried and hardened to form an absorbing film A3. In this manner, the absorbing film A3 of the second laminate according to Example 7 was produced. The thickness of the absorbing film A3 was 3 µm.

For the second laminate according to Example 7, the spectral transmittance in the wavelength range of 350 to 1100 nm was measured in the same manner as in Example 1. In this measurement, light was incident on the second laminate according to Example 7 at incident angles of 0°, 30°, and 40°, and substantially identical transmittance spectra were obtained for all of the incident angles. The transmittance spectra obtained were identical to those of the second laminate according to Example 4. The transmittance spectrum obtained when the incident angle was 0° is shown in FIG. 22. As shown in FIG. 22, the average of the spectral transmittance of the second laminate according to Example 7 in the wavelength range of 450 to 600 nm was more than 75%. The transmittance spectra of the second laminate according to Example 7 had an absorption peak at a wavelength of about 710 nm. The transmittance spectra of the second laminate according to Example 7 had characteristics such that the spectral transmittance increases from 10% or less to 70% or more in the wavelength range of 350 to 450 nm.

For the transmittance spectra of the second laminate according to Example 7, the specified wavelengths in the wavelength range of 600 to 800 nm and the specified wavelengths in the wavelength range of 350 to 450 nm are shown in Table 2. For the transmittance spectra of the second laminate according to Example 7, transmittances at a wavelength of 715 nm (=$\lambda^H_R$ (0°, 70%)), a wavelength of 720 nm (=$\lambda^H_R$ (0°, 50%)), a wavelength of 731 nm (=$\lambda^H_R$ (0°, 20%)), a wavelength of 659 nm (=$\lambda^H_R$ (40°, 70%)), a wavelength of 667 nm (=$\lambda^H_R$ (40°, 50%)), a wavelength of 684 nm (=$\lambda^H_R$ (40°, 20%)), a wavelength of 411 nm (=$\lambda^L_R$ (0°, 70%)), a wavelength of 409 nm (=$\lambda^L_R$ (0°, 50%)), a wavelength of 406 nm (=$\lambda^L_R$ (0°, 20%)), a wavelength of 394 nm (=$\lambda^L_R$ (40°, 70%)), a wavelength of 391 nm (=$\lambda^L_R$ (40°, 50%)), and a wavelength of 388 nm (=$\lambda^L_R$ (40°, 20%)) are shown in Table 2.

(Infrared-Cut Filter)

Figure 23:
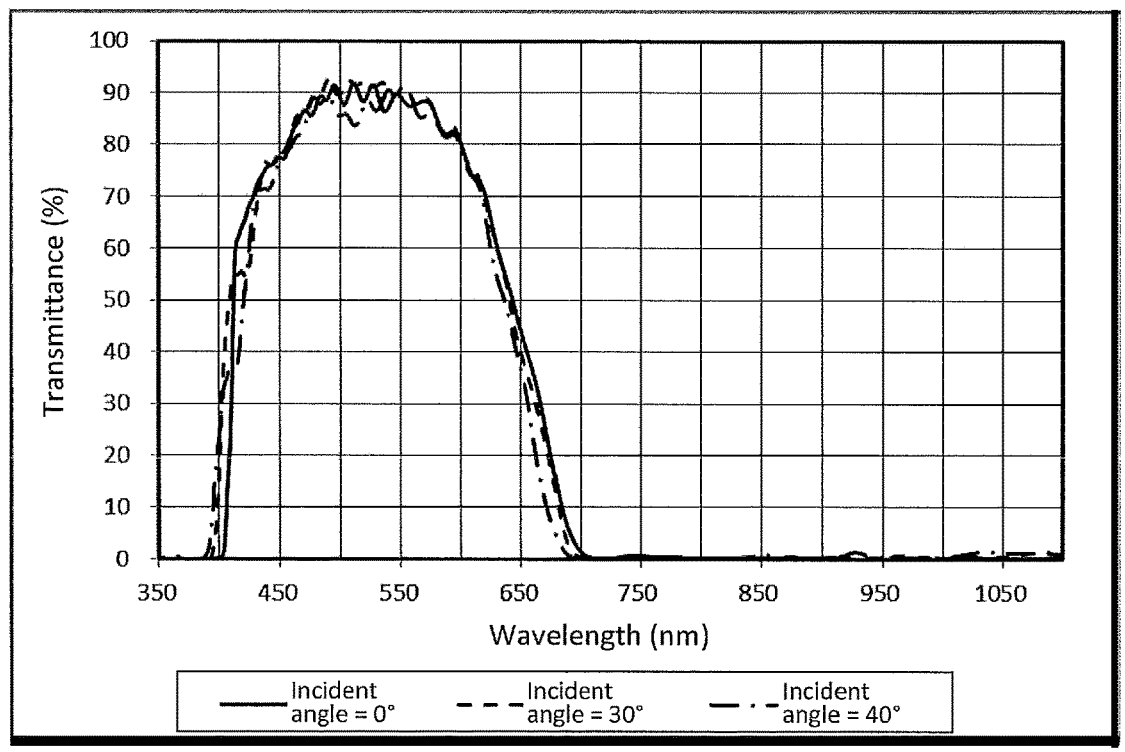
FIG. 23 is a graph showing the spectral transmittance of an infrared-cut filter according to Example 7.

An absorbing film A3 was formed, in the same manner as in production of the second laminate, on that principal surface of the transparent glass substrate of the first laminate according to Example 7 on which the near-infrared reflecting film R6 was not formed. In this manner, an infrared-cut filter according to Example 7 was produced. For the infrared-cut filter according to Example 7, the spectral transmittance in the wavelength range of 350 to 1100 nm was measured in the same manner as in Example 1. The transmittance spectra obtained are shown in FIG. 23.

For the transmittance spectra of the infrared-cut filter according to Example 7, as shown in Table 5, the wavelength $\lambda^H$ (0°, 70%) was 620 nm, the wavelength $\lambda^H$ (40°, 70%) was 618 nm, and the absolute value $|\Delta\lambda^H$ (70%)$|$ of the difference between these wavelengths was 2 nm. The wavelength $\lambda^H$ (0°, 50%) was 642 nm, the wavelength $\lambda^H$ (40°, 50%) was 636 nm, and the absolute value $|\Delta\lambda^H$ (50%)$|$ of the difference between these wavelengths was 6 nm. The wavelength $\lambda^H$ (0°, 20%) was 675 nm, the wavelength $\lambda^H$ (40°, 20%) was 663 nm, and the absolute value $|\Delta\lambda^H$ (20%)$|$ of the difference between these wavelengths was 12 nm. For the transmittance spectra of the infrared-cut filter according to Example 7, the wavelength $\lambda^L$ (0°, 70%) was 428 nm, the wavelength $\lambda^L$ (40°, 70%) was 429 nm, and the absolute value $|\Delta\lambda^L$ (70%)$|$ of the difference between these wavelengths was 1 nm. The wavelength $\lambda^L$ (0°, 50%) was 412 nm, the wavelength $\lambda^L$ (40°, 50%) was 420 nm, and the absolute value $|\Delta\lambda^L$ (50%)$|$ of the difference between these wavelengths was 8 nm. The wavelength $\lambda^L$ (0°, 20%) was 408 nm, the wavelength $\lambda^L$ (40°, 20%) was 398 nm, and the absolute value $|\Delta\lambda^L$ (20%)$|$ of the difference between these wavelengths was 10 nm.

Example 8

(First Laminate)

Figure 24:
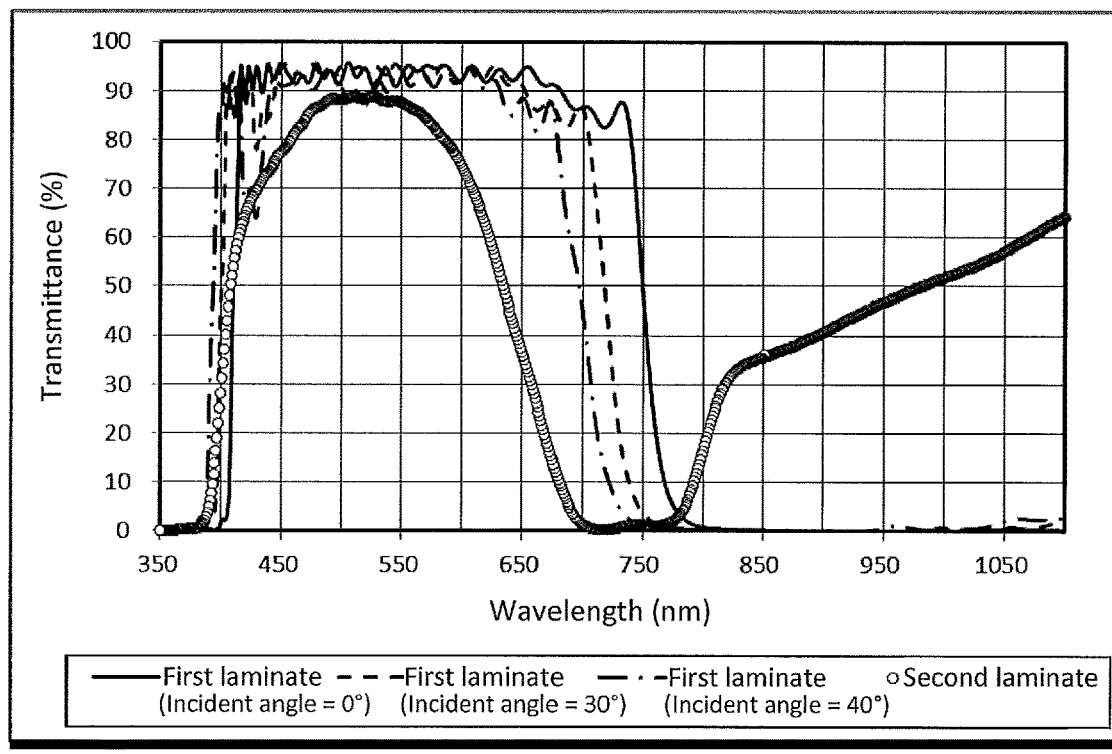
FIG. 24 is a graph showing the spectral transmittance of a first laminate and a second laminate according to Example 8.

A near-infrared reflecting film R7 composed of alternately arranged $SiO_2$ films and $TiO_2$ films and different from the near-infrared reflecting films R1 to R6 described in Examples 1 to 7 was formed by vapor deposition on one principal surface of a transparent glass substrate made of borosilicate glass and having a thickness of 0.21 mm (manufactured by SCHOTT AG under the product name "D 263"). In this manner, a first laminate according to Example 8 was produced. The thickness of the near-infrared reflecting film R7 of the first laminate according to Example 8 was 6 μm. The near-infrared reflecting film R7 of the first laminate according to Example 8 included 19 $SiO_2$ films and 19 $TiO_2$ films. For the first laminate according to Example 8, the spectral transmittance in the wavelength range of 350 to 1100 nm was measured in the same manner as in Example 1. The transmittance spectra obtained are shown in FIG. 24.

In the transmittance spectra of the first laminate according to Example 8, the average of the spectral transmittance in the wavelength range of 450 to 600 nm was more than 80% for all of the incident angles. In the transmittance spectrum obtained for the first laminate according to Example 8 when the incident angle was 30°, the spectral transmittance had a minimum of about 76% at a wavelength of about 420 nm. Assuming that the baseline of this transmittance spectrum was at a spectral transmittance of 93%, the downward-convex portion containing the minimum had a spectral transmittance lowered by 10 or more points from the baseline and had a half-width of about 14 nm. In the transmittance spectrum obtained for the first laminate according to Example 8 when the incident angle was 40°, the spectral transmittance had a minimum of about 55% at a wavelength of about 429 nm. Likewise, assuming that the baseline of this transmittance spectrum was at a spectral transmittance of 93%, the downward-convex portion containing the minimum had a spectral transmittance lowered by 30 or more points from the baseline and had a half-width of about 16 nm.

For the transmittance spectra of the first laminate according to Example 8, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 2. For the transmittance spectra of the first laminate according to Example 8, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 2.

(Second Laminate)

The coating liquid b1 as used in Example 3 was applied by die coating to one principal surface of a transparent glass substrate made of borosilicate glass and having a thickness of 0.21 mm (manufactured by SCHOTT AG under the product name "D 263"), and a film was thus formed. This film was heat-treated at 85° C. for 3 hours, then at 125° C. for 3 hours, then at 150° C. for 1 hour, and then at 170° C. for 3 hours to form an absorbing film B1 as in Example 3. The thickness of the absorbing film B1 was 50 μm. In this manner, an absorbing film B1 as the second absorbing film of the second laminate according to Example 8 was produced. Next, the coating liquid a3 as used in Example 4 was applied by spin coating onto the absorbing film B1 to form a film. This film was exposed to a 140° C. environment for 0.5 hours, and thus dried and hardened to form an absorbing film A3 as in Example 4. In this manner, an absorbing film A3 as the first absorbing film of the second laminate according to Example 8 was produced. The thickness of the absorbing film A3 was 3 μm. In this manner, the second laminate according to Example 8 was produced. That is, the absorbing film of the second laminate according to Example 8 included the absorbing film B1 (second absorbing film) with a thickness of 50 μm and the absorbing film A3 (first absorbing film) with a thickness of 3 μm, and was identical in configuration to the absorbing film of the second laminate according to Example 5.

For the second laminate according to Example 8, the spectral transmittance in the wavelength range of 350 to 1100 nm was measured in the same manner as in Example 1. In this measurement, light was incident on the second laminate according to Example 8 at incident angles of 0°, 30°, and 40°, and substantially identical transmittance spectra were obtained for all of the incident angles. The transmittance spectra obtained were identical to those of the second laminate according to Example 5. The transmittance spectrum obtained when the incident angle was 0° is shown in FIG. 24. As shown in FIG. 24, the average of the spectral transmittance of the second laminate according to Example 8 in the wavelength range of 450 to 600 nm was more than 75%. The transmittance spectra of the second laminate according to Example 8 had a broad absorption peak extending over the wavelength range of about 700 to about 770 nm. The transmittance spectra of the second laminate according to Example 8 had characteristics such that the spectral transmittance increases from 10% or less to 70% or more in the wavelength range of 350 to 450 nm.

For the transmittance spectra of the second laminate according to Example 8, the specified wavelengths in the wavelength range of 600 to 800 nm and the specified wavelengths in the wavelength range of 350 to 450 nm are shown in Table 2. For the transmittance spectra of the second laminate according to Example 8, transmittances at a wavelength of 743 nm (=$\lambda^H_R$ (0°, 70%)), a wavelength of 749 nm (=$\lambda^H_R$ (0°, 50%)), a wavelength of 761 nm (=$\lambda^H_R$ (0°, 20%)), a wavelength of 683 nm (=$\lambda^H_R$ (40°, 70%)), a wavelength of 697 nm (=$\lambda^H_R$ (40°, 50%)), a wavelength of 712 nm (=$\lambda^H_R$ (40°, 20%)), a wavelength of 414 nm (=$\lambda^L_R$ (0°, 70%)), a wavelength of 410 nm (=$\lambda^L_R$ (0°, 50%)), a wavelength of 408 nm (=$\lambda^L_R$ (0°, 20%)), a wavelength of 396 nm (=$\lambda^L_R$ (40°, 70%)), a wavelength of 394 nm (=$\lambda^L_R$ (40°, 50%)), and a wavelength of 390 nm (=$\lambda^L_R$ (40°, 20%)) are shown in Table 2.

(Infrared-Cut Filter)

Figure 25:
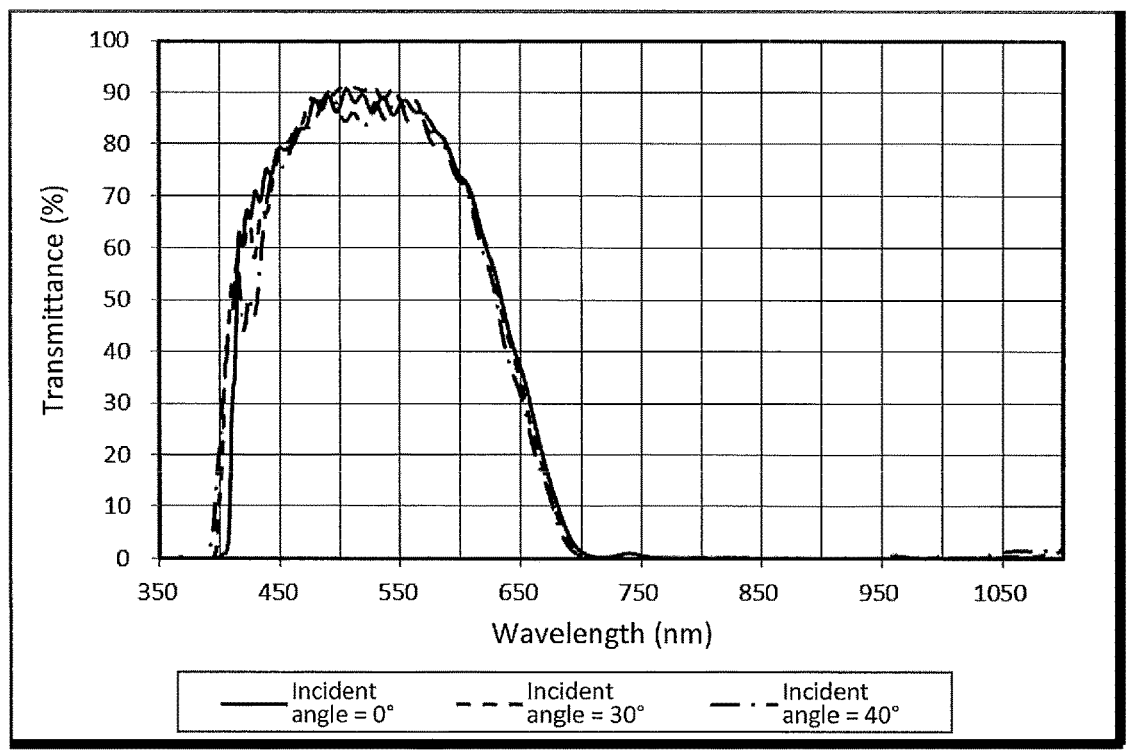
FIG. 25 is a graph showing the spectral transmittance of an infrared-cut filter according to Example 8.

An absorbing film composed of the absorbing film A3 (first absorbing film) and absorbing film B1 (second absorbing film) was formed, in the same manner as in production of the second laminate, on that principal surface of the transparent glass substrate of the first laminate according to Example 8 on which the near-infrared reflecting film R7 was not formed. In this manner, an infrared-cut filter according to Example 8 was produced. For the infrared-cut filter according to Example 8, the spectral transmittance in the wavelength range of 350 to 1100 nm was measured in the same manner as in Example 1. The transmittance spectra obtained are shown in FIG. 25.

For the transmittance spectra of the infrared-cut filter according to Example 8, as shown in Table 5, the wavelength $\lambda^H$ (0°, 70%) was 610 nm, the wavelength $\lambda^H$ (40°, 70%) was 607 nm, and the absolute value $|\Delta\lambda^H$ (70%)| of the difference between these wavelengths was 3 nm. The wavelength $\lambda^H$ (0°, 50%) was 634 nm, the wavelength $\lambda^H$ (40°, 50%) was 630 nm, and the absolute value $|\Delta\lambda^H$ (50%)| of the difference between these wavelengths was 4 nm. The wavelength $\lambda^H$ (0°, 20%) was 668 nm, the wavelength $\lambda^H$ (40°, 20%) was 662 nm, and the absolute value $|\Delta\lambda^H$ (20%)| of the difference between these wavelengths was 6 nm. For the transmittance spectra of the infrared-cut filter according to Example 8, the wavelength $\lambda^L$ (0°, 70%) was 435 nm, the wavelength $\lambda^L$ (40°, 70%) was 440 nm, and the absolute value $|\Delta\lambda^L$ (70%)| of the difference between these wavelengths was 5 nm. The wavelength $\lambda^L$ (0°, 50%) was 414 nm, the wavelength $\lambda^L$ (40°, 50%) was 412 nm, and the absolute value $|\Delta\lambda^L$ (50%)| of the difference between these wavelengths was 2 nm. The wavelength $\lambda^L$ (0°, 20%) was 409 nm, the wavelength $\lambda^L$ (40°, 20%) was 399 nm, and the absolute value $|\Delta\lambda^L$ (20%)| of the difference between these wavelengths was 10 nm.

Example 9

(First Laminate)

Figure 26:
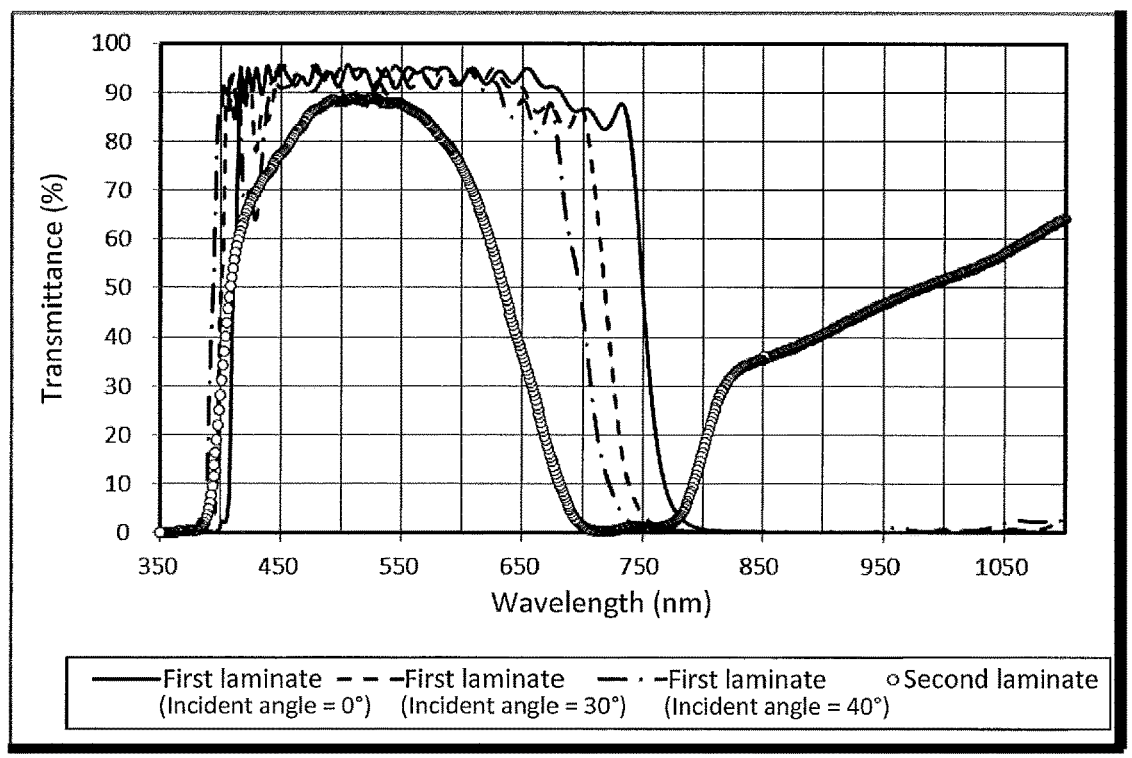
FIG. 26 is a graph showing the spectral transmittance of a first laminate and a second laminate according to Example 9.

A near-infrared reflecting film R7 composed of alternately arranged $SiO_2$ films and $TiO_2$ films was formed, as in Example 8, by vapor deposition on one principal surface of a transparent glass substrate made of borosilicate glass and having a thickness of 0.21 mm (manufactured by SCHOTT AG under the product name "D 263"). In this manner, a first laminate according to Example 9 was produced. For the first laminate according to Example 9, the spectral transmittance in the wavelength range of 350 to 1100 nm was measured in the same manner as in Example 1. The transmittance spectra obtained are shown in FIG. 26. The transmittance spectra of the first laminate according to Example 9 were identical to the transmittance spectra of the first laminate according to Example 8.

(Second Laminate)

A coating liquid b2 was prepared in the same manner as the coating liquid b1, except for doubling the amount of the silicone resin (manufactured by Shin-Etsu Chemical Co., Ltd. under the product name "KR-300") used as the binder, namely changing the amount of the silicone resin from 4.4 g to 8.8 g. This coating liquid b2 was applied to one principal surface of a transparent glass substrate made of borosilicate glass and having a thickness of 0.21 mm (manufactured by SCHOTT AG under the product name "D 263") to form an absorbing film B2 (second absorbing film). The thickness of the absorbing film B2 as the second absorbing film was 100 μm. Next, a $SiO_2$ film was formed by vapor deposition on the absorbing film B2 as the second absorbing film. The thickness of the $SiO_2$ film was 3 μm. Further, the coating liquid a3 as used in Example 4 was applied by spin coating onto the $SiO_2$ film to form a film. This film was exposed to a 140° C. environment for 0.5 hours, and thus dried and hardened to form an absorbing film A3 (first absorbing film). In this manner, the second laminate according to Example 9 was produced. That is, the absorbing film of the second laminate according to Example 9 included the absorbing film B2 (second absorbing film) with a thickness of 100 μm, the $SiO_2$ film with a thickness of 3 μm, and the absorbing film A3 (first absorbing film) with a thickness of 3 μm. For the second laminate according to Example 9, the spectral transmittance in the wavelength range of 350 to 1100 nm was measured in the same manner as in Example 1. In this measurement, light was incident on the second laminate according to Example 9 at incident angles of 0°, 30°, and 40°, and substantially identical transmittance spectra were obtained for all of the incident angles. The transmittance spectra obtained were substantially identical to those of the second laminate according to Example 8. The transmittance spectrum obtained when the incident angle was 0° is shown in FIG. 26.

(Infrared-Cut Filter)

Figure 27:
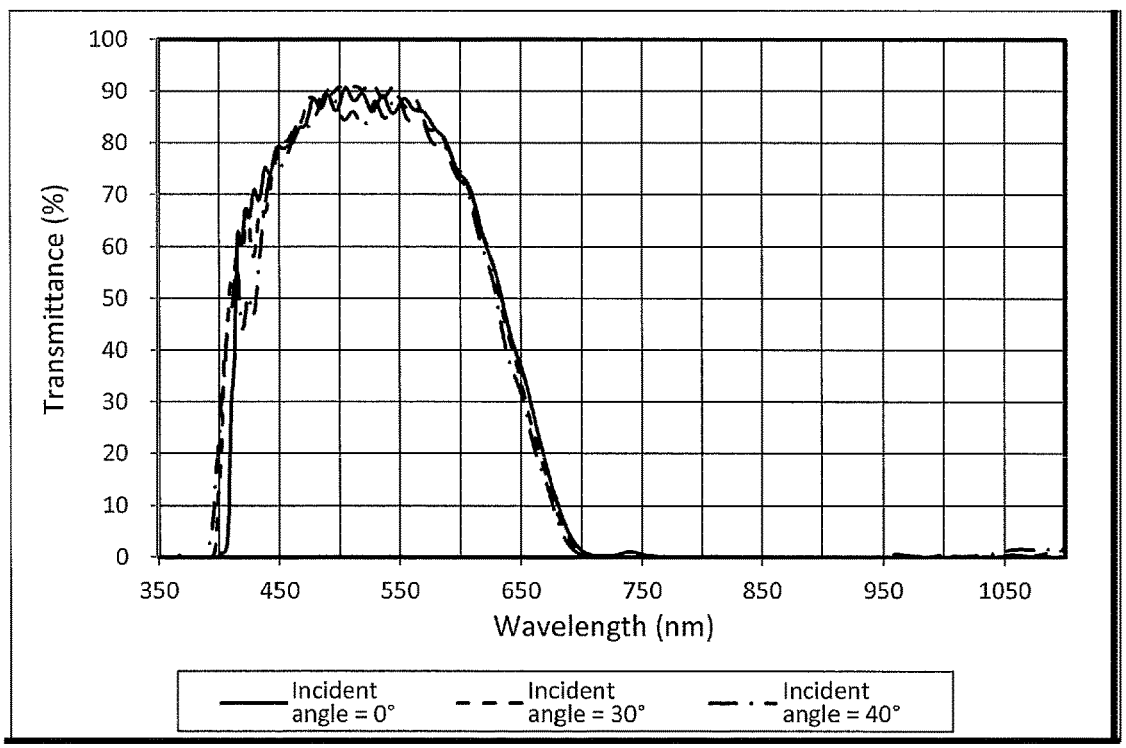
FIG. 27 is a graph showing the spectral transmittance of an infrared-cut filter according to Example 9.

An absorbing film B2 (second absorbing film) was formed, in the same manner as in production of the second laminate, on one principal surface of a transparent glass substrate made of borosilicate glass and having a thickness of 0.21 mm (manufactured by SCHOTT AG under the product name "D 263"). The thickness of the absorbing film B2 (second absorbing film) was 100 μm. A near-infrared reflecting film R7 identical to the near-infrared reflecting film of the first laminate was formed on the absorbing film B2 (second absorbing film). Next, the absorbing film B2 (second absorbing film) was separated from the transparent glass substrate. In this manner, a film assembly in which the near-infrared reflecting film R7 was formed on the absorbing film B2 (second absorbing film) was obtained. This film assembly was warped in a manner such that the near-infrared reflecting film R7 was convex. Further, a $SiO_2$ film was formed by vapor deposition on that surface of the absorbing film B2 (second absorbing film) on which the near-infrared reflecting film R7 was not formed. The thickness of the $SiO_2$ film was 3 μm. The $SiO_2$ film formation reduced the warping of the film assembly. Subsequently, an absorbing film A3 identical to the absorbing film A3 (first absorbing film) of the second laminate was formed on the $SiO_2$ film. The thickness of the absorbing film A3 was also 3 μm. In this manner, an infrared-cut filter according to Example 9 was produced. For the infrared-cut filter according to Example 9, the spectral transmittance in the wavelength range of 350 to 1100 nm was measured in the same manner as in Example 1. The transmittance spectra obtained are shown in FIG. 27. It was observed that the transmittance spectra of the infrared-cut filter according to Example 9 were approximately identical to those of the infrared-cut filter according to Example 8. It can be concluded that the presence or absence of the transparent glass substrate in the infrared-cut filter has no substantial effect on the spectral transmittance of the infrared-cut filter because the difference in refractive index between the transparent glass substrate and second laminate is small.

Example 10

(First Laminate)

Figure 28:
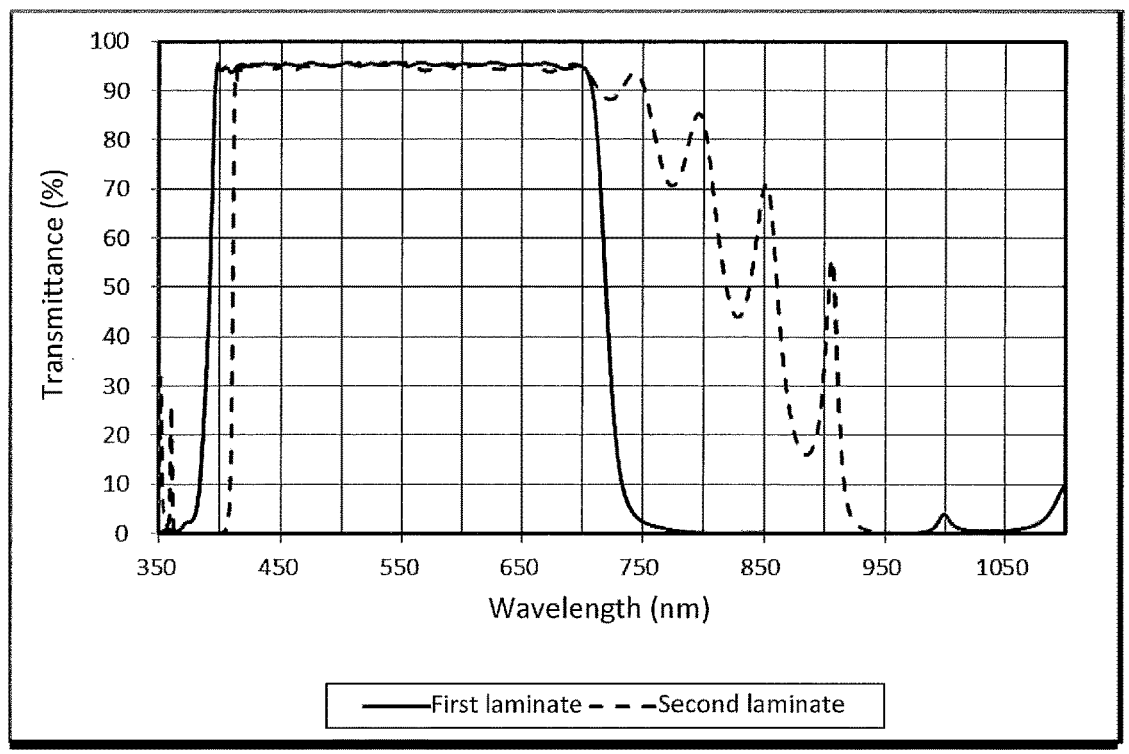
FIG. 28 is a graph showing the spectral transmittance of a first reflecting film and a second reflecting film according to Example 10.

A near-infrared reflecting film R81 (first reflecting film) composed of alternately arranged $SiO_2$ films and $TiO_2$ films was formed by vapor deposition on one principal surface of a transparent glass substrate made of borosilicate glass and having a thickness of 0.21 mm (manufactured by SCHOTT AG under the product name "D 263"). The near-infrared reflecting film R81 as the first reflecting film, coupled with a reflecting film R82 described below, exhibits a desired function as a near-infrared reflecting film. The first reflecting film R81 had a thickness of 4 µm and included 16 $SiO_2$ films and 16 $TiO_2$ films. For the laminate of the transparent glass substrate and near-infrared reflecting film R81 (first reflecting film), the spectral transmittance in the wavelength range of 350 to 1100 nm was measured at an incident angle of 0° in the same manner as in Example 1. The transmittance spectrum obtained is shown in FIG. 28.

A reflecting film R82 (second reflecting film) composed of alternately arranged $SiO_2$ films and $TiO_2$ films was formed by vapor deposition on the other principal surface of the transparent glass substrate on which the first reflecting film R81 was not formed. The thickness of the reflecting film R82 was 4 µm. The reflecting film R82 included 16 $SiO_2$ films and 16 $TiO_2$ films. To measure the spectral transmittance in the wavelength range of 350 to 1100 nm for the reflecting film R82 in the same manner as in Example 1, a transparent glass substrate made of borosilicate glass, having a thickness of 0.21 mm, and bearing nothing on its two principal surfaces (manufactured by SCHOTT AG under the product name "D 263") was placed into the same batch as used for production of the reflecting film R82 as the second reflecting film, and a laminate in which the reflecting film R82 was formed on one surface of the transparent glass substrate was obtained. The spectral transmittance was measured for the laminate at an incident angle of 0°. The transmittance spectrum obtained is shown in FIG. 28.

Figure 29:
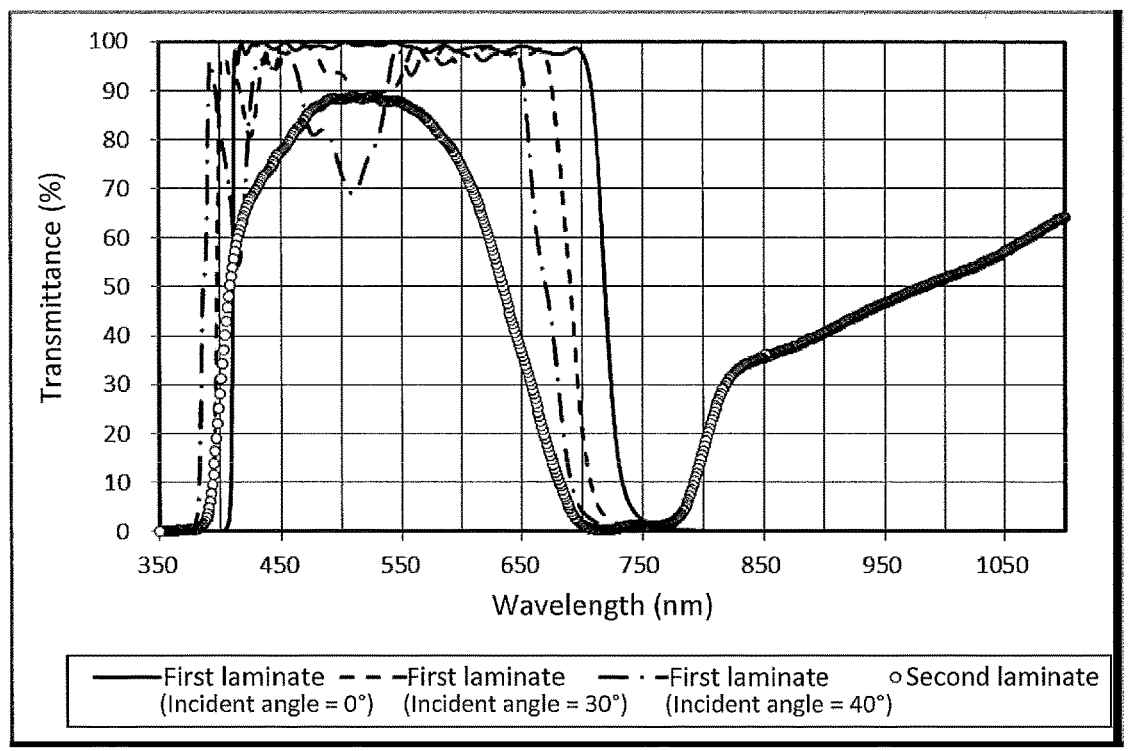
FIG. 29 is a graph showing the spectral transmittance of a first laminate and a second laminate according to Example 10.

In this manner, a first laminate according to Example 10 was produced. That is, the first laminate according to Example 10 was a laminate in which the near-infrared reflecting film R81 as a first reflecting film was formed on one principal surface of a glass substrate, while the near-infrared reflecting film R82 as a second reflecting film was formed on the other principal surface of the glass substrate. For this first laminate, the spectral transmittance in the wavelength range of 350 to 1100 nm was measured in the same manner as in Example 1. The transmittance spectra obtained are shown in FIG. 29. As shown in FIG. 29, the spectral transmittance of this first laminate in the transmission range (the wavelength range of about 420 to 690 nm in the case of an incident angle of 0°, for example) was near 100%, unlike those of the first laminates according to the other Examples. It should be noted that this was due to the fact that the near-infrared reflecting film R81 as the first reflecting film and the reflecting film R82 as the second reflecting film were designed to exhibit anti-reflection function in the transmission range, and consequently the reflection loss at the interface between the first laminate according to Example 10 and air was reduced.

The average of the spectral transmittance of the first laminate according to Example 10 in the wavelength range of 450 to 600 nm was more than 80% for all of the incident angles of light, although a ripple appeared in the vicinity of a wavelength of about 500 nm in the transmittance spectrum of light incident on the first laminate at an incident angle of 40°. In the transmittance spectrum obtained for the first laminate according to Example 10 when the incident angle was 30°, the spectral transmittance had a minimum of about 80% at a wavelength of about 425 nm. Assuming that the baseline of this transmittance spectrum was at a spectral transmittance of 99%, the downward-convex portion containing the minimum had a spectral transmittance lowered by about 20 points from the baseline and had a half-width of about 15 nm. In the transmittance spectrum obtained for the first laminate according to Example 10 when the incident angle was 40°, the spectral transmittance had a minimum of about 55% at a wavelength of about 415 nm. Likewise, assuming that the baseline of this transmittance spectrum was at a spectral transmittance of 99%, the downward-convex portion containing the minimum had a spectral transmittance lowered by 40 or more points from the baseline and had a half-width of about 19 nm.

For the transmittance spectra of the first laminate according to Example 10, the specified wavelengths in the wavelength range of 600 to 800 nm, $\Delta\lambda^H_R$ (70%), $\Delta\lambda^H_R$ (50%), and $\Delta\lambda^H_R$ (20%) are shown in Table 3. For the transmittance spectra of the first laminate according to Example 10, the specified wavelengths in the wavelength range of 350 to 450 nm, $\Delta\lambda^L_R$ (70%), $\Delta\lambda^L_R$ (50%), and $\Delta\lambda^L_R$ (20%) are also shown in Table 3.

(Second Laminate)

An absorbing film having the same configuration as the second laminate of Example 9, namely an absorbing film composed of an absorbing film B2 as the second absorbing film, a $SiO_2$ film, and an absorbing film A3 as the first absorbing film was formed on one principal surface of a transparent glass substrate made of borosilicate glass and having a thickness of 0.21 mm (manufactured by SCHOTT AG under the product name "D 263"). In this manner, a second laminate according to Example 10 was produced. That is, the absorbing film of the second laminate according to Example 10 included the 100-µm-thick absorbing film B2 as the second absorbing film, the 3-µm-thick $SiO_2$ film, and the 3-µm-thick absorbing film A3 as the first absorbing film.

For the second laminate according to Example 10, the spectral transmittance in the wavelength range of 350 to 1100 nm was measured in the same manner as in Example 1. In this measurement, light was incident on the second laminate according to Example 10 at incident angles of 0°, 30°, and 40°, and substantially identical transmittance spectra were obtained for all of the incident angles. The transmittance spectra obtained were substantially identical to those of the second laminate according to Example 9. The transmittance spectrum obtained when the incident angle was 0° is shown in FIG. 29. As shown in FIG. 29, the average of the spectral transmittance of the second laminate according to Example 10 in the wavelength range of 450 to 600 nm was more than 75%. The transmittance spectra of the second laminate according to Example 10 had a broad absorption peak extending over the wavelength range of about 700 to about 770 nm. The transmittance spectra of the second laminate according to Example 10 had characteristics such that the spectral transmittance increases from 10% or less to 70% or more in the wavelength range of 350 to 450 nm.

For the transmittance spectra of the second laminate according to Example 10, the specified wavelengths in the wavelength range of 600 to 800 nm and the specified wavelengths in the wavelength range of 350 to 450 nm are shown in Table 3. For the transmittance spectra of the second laminate according to Example 10, transmittances at a wavelength of 715 nm ($=\lambda^H_R$ (0°, 70%)), a wavelength of 719 nm ($=\lambda^H_R$ (0°, 50%)), a wavelength of 727 nm ($=\lambda^H_R$ (0°, 20%)), a wavelength of 659 nm ($=\lambda^H_R$ (40°, 70%)), a wavelength of 676 nm ($=\lambda^H_R$ (40°, 50%)), a wavelength of 684 nm ($=\lambda^H_R$ (40°, 20%)), a wavelength of 411 nm ($=\lambda^L_R$ (0°, 70%)), a wavelength of 410 nm ($=\lambda^L_R$ (0°, 50%)), a wavelength of 409 nm ($=\lambda^L_R$ (0°, 20%)), a wavelength of 389 nm ($=\lambda^L_R$ (40°, 70%)), a wavelength of 386 nm ($=\lambda^L_R$ (40°, 50%)), and a wavelength of 383 nm ($=\lambda^L_R$ (40°, 20%)) are shown in Table 3.

(Infrared-cut filter)

Figure 30:
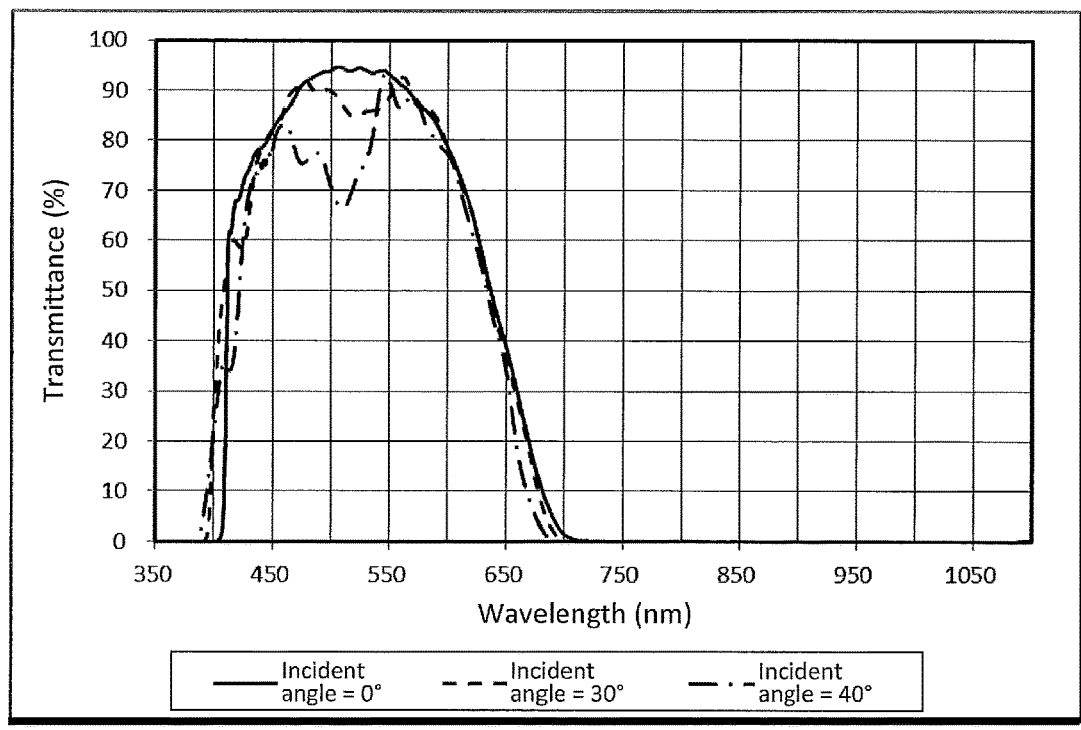
FIG. 30 is a graph showing the spectral transmittance of an infrared-cut filter according to Example 10.

An absorbing film B2 identical to the second absorbing film of the second laminate was formed on one principal surface of a transparent glass substrate made of borosilicate glass and having a thickness of 0.21 mm (manufactured by SCHOTT AG under the product name "D 263"). The thickness of the absorbing film B2 as the second absorbing film was 100 μm. A near-infrared reflecting film R81 identical to the first reflecting film of the first laminate was formed on the absorbing film B2 as the second absorbing film. Next, the absorbing film B2 as the second absorbing film was separated from the transparent glass substrate. In this manner, a film assembly in which the near-infrared reflecting film R81 as the first reflecting film was formed on the absorbing film B2 as the second absorbing film. This film assembly was warped in a manner such that the near-infrared reflecting film R81 was convex. Further, a SiO$_2$ film was formed by vapor deposition on that surface of the first absorbing film on which the near-infrared reflecting film R81 was not formed. The thickness of the SiO$_2$ film was 3 μm. The SiO$_2$ film formation reduced the warping of the film assembly. Subsequently, an absorbing film A3 identical to the first second absorbing film of the second laminate was formed on the SiO$_2$ film. The thickness of the absorbing film A3 as the first absorbing film was also 3 μm. Further, a reflecting film R82 identical to the second reflecting film of the first laminate was formed on the absorbing film A3 as the first absorbing film. In this manner, an infrared-cut filter according to Example 10 was produced. For the infrared-cut filter according to Example 10, the spectral transmittance in the wavelength range of 350 to 1100 nm was measured in the same manner as in Example 1. The transmittance spectra obtained are shown in FIG. 30.

For the transmittance spectra of the infrared-cut filter according to Example 10, as shown in Table 6, the wavelength $\lambda^H$ (0°, 70%) was 615 nm, the wavelength $\lambda^H$ (40°, 70%) was 611 nm, and the absolute value $|\Delta\lambda^H (70\%)|$ of the difference between these wavelengths was 4 nm. The wavelength $\lambda^H$ (0°, 50%) was 637 nm, the wavelength $\lambda^H$ (40°, 50%) was 633 nm, and the absolute value $|\Delta\lambda^H (50\%)|$ of the difference between these wavelengths was 4 nm. The wavelength $\lambda^H$ (0°, 20%) was 669 nm, the wavelength $\lambda^H$ (40°, 20%) was 659 nm, and the absolute value $|\Delta\lambda^H (20\%)|$ of the difference between these wavelengths was 10 nm. For the transmittance spectra of the infrared-cut filter according to Example 10, the wavelength $\lambda^L$ (0°, 70%) was 423 nm, the wavelength $\lambda^L$ (40°, 70%) was 430 nm, and the absolute value $|\Delta\lambda^L (70\%)|$ of the difference between these wavelengths was 7 nm. The wavelength $\lambda^L$ (0°, 50%) was 411 nm, the wavelength $\lambda^L$ (40°, 50%) was 421 nm, and the absolute value $|\Delta\lambda^L (50\%)|$ of the difference between these wavelengths was 10 nm. The wavelength $\lambda^L$ (0°, 20%) was 410 nm, the wavelength $\lambda^L$ (40°, 20%) was 399 nm, and the absolute value $|\Delta\lambda^L (20\%)|$ of the difference between these wavelengths was 11 nm.

<Evaluation 1>

Figure 31:
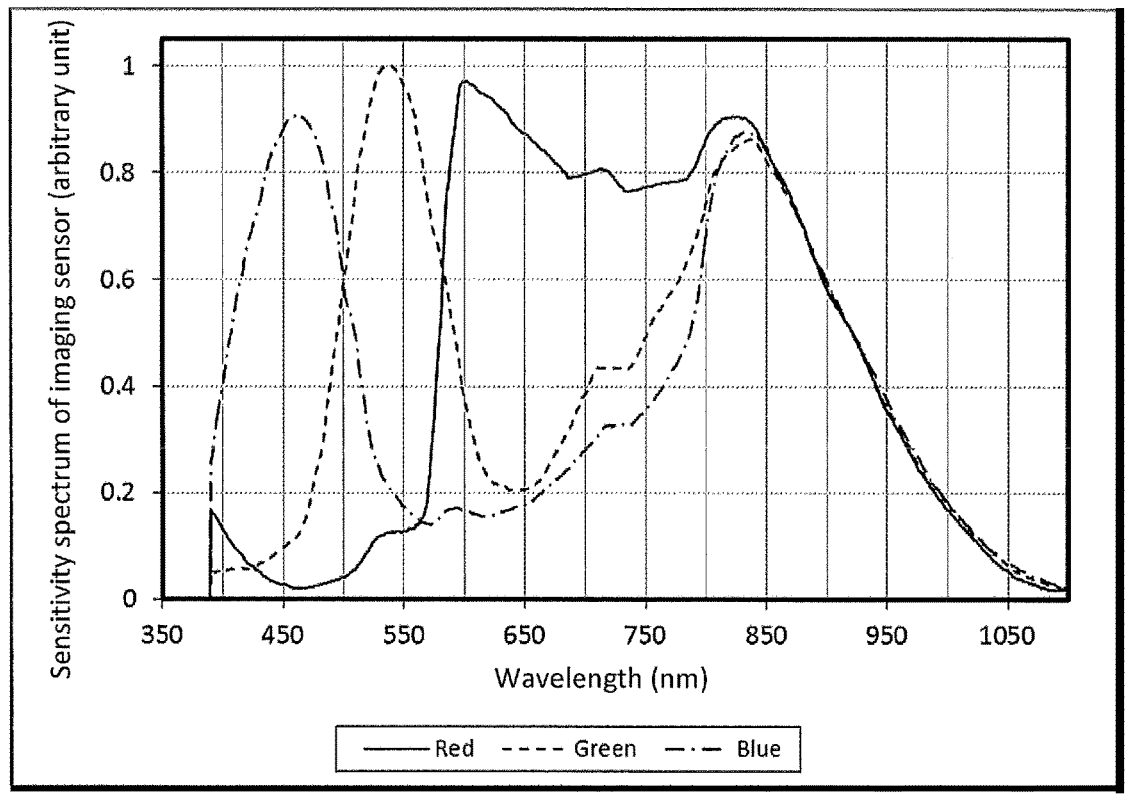
FIG. 31 is a graph showing, for each color of RGB color filters, the spectral sensitivity of an imaging sensor used in evaluation of an infrared-cut filter according to an example.
Figure 32:
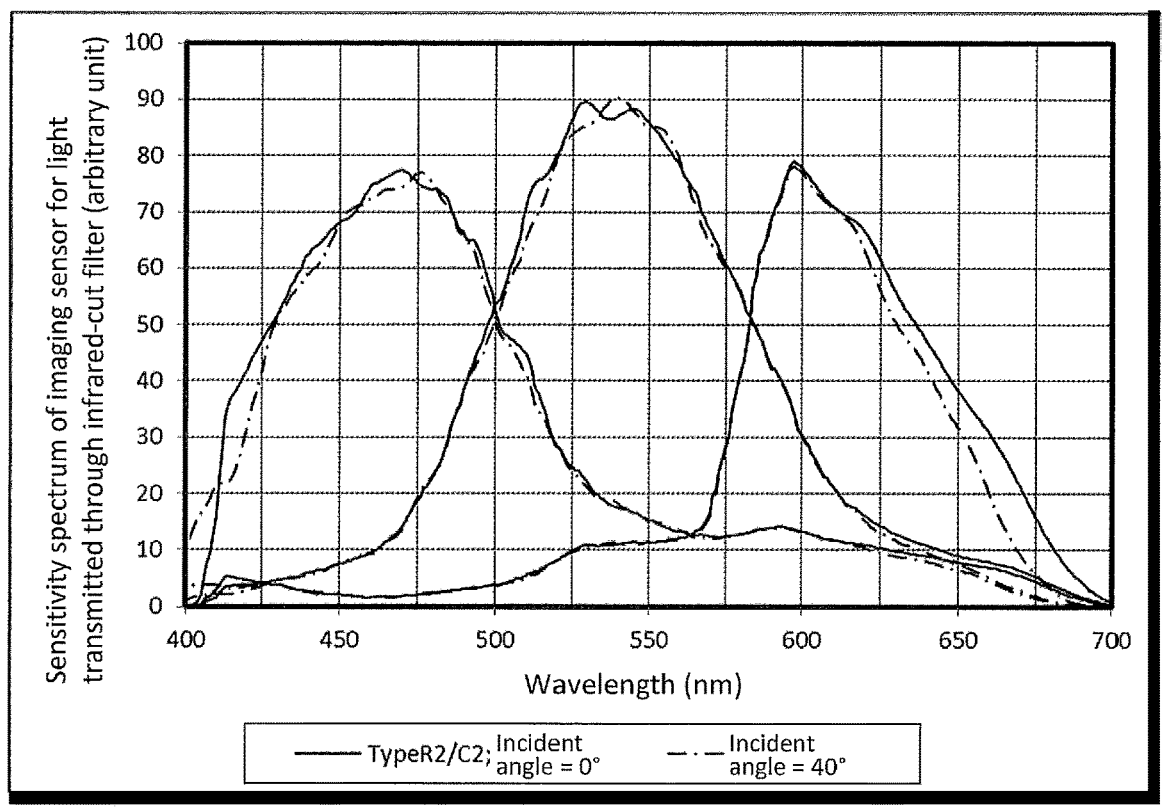
FIG. 32 is a graph showing the result of synthesis of the spectral transmittance of an infrared-cut filter of Example 7 and the spectral sensitivity shown in FIG. 31 for an imaging sensor.

Evaluation was made on spectral sensitivity exhibited when the infrared-cut filter according to Example 7 was used in combination with an imaging sensor having predetermined sensitivity characteristics. For this evaluation, an imaging sensor having spectral sensitivity as shown in FIG. 31 was used. The imaging sensor itself has no ability to identify colors; thus, when light color-separated by RGB color filters was delivered to the imaging sensor, the spectral sensitivity shown in FIG. 31 was obtained. FIG. 32 shows the spectral transmittance of light incident on the infrared-cut filter according to Example 7 at incident angles of 0° and 40° and the result of synthesis of the spectral transmittance and the spectral sensitivity shown in FIG. 31. In FIG. 32, the spectrum having the shortest peak wavelength is that of light transmitted through a B filter (blue color filter). The spectrum having the longest peak wavelength is that of light transmitted through an R filter (red color filter). The spectrum having a peak between the above two peaks is that of light transmitted through a G filter (green filter). As shown in FIG. 32, the synthesized spectral sensitivity obtained for an incident angle of 40° was different from the synthesized spectral sensitivity obtained for an incident angle of 0°.

Figure 33:
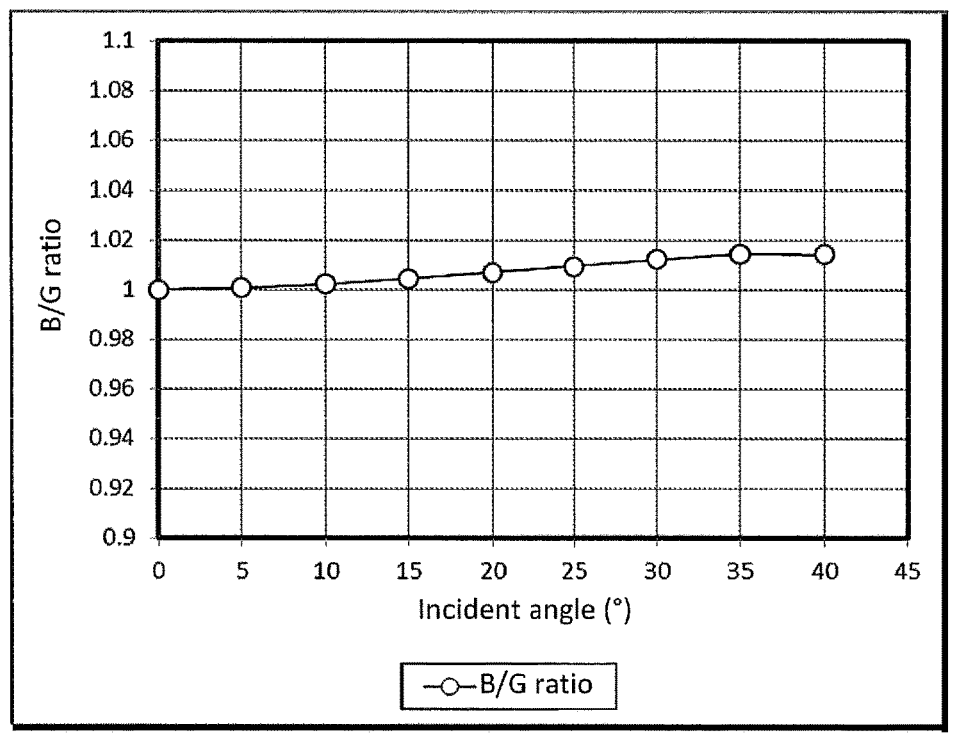
FIG. 33 is a graph showing the relationship of the R/G ratio and B/G ratio with the incident angle for the case of using an infrared-cut filter according to Example 7 in combination with an imaging sensor having the spectral sensitivity shown in FIG. 31.
Figure 34:
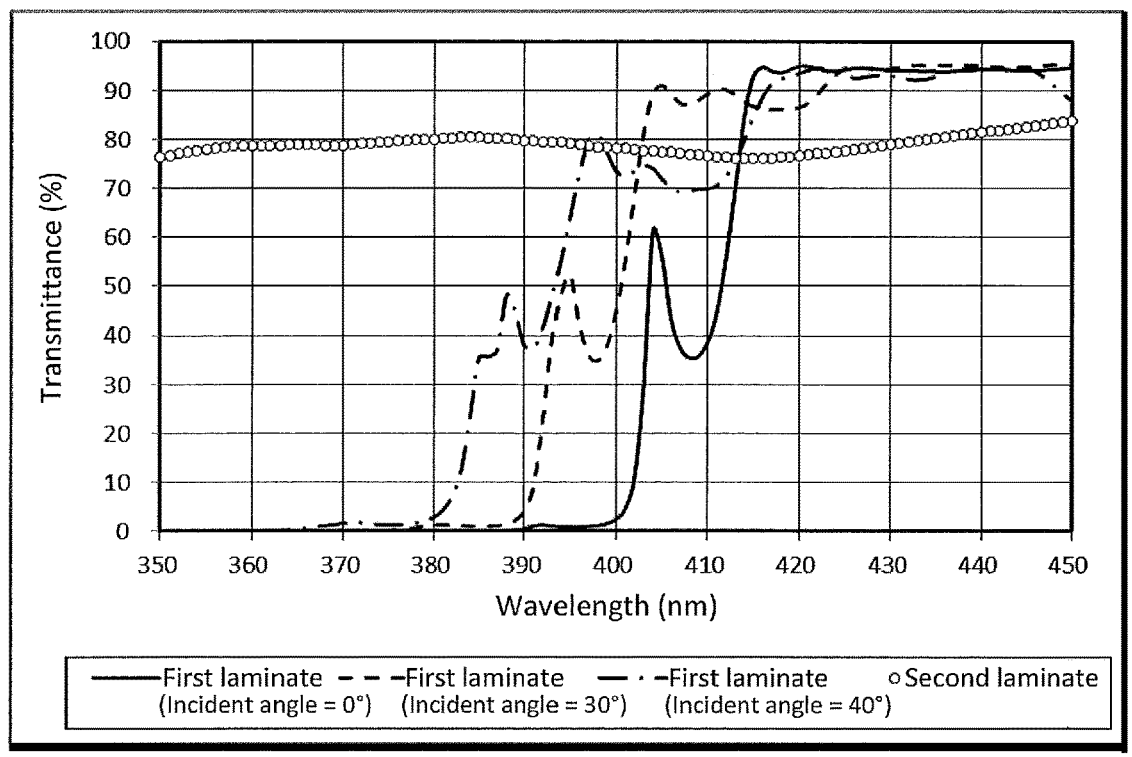
FIG. 34 is a graph showing the spectral transmittance of a first laminate and a second laminate according to Example 1 in the wavelength range of 350 to 450 nm.
Figure 35:
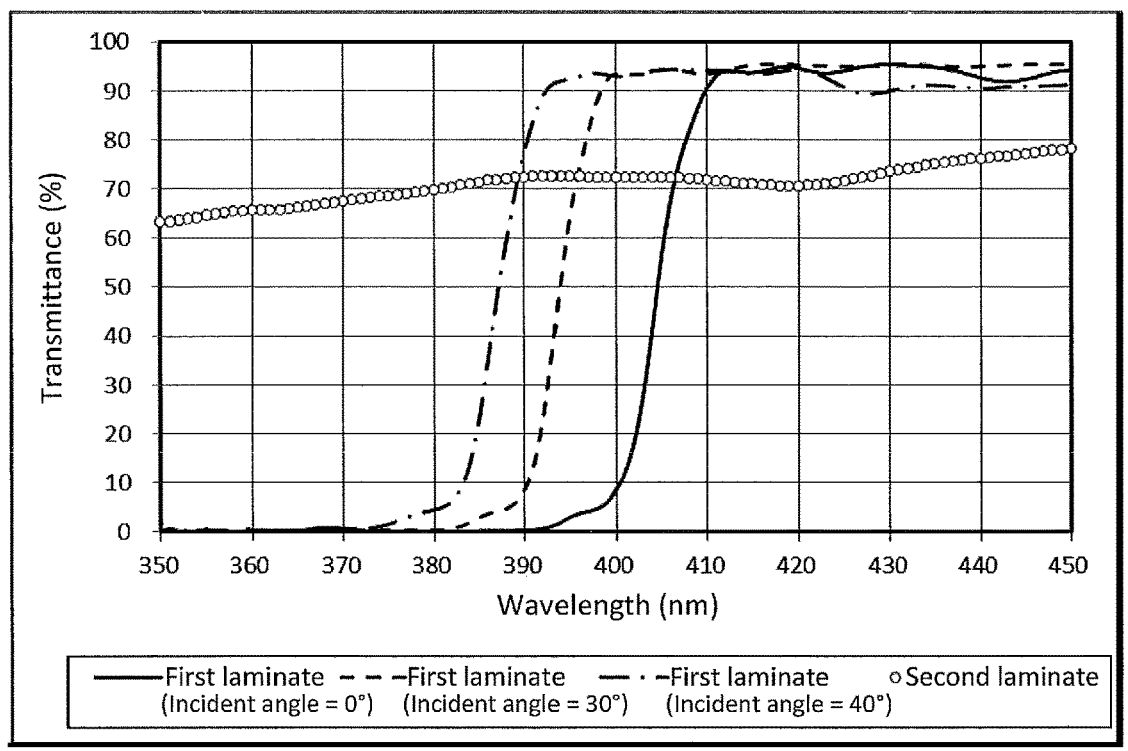
FIG. 35 is a graph showing the spectral transmittance of a first laminate and a second laminate according to Example 2 in the wavelength range of 350 to 450 nm.
Figure 36:
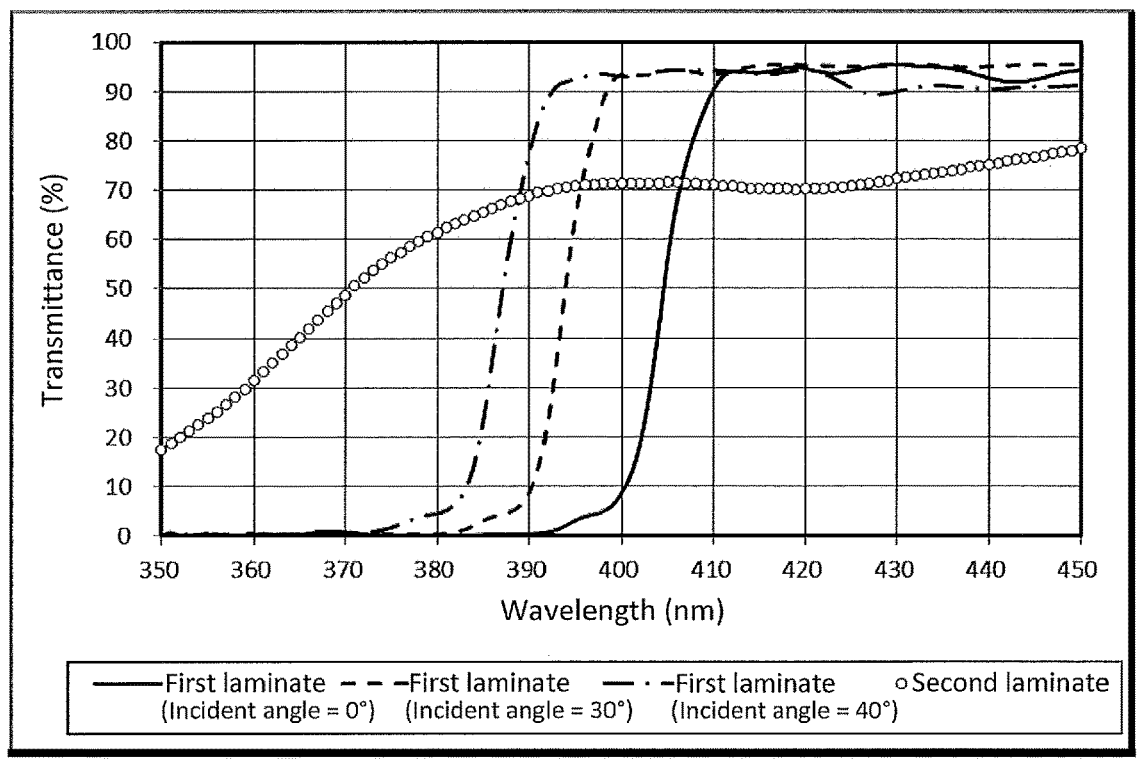
FIG. 36 is a graph showing the spectral transmittance of a first laminate and a second laminate according to Example 3 in the wavelength range of 350 to 450 nm.
Figure 37:
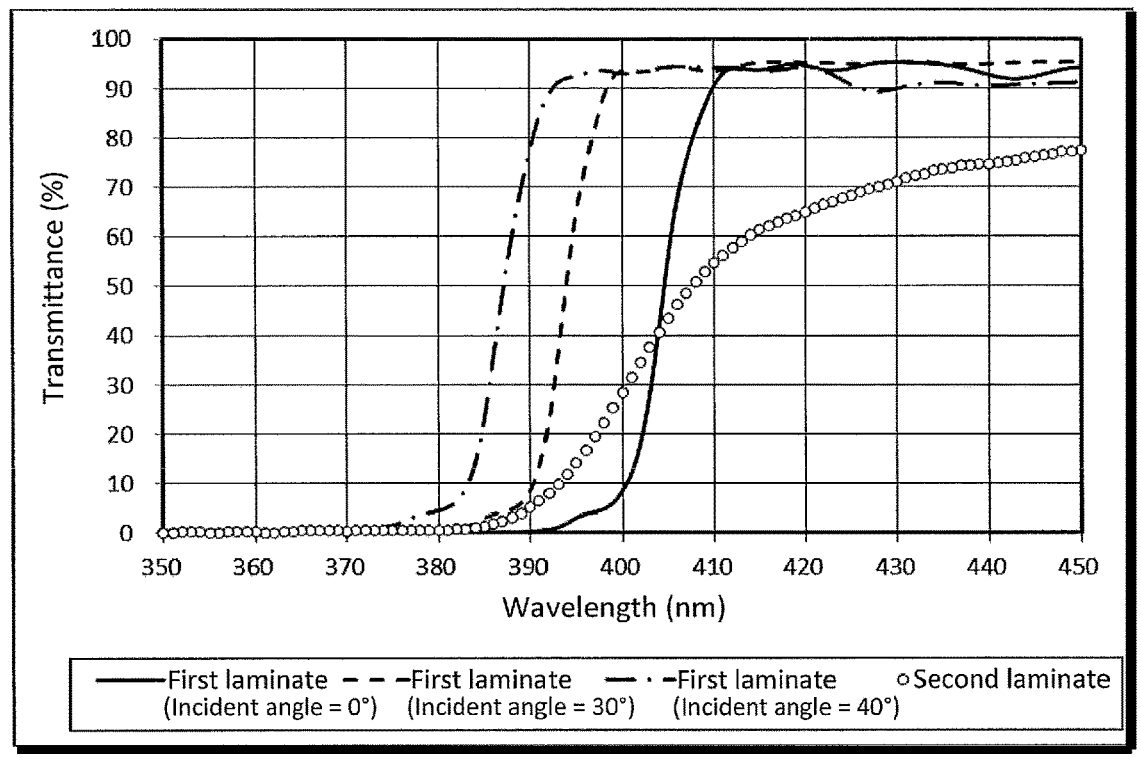
FIG. 37 is a graph showing the spectral transmittance of a first laminate and a second laminate according to Example 4 in the wavelength range of 350 to 450 nm.
Figure 38:
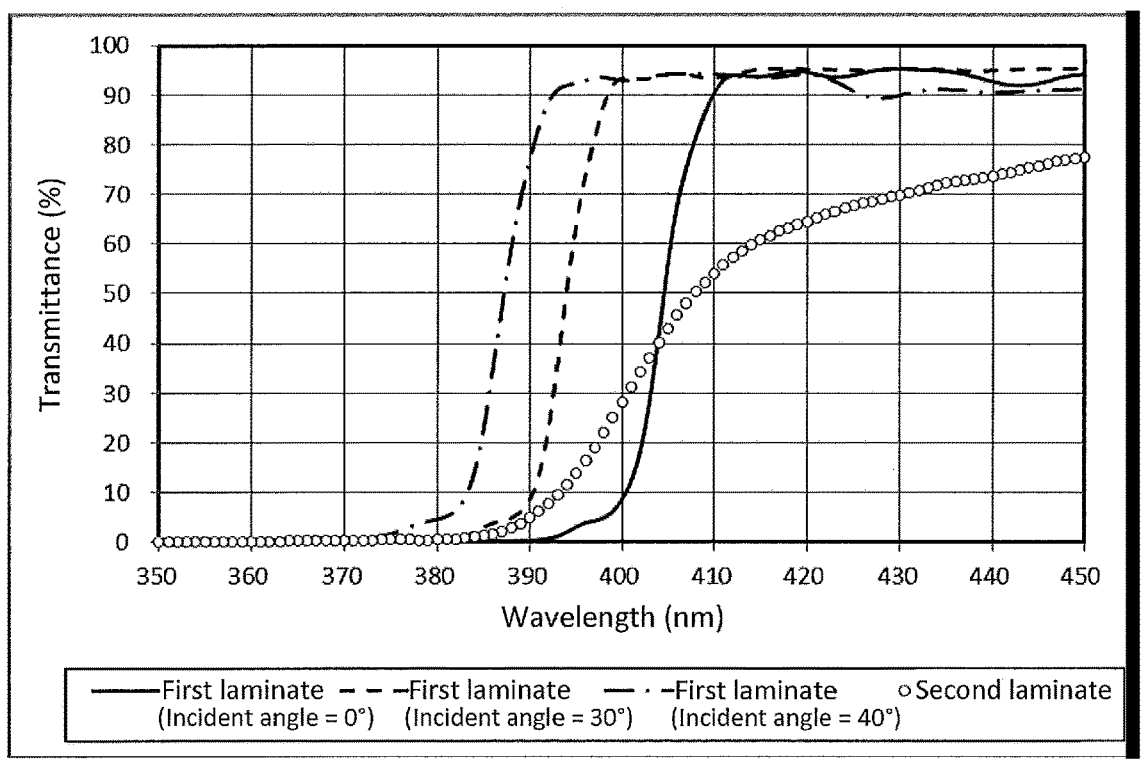
FIG. 38 is a graph showing the spectral transmittance of a first laminate and a second laminate according to Example 5 in the wavelength range of 350 to 450 nm.
Figure 39:
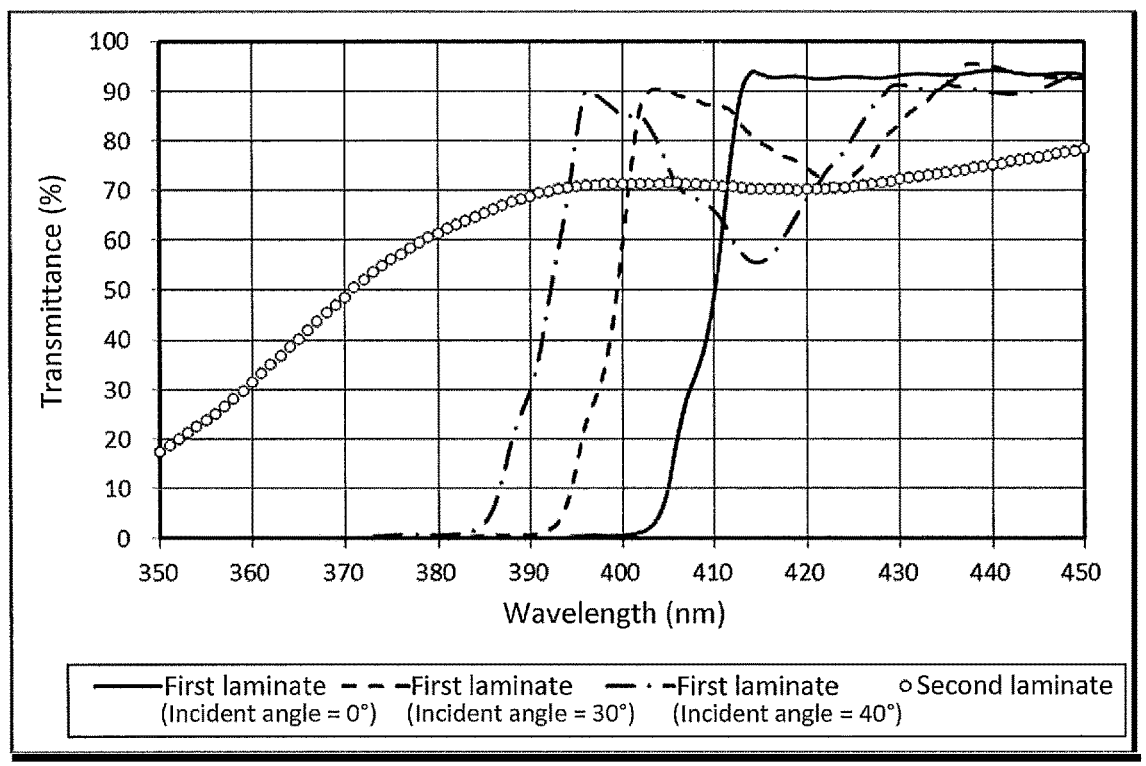
FIG. 39 is a graph showing the spectral transmittance of a first laminate and a second laminate according to Example 6 in the wavelength range of 350 to 450 nm.
Figure 40:
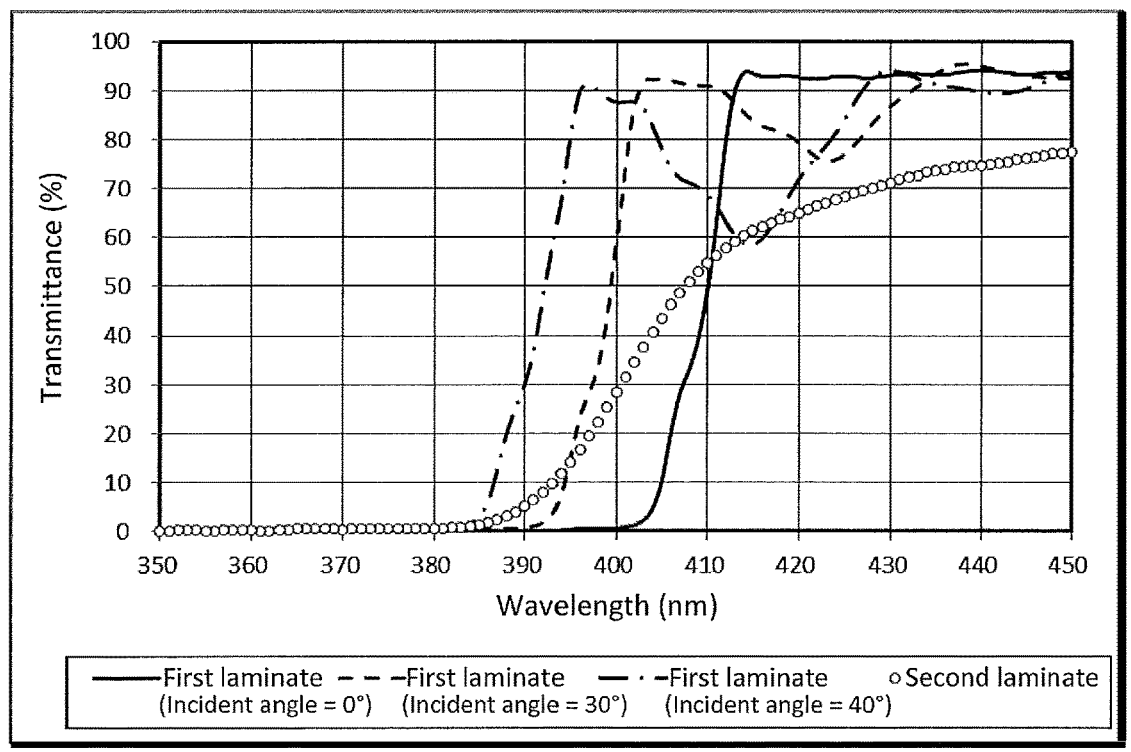
FIG. 40 is a graph showing the spectral transmittance of a first laminate and a second laminate according to Example 7 in the wavelength range of 350 to 450 nm.
Figure 41:
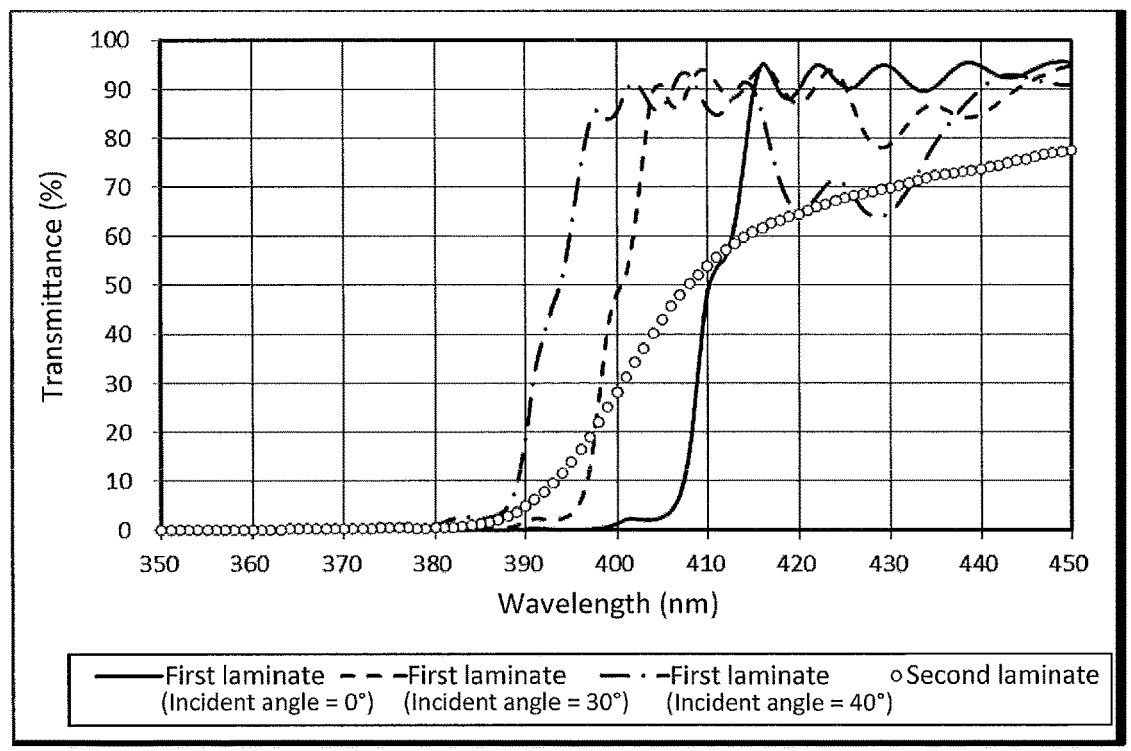
FIG. 41 is a graph showing the spectral transmittance of a first laminate and a second laminate according to Example 8 in the wavelength range of 350 to 450 nm.
Figure 42:
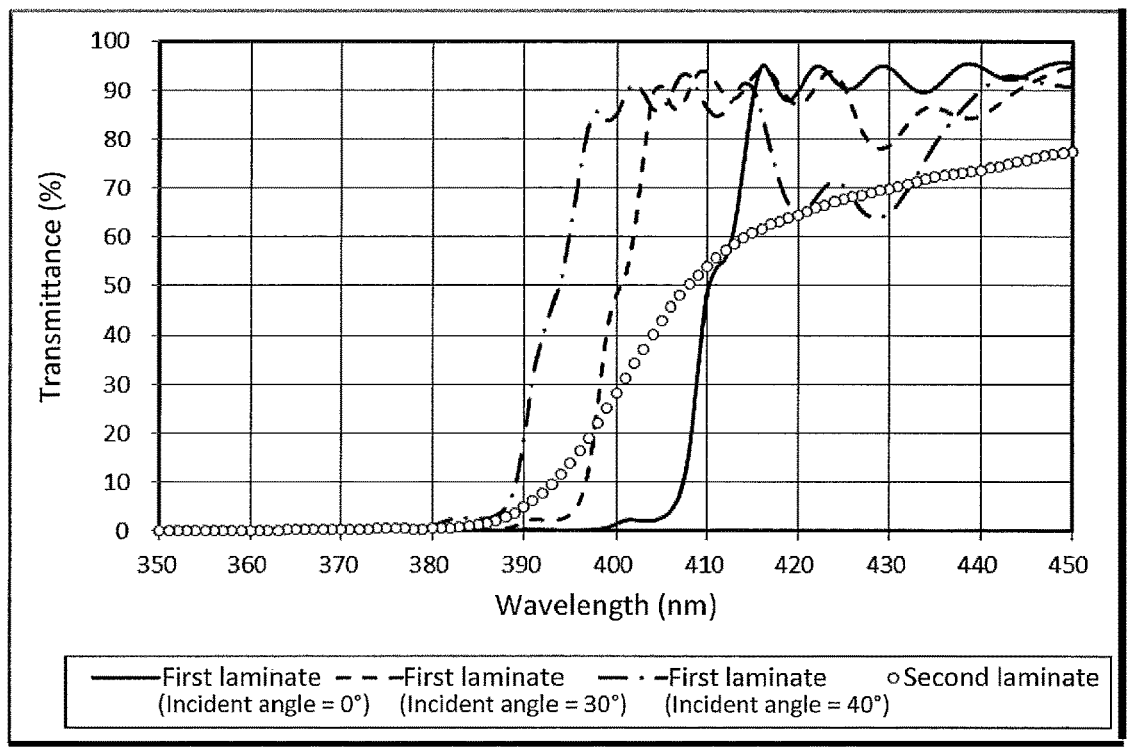
FIG. 42 is a graph showing the spectral transmittance of a first laminate and a second laminate according to Example 9 in the wavelength range of 350 to 450 nm.
Figure 43:
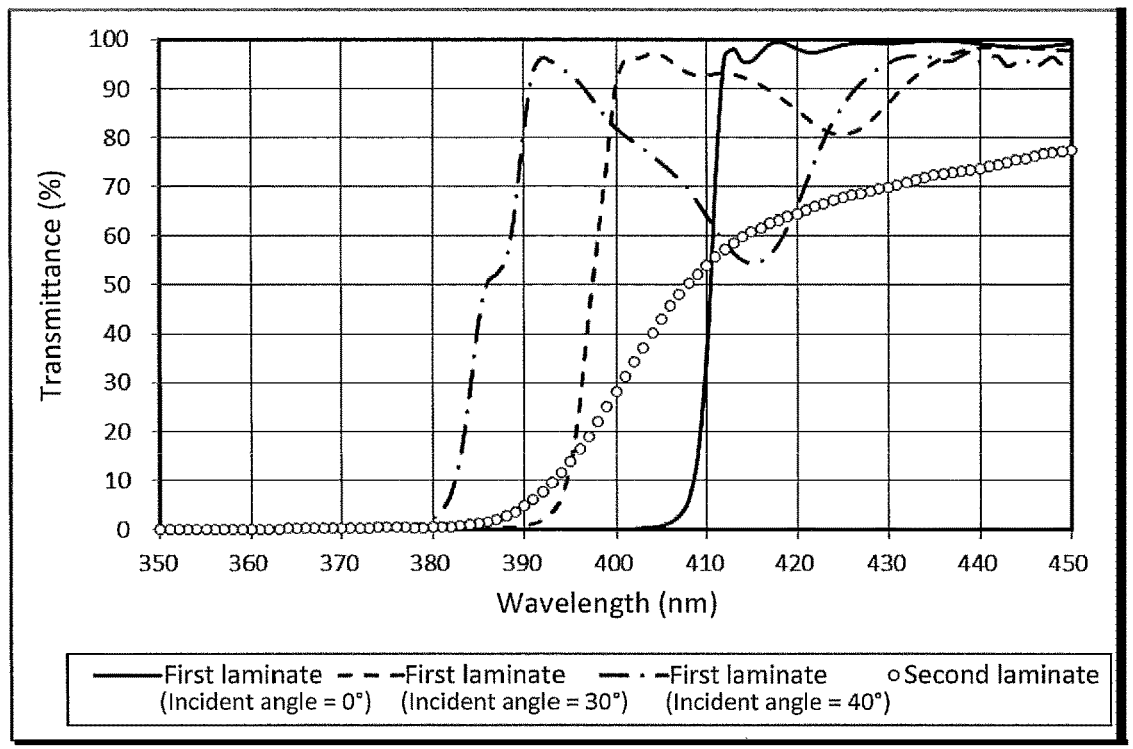
FIG. 43 is a graph showing the spectral transmittance of a first laminate and a second laminate according to Example 10 in the wavelength range of 350 to 450 nm.
Figure 44:
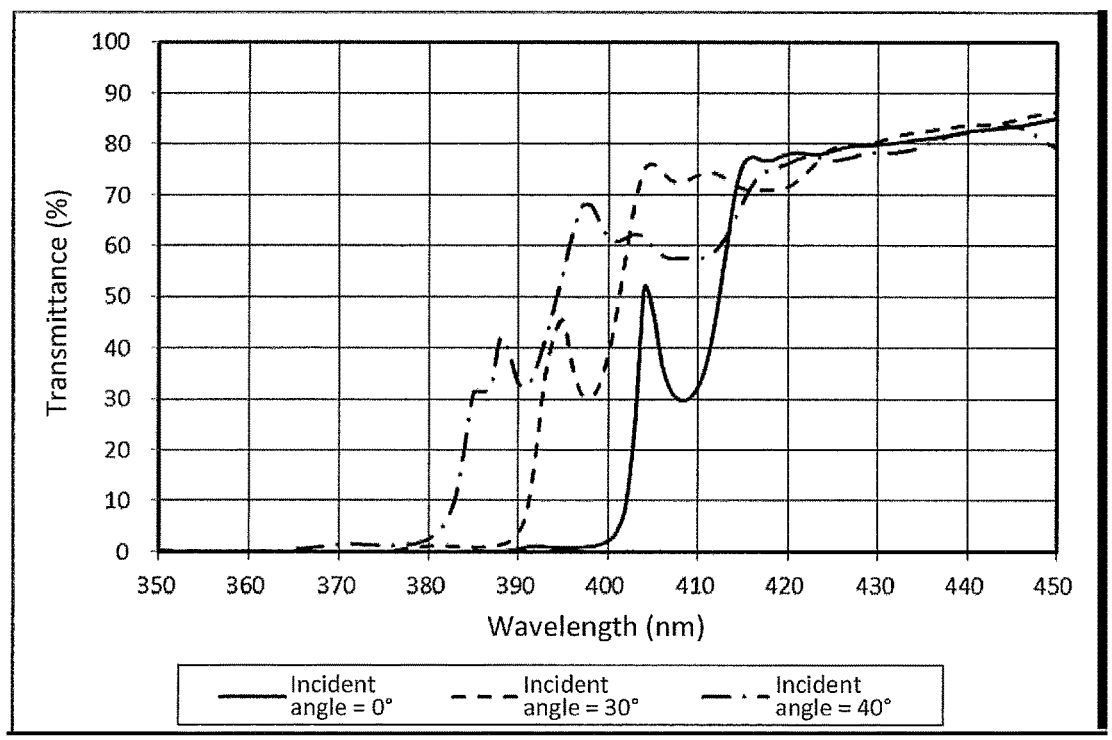
FIG. 44 is a graph showing the spectral transmittance of an infrared-cut filter according to Example 1 in the wavelength range of 350 to 450 nm.
Figure 45:
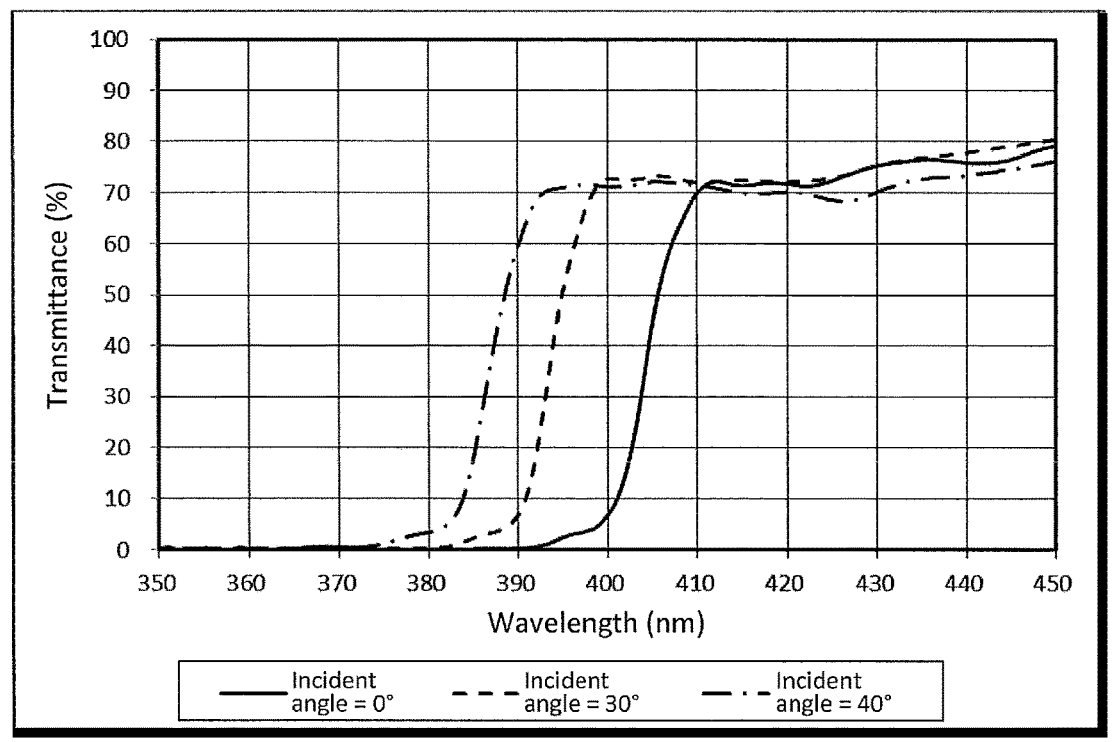
FIG. 45 is a graph showing the spectral transmittance of an infrared-cut filter according to Example 2 in the wavelength range of 350 to 450 nm.
Figure 46:
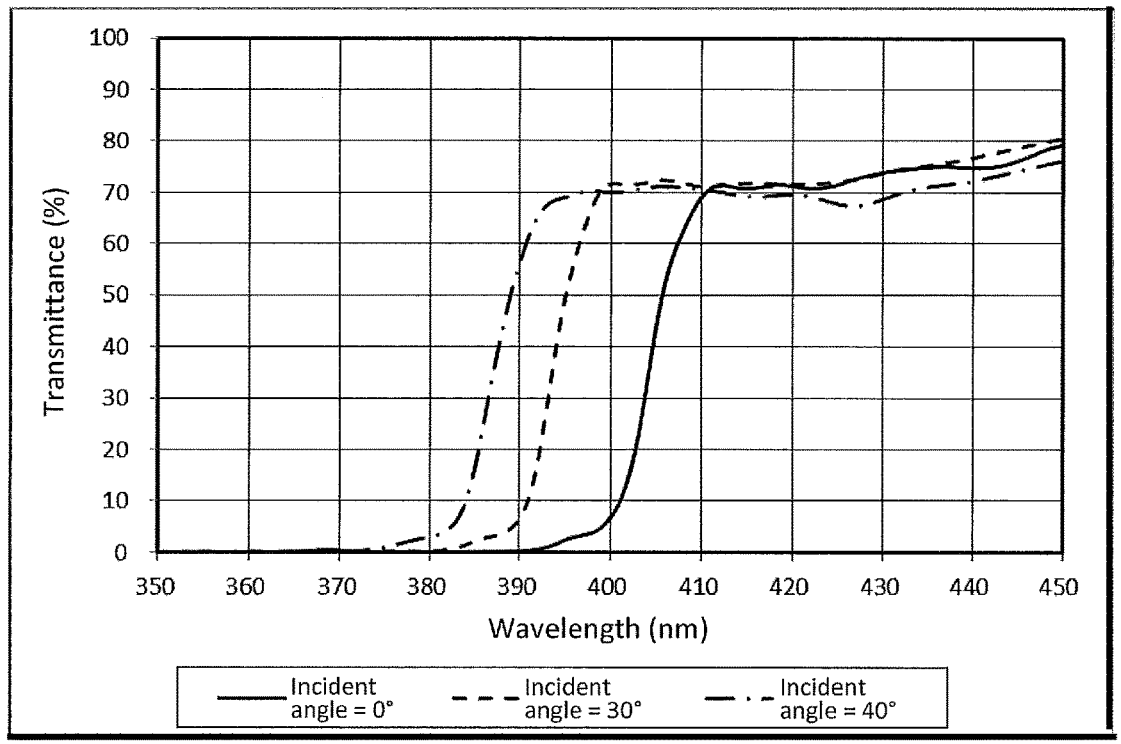
FIG. 46 is a graph showing the spectral transmittance of an infrared-cut filter according to Example 3 in the wavelength range of 350 to 450 nm.
Figure 47:
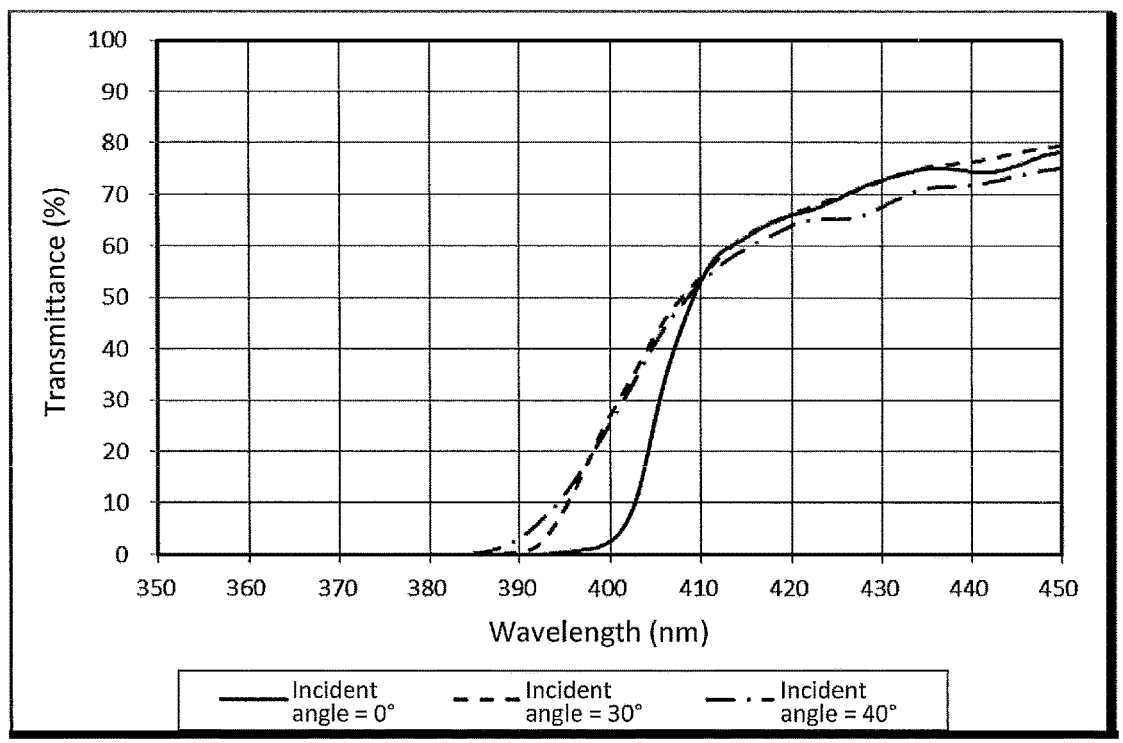
FIG. 47 is a graph showing the spectral transmittance of an infrared-cut filter according to Example 4 in the wavelength range of 350 to 450 nm.
Figure 48:
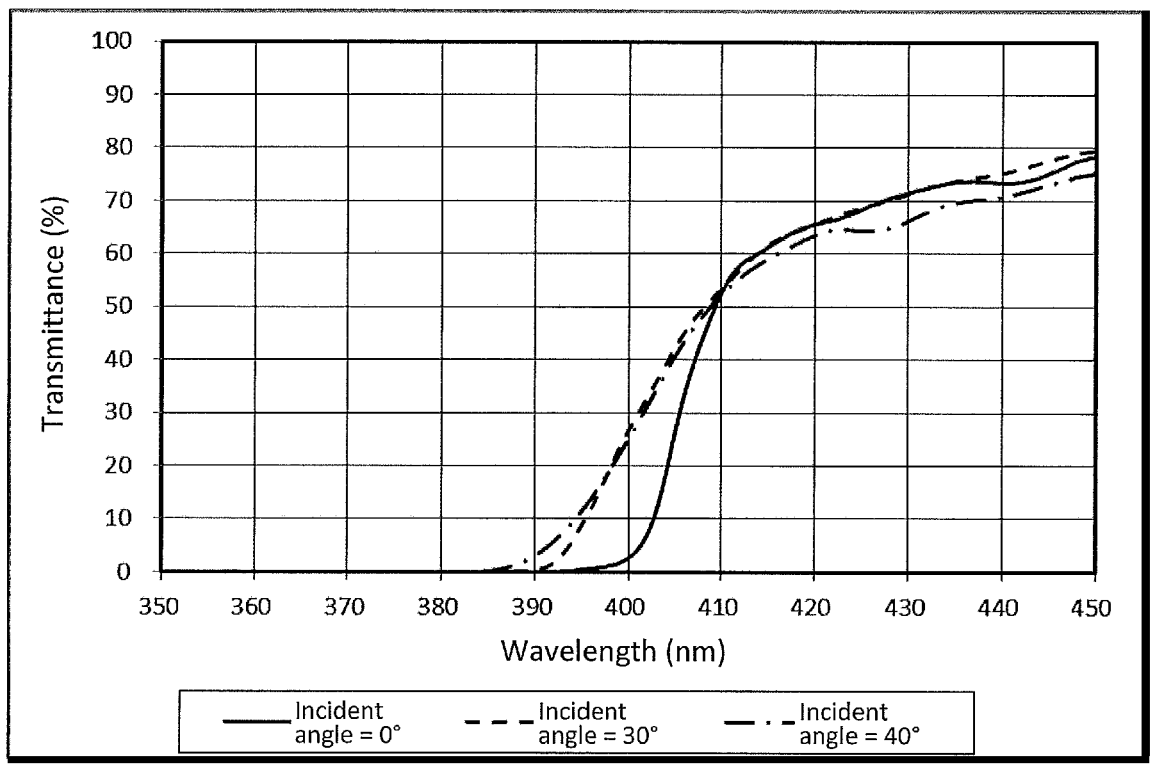
FIG. 48 is a graph showing the spectral transmittance of an infrared-cut filter according to Example 5 in the wavelength range of 350 to 450 nm.
Figure 49:
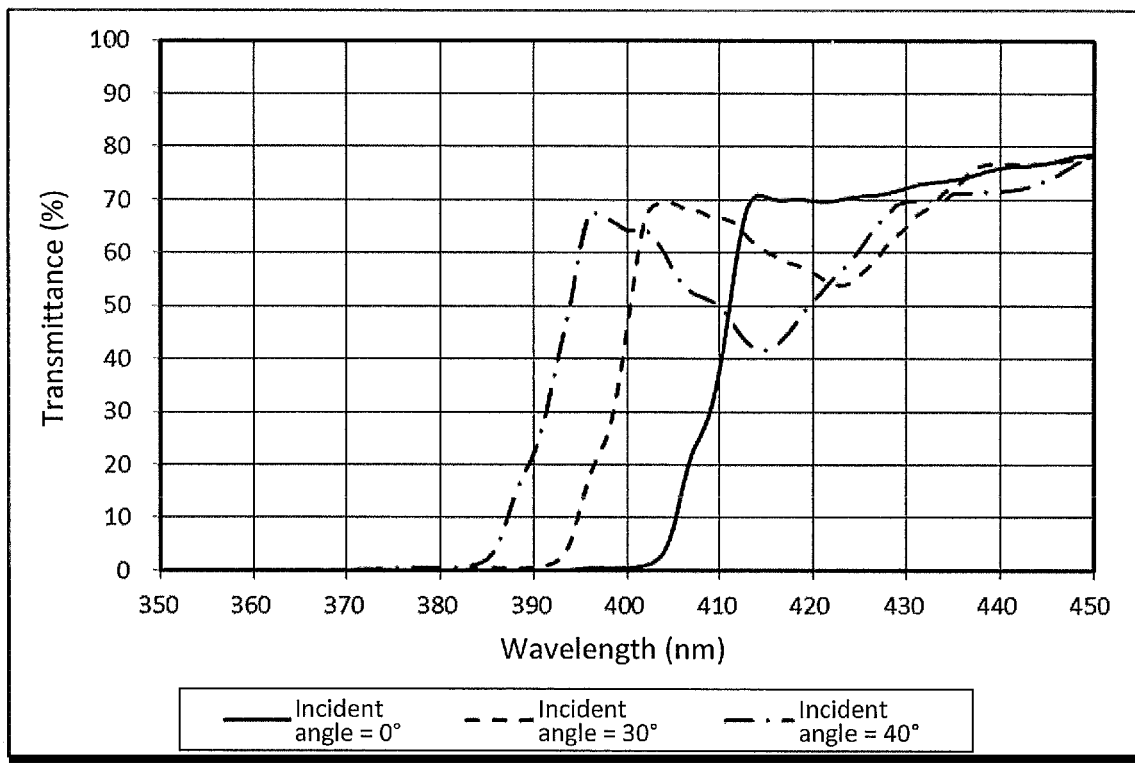
FIG. 49 is a graph showing the spectral transmittance of an infrared-cut filter according to Example 6 in the wavelength range of 350 to 450 nm.
Figure 50:
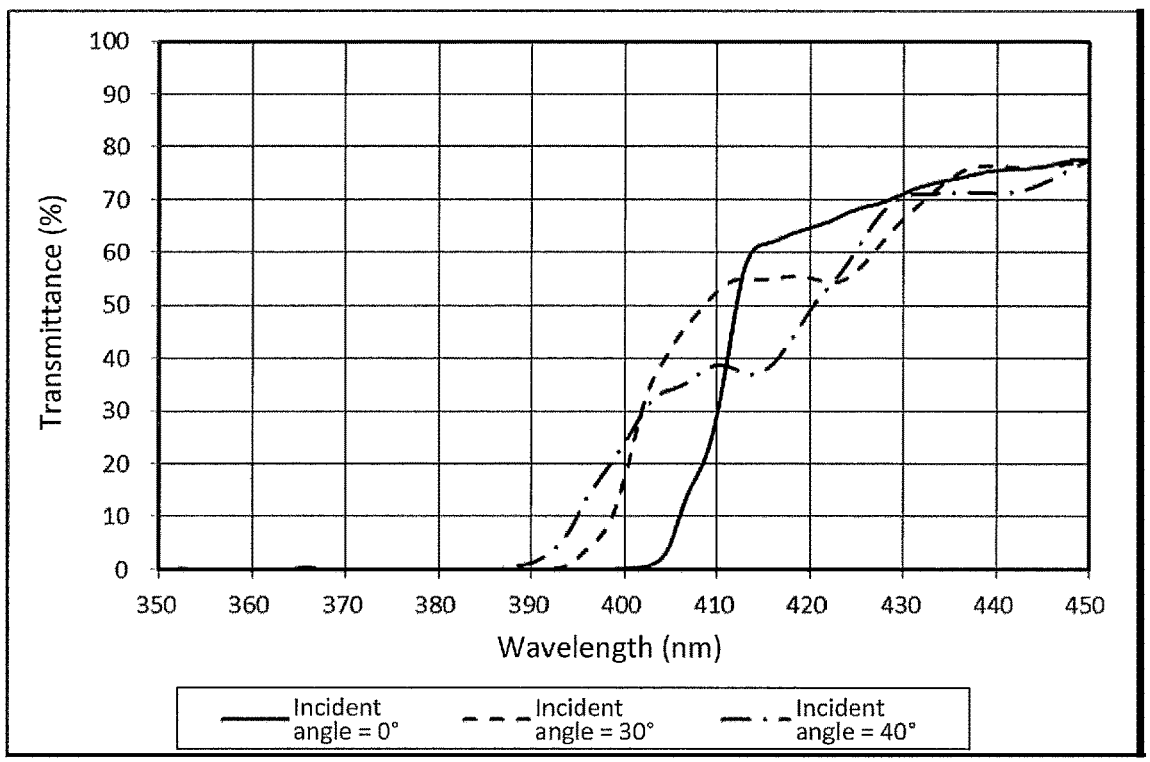
FIG. 50 is a graph showing the spectral transmittance of an infrared-cut filter according to Example 7 in the wavelength range of 350 to 450 nm.
Figure 51:
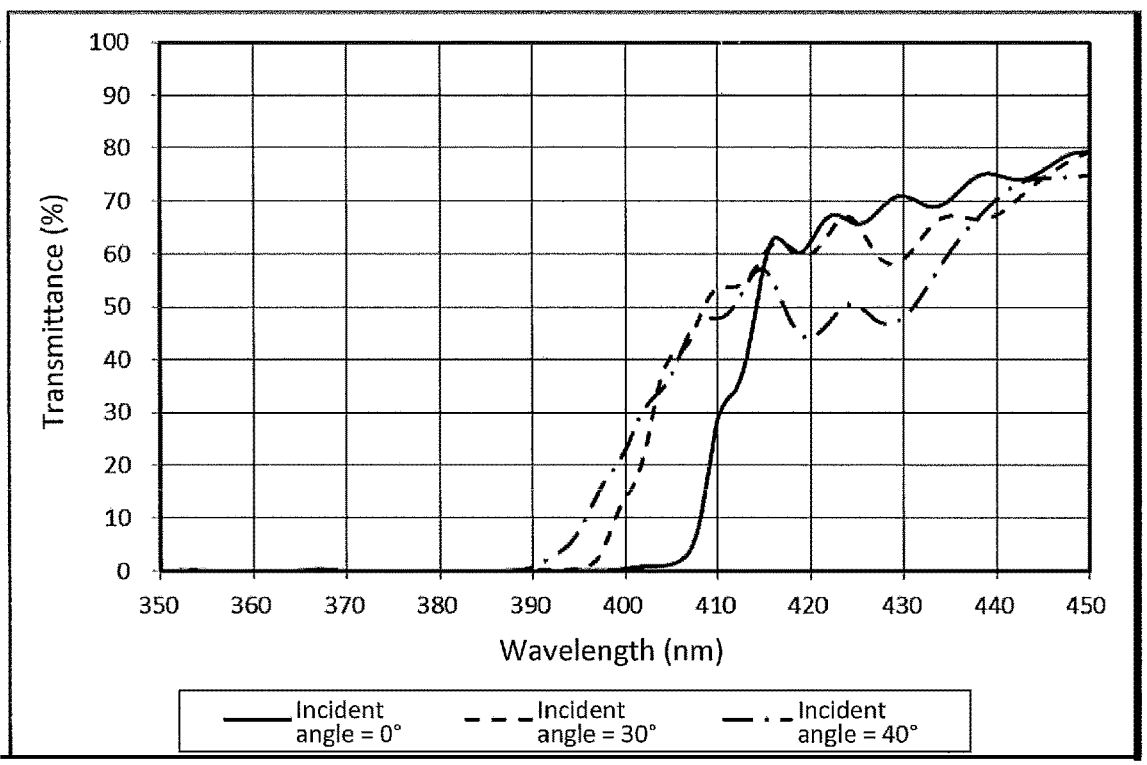
FIG. 51 is a graph showing the spectral transmittance of an infrared-cut filter according to Example 8 in the wavelength range of 350 to 450 nm.
Figure 52:
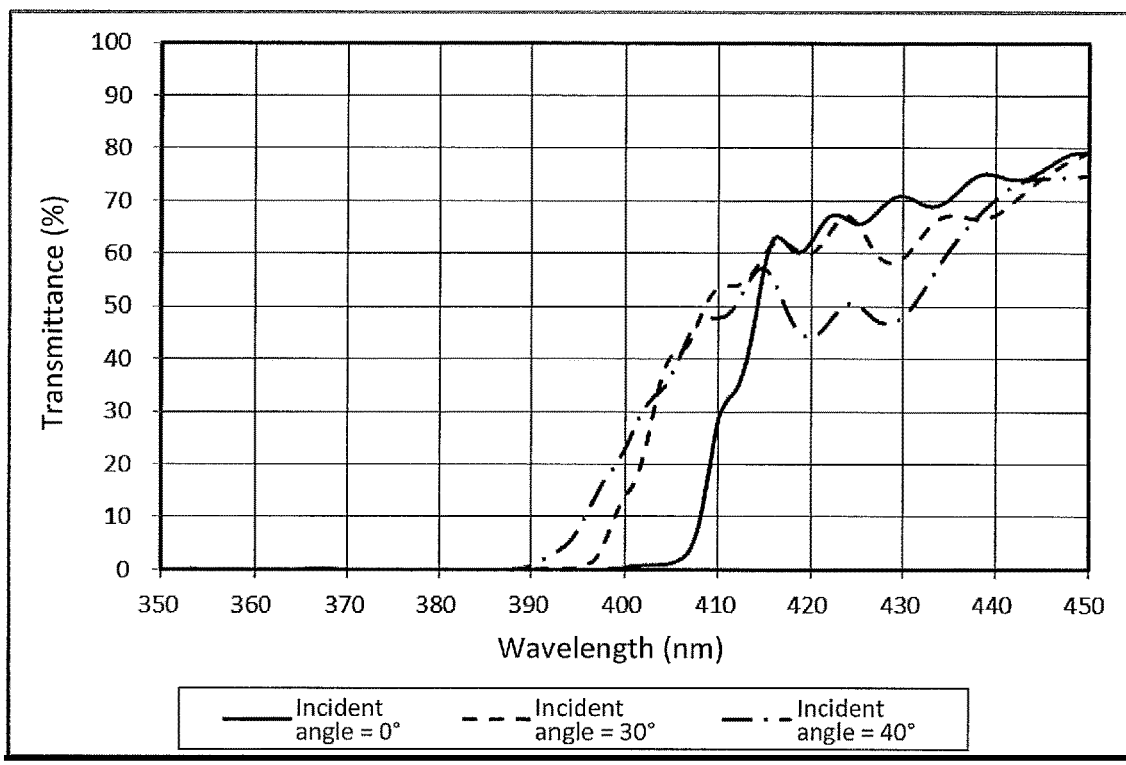
FIG. 52 is a graph showing the spectral transmittance of an infrared-cut filter according to Example 9 in the wavelength range of 350 to 450 nm.
Figure 53:
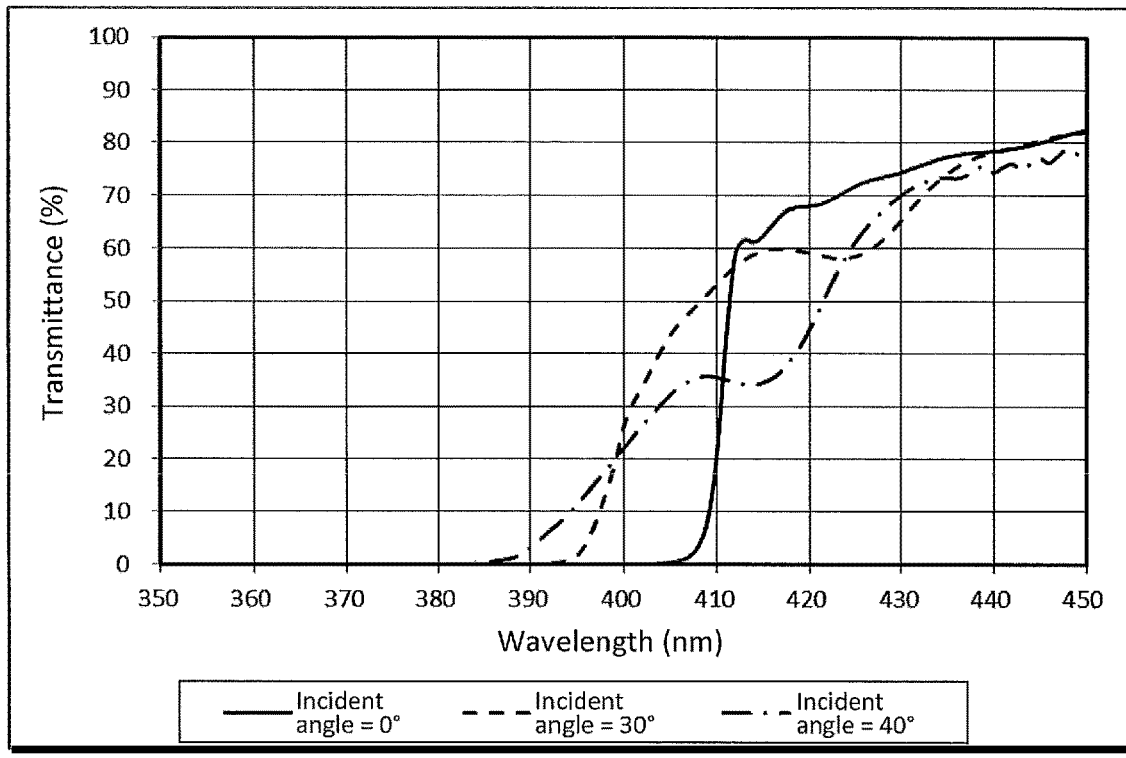
FIG. 53 is a graph showing the spectral transmittance of an infrared-cut filter according to Example 10 in the wavelength range of 350 to 450 nm.

One parameter for evaluating the difference in hue in an image obtained by an imaging apparatus is a B/G ratio. Light was made incident on the infrared-cut filter according to Example 7 with the incident angle of light varied stepwise from 0° to 40°, and a transmittance spectrum in the wavelength range of 350 to 1100 nm was obtained for each incident angle. Then, for a situation where the infrared-cut filter according to Example 7 is used in combination with an imaging sensor having spectral sensitivity as shown in FIG. 31, it was examined how the B/G ratio changes as the angle of light incident on the infrared-cut filter according to Example 7 is varied stepwise from 0° to 40°. Herein, a B/G ratio refers to the ratio of the spectral sensitivity of an imaging sensor to light transmitted through an infrared-cut filter and a B filter to the spectral sensitivity of the imaging sensor to light transmitted through the infrared-cut filter and a G filter. The value of the B/G ratio as obtained when the angle of light incident on the infrared-cut filter according to Example 7 was 0° was defined as 1.0, with respect to which a relative value of the B/G ratio was determined for each incident angle. Results shown in FIG. 33 were thus obtained. In particular, the B/G ratio at an incident angle of 40° was 1.02. Results obtained in the same manner for the infrared-cut filters according to Examples 1 to 10 are shown in the bottom rows of Tables 4 to 6. As seen from these results, the B/G ratio was 1.03 or less in all of Examples. It is generally considered that a high-quality image with good color reproduction is obtained when the B/G ratio is 0.97 or more and 1.03 or less. For all of the infrared-cut filters according to Examples, the relative value of the B/G ratio did not change much even when the angle of light incident on the infrared-cut filters according to Examples was increased from 0° to 40°. This suggested that the infrared-cut filters according to Examples are advantageous in obtaining an image with good color reproduction when the incident angle significantly changes.

The transmittance spectra obtained for the first laminates according to Examples 1, 6, 7, 8, 9, and 10 at an incident angle of 40° had, in the wavelength range of 400 to 450 nm, a ripple which occurs in the case of an incident angle of 40°. The second laminates according to Examples 4, 5, 7, 8, 9, and 10 each contained an ultraviolet-absorbing substance. A focus was therefore placed on the transmittance spectra in the wavelength range of 350 to 450 nm of the second laminates and infrared-cut filters according to all of Examples including Examples mentioned above. The transmittance spectra in the wavelength range of 350 to 450 nm of the first laminates according to Examples 1 to 10 are shown in FIGS. 34 to 43, and the transmittance spectra in the wavelength range of 350 to 450 nm of the infrared-cut filters according to Examples 1 to 10 are shown in FIGS. 44 to 53. For the transmittance spectra obtained when light was incident on the first laminates according to Examples 1 to 10 at an incident angle of 40°, as shown in FIGS. 34 to 43, the transition band between the transmission band and the ultraviolet reflection band was shifted to the shorter wavelength side, compared to that when light was perpendicularly incident on the first laminates according to Examples 1 to 10. Thus, for the first laminate according to Example 1, the wavelength $\lambda^L_R$ (0°, 50%) which is in the transition band of the transmittance spectrum obtained at an incident angle of 0° and at which the transmittance is 50% was about 411 nm, while the wavelength $\lambda^L_R$ (40°, 50%) which is in the transition band of the transmittance spectrum obtained at an incident angle of 40° and at which the transmittance is 50% was 393 nm. In Example 2, $\lambda^L_R$ (0°, 50%) was 405 nm, while $\lambda^L_R$ (40°, 50%) was 387 nm. In Example 3, $\lambda^L_R$ (0°, 50%) was 405 nm, while $\lambda^L_R$ (40°, 50%) was about 387 nm. In Example 4, $\lambda^L_R$ (0°, 50%) was 405 nm, while $\lambda^L_R$ (40°, 50%) was 387 nm. In Example 5, $\lambda^L_R$ (0°, 50%) was 405 nm, while $\lambda^L_R$ (40°, 50%) was 387 nm. In Example 6, $\lambda^L_R$ (0°, 50%) was 410 nm, while $\lambda^L_R$ (40°, 50%) was 392 nm. In Example 7, $\lambda^L_R$ (0°, 50%) was 410 nm, while $\lambda^L_R$ (40°, 50%) was 392 nm. In Example 8, $\lambda^L_R$ (0°, 50%) was 410 nm, while $\lambda^L_R$ (40°, 50%) was 394 nm. In Example 9, $\lambda^L_R$ (0°, 50%) was 410 nm, while $\lambda^L_R$ (40°, 50%) was 394 nm. In Example 10, $\lambda^L_R$ (0°, 50%) was 410 nm, while $\lambda^L_R$ (40°, 50%) was 386 nm. This suggested that the amount of short wavelength light transmitted through the infrared-cut filters according to all of Examples tends to increase with increasing incident angle. The effective range of the wavelength of light that can be transmitted through a B filter (the wavelength range where the transmittance is 20% or more) is, for example, from about 380 to 550 nm. An increase in the amount of short wavelength light due to an increase in incident angle may therefore affect the amount of light received by an imaging sensor to deteriorate the color reproduction and hue uniformity in the resulting image.

As shown in FIG. 34 and FIGS. 39 to 43, the transmittance spectra obtained when light was incident on the first laminates according to Examples 1, 6, 7, 8, 9, and 10 at an incident angle of 40° had a spectrum (ripple) which has a minimum differing by 15 or more points from the baseline in the wavelength range of 400 to 450 nm, in which the half-width is 10 nm or or more, and in which, when the half-width is defined as $\Delta\lambda_c$, a maximum exists in the range from $(400-\Delta\lambda_c/2)$ to $(450-\Delta\lambda_c/2)$ nm. Accordingly, as shown in FIG. 44 and FIGS. 49 to 53, this ripple was reflected in the transmittance spectra obtained when light was incident on the infrared-cut filters according to Examples 1, 6, 7, 8, 9, and 10 at an incident angle of 40°. This suggested that the infrared-cut filters according to Examples 1, 6, 7, 8, 9, and 10 can, when the transition band is shifted to the shorter wavelength side with increasing incident angle, counterbalance the corresponding increase in the amount of short wavelength light and thereby control the B/G ratio, which is an important parameter for an imaging sensor, within a predefined range as shown in Tables 4 to 6. For the transmittance spectra obtained when light was incident on the second laminates according to Examples 4, 5, 7, 8, 9, and 10, as shown in FIG. 37, FIG. 38, and FIGS. 40 to 43, the spectral transmittance at the wavelength $\lambda^L_R$ (0°, 50%) was 55% or less, and the spectral transmittance of the second laminates decreased from 70% to 20% or less in the wavelength range of 350 to 450 nm. Accordingly, for the transmittance spectra obtained when light was incident on the infrared-cut filters according to Examples 4, 5, 7, 8, 9, and 10 at incident angles of 0° and 40°, the absolute value $|\Delta\lambda^L$ (50%)$|$ of the difference between the wavelength $\lambda^L$ (0°, 50%), at which the spectral transmittance was 50% when the incident angle was 0°, and the wavelength $\lambda^L$ (40°, 50%), at which the spectral transmittance was 50% when the incident angle was 40°, was 10 nm or less as shown in FIG. 47, FIG. 48, and FIGS. 50 to 53. This suggested that the infrared-cut filters according to Examples 4, 5, 7, 8, 9, and 10 can, when the transition band is shifted to the shorter wavelength side with increasing incident angle, counterbalance the corresponding increase in the amount of short wavelength light and thereby control the B/G ratio, which is an important parameter for an imaging sensor, within a predefined range as shown in Tables 4 to 6.

<Evaluation 2>

Figure 54:
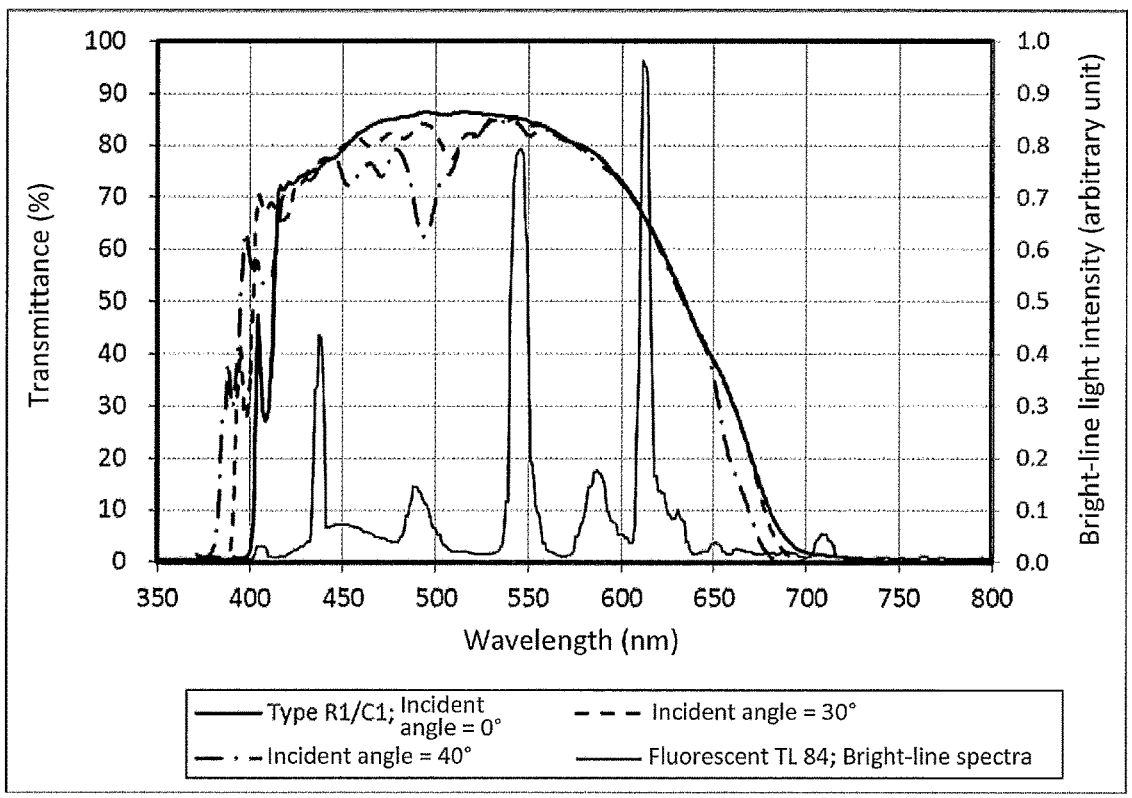
FIG. 54 is a graph showing the light intensity spectrum of fluorescent TL84 and the spectral transmittance of the infrared-cut filter of Example 1.
Figure 55:
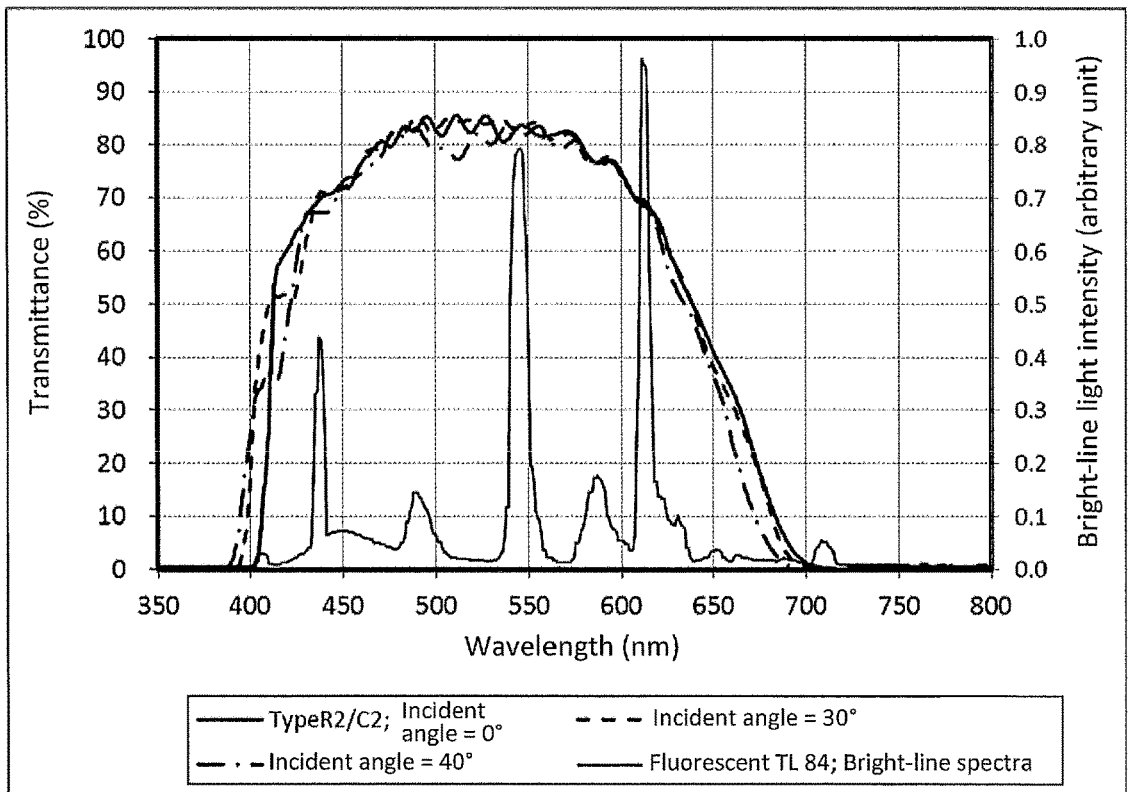
FIG. 55 is a graph showing the light intensity spectrum of fluorescent TL84 and the spectral transmittance of the infrared-cut filter of Example 8.

The infrared-cut filters according to Example 1 and Example 8 were chosen as representatives of all Examples, and the relationship of the transmittance spectra of these infrared-cut filters with bright-line spectra of illuminant TL84 was evaluated. As shown in FIG. 54 and FIG. 55, the light intensity spectrum of illuminant TL84 had bright-line spectra in the vicinity of a wavelength of 440 nm, in the vicinity of a wavelength of 550 nm, and in the vicinity of a wavelength of 610 nm. If a relatively large ripple (such as a spectrum having an extremum differing by 4 or more points from the baseline and having a half-width of 15 nm or more) overlapping the bright-line spectra appears in a transmittance spectrum of an infrared-cut filter, an imaging apparatus including the infrared-cut filter can fail to produce an image with good color reproduction. As shown in FIG. 54, FIG. 55, and FIGS. 10 to 30, however, no relatively large ripple overlapping the bright-line spectra shown by illuminant TL84 in the vicinity of a wavelength of 440 nm, in the vicinity of a wavelength of 550 nm, and in the vicinity of a wavelength of 610 nm appeared in the transmittance spectra of the infrared-cut filters according to Examples 1 to 10 for all of the incident angles. This suggested that the use of any of the infrared-cut filters according to Examples 1 to 10 in an imaging apparatus makes it easy to obtain an image with good color reproduction even under illuminant TL84.

TABLE 1

|  |  |  | Example 1 | Example 2 | Example 3 | Example 4 |
|---|---|---|---|---|---|---|
| Near-infrared reflecting film (First laminate) | Configuration | SiO$_2$/TiO$_2$ arrangement | 17 layers of each: R1 | 17 layers of each: R2 | 20 layers of each: R3 | 17 layers of each: R2 |
|  |  | Total film thickness | 5 μm | 5 μm | 6 μm | 5 μm |
|  |  | Ripple (400 to 450 nm) | Present | Absent | Absent | Absent |

TABLE 1-continued

|  |  |  | Example 1 | Example 2 | Example 3 | Example 4 |
|---|---|---|---|---|---|---|
|  | Specified wavelengths (nm) (600 to 800 nm) | $\lambda^H_R$ (0°, 70%) | 711 | 715 | 727 | 715 |
|  |  | $\lambda^H_R$ (0°, 50%) | 714 | 720 | 738 | 720 |
|  |  | $\lambda^H_R$ (0°, 20%) | 721 | 731 | 766 | 731 |
|  |  | $\lambda^H_R$ (40°, 70%) | 655 | 658 | 672 | 658 |
|  |  | $\lambda^H_R$ (40°, 50%) | 666 | 670 | 685 | 670 |
|  |  | $\lambda^H_R$ (40°, 20%) | 677 | 684 | 717 | 684 |
|  |  | $\Delta\lambda^H_R$ (70%) | 56 | 57 | 55 | 57 |
|  |  | $\Delta\lambda^H_R$ (50%) | 48 | 50 | 53 | 50 |
|  |  | $\Delta\lambda^H_R$ (20%) | 44 | 47 | 49 | 47 |
|  | Specified wavelengths (nm) (350 to 450 nm) | $\lambda^L_R$ (0°, 70%) | 413 | 406 | 406 | 406 |
|  |  | $\lambda^L_R$ (0°, 50%) | 411 | 405 | 405 | 405 |
|  |  | $\lambda^L_R$ (0°, 20%) | 403 | 402 | 402 | 402 |
|  |  | $\lambda^L_R$ (40°, 70%) | 410 | 389 | 389 | 389 |
|  |  | $\lambda^L_R$ (40°, 50%) | 393 | 387 | 387 | 387 |
|  |  | $\lambda^L_R$ (40°, 20%) | 384 | 385 | 385 | 385 |
|  |  | $\Delta\lambda^L_R$ (70%) | 3 | 17 | 17 | 17 |
|  |  | $\Delta\lambda^L_R$ (50%) | 18 | 18 | 18 | 18 |
|  |  | $\Delta\lambda^L_R$ (20%) | 19 | 17 | 17 | 17 |
| Absorbing film (Second laminate) | Configuration | Number of layers A1, A2: Organic dye A3: Organic dye + UV-absorbing substance B1, B2: Copper phosphonate | One layer Absorbing film: A1 (3 μm) | One layer Absorbing film: A2 (3 μm) | Two layers First absorbing film: A2 (3 μm) Second absorbing film: B1 (50 μm) | One layer Absorbing film: A3 (3 μm) |
|  | Specified wavelengths (nm) (600 to 800 nm) | $\lambda^H_A$ (0°, 70%) | 612 | 619 | 609 | 619 |
|  |  | $\lambda^H_A$ (0°, 50%) | 637 | 643 | 635 | 642 |
|  |  | $\lambda^H_A$ (0°, 20%) | 671 | 676 | 669 | 676 |
|  | Specified wavelengths (nm) (350 to 450 nm) | $\lambda^L_A$ (0°, 70%) | — | 380 | 392 | 428 |
|  |  | $\lambda^L_A$ (0°, 50%) | — | — | 371 | 408 |
|  |  | $\lambda^L_A$ (0°, 20%) | — | — | 352 | 397 |
|  | Transmittances of reflecting film at specified wavelengths (%) | $\lambda^H_R$ (0°, 70%) | 1.5 | 0.2 | 0.5 | 0.2 |
|  |  | $\lambda^H_R$ (0°, 50%) | 2.4 | 0.3 | 1.1 | 0.3 |
|  |  | $\lambda^H_R$ (0°, 20%) | 4.9 | 1.7 | 1.2 | 1.8 |
|  |  | $\lambda^H_R$ (40°, 70%) | 36.9 | 37.9 | 17.2 | 37.7 |
|  |  | $\lambda^H_R$ (40°, 50%) | 26.0 | 26.3 | 7.2 | 26.1 |
|  |  | $\lambda^H_R$ (40°, 20%) | 13.9 | 11.1 | 0.3 | 11.1 |
|  |  | $\lambda^L_R$ (0°, 70%) | 76.2 | 72.3 | 16.7 | 46.2 |
|  |  | $\lambda^L_R$ (0°, 50%) | 76.5 | 72.4 | 6.1 | 43.5 |
|  |  | $\lambda^L_R$ (0°, 20%) | 77.8 | 72.4 | 0.9 | 34.6 |
|  |  | $\lambda^L_R$ (40°, 70%) | 76.7 | 72.4 | 71.5 | 4.0 |
|  |  | $\lambda^L_R$ (40°, 50%) | 79.5 | 71.9 | 71.5 | 2.3 |
|  |  | $\lambda^L_R$ (40°, 20%) | 80.4 | 71.4 | 71.4 | 1.4 |

TABLE 2

|  |  |  | Example 5 | Example 6 | Example 7 | Example 8 |
|---|---|---|---|---|---|---|
| Near-infrared reflecting film (First laminate) | Configuration | SiO$_2$/TiO$_2$ arrangement Total film thickness Ripple (400 to 450 nm) | 20 layers of each: R4 6 μm Absent | 18 layers of each: R5 5.5 μm Present | 18 layers of each: R6 5.5 μm Present | 19 layers of each: R7 6 μm Present |
|  | Specified wavelengths (nm) (600 to 800 nm) | $\lambda^H_R$ (0°, 70%) | 727 | 714 | 715 | 743 |
|  |  | $\lambda^H_R$ (0°, 50%) | 738 | 720 | 720 | 749 |
|  |  | $\lambda^H_R$ (0°, 20%) | 766 | 730 | 731 | 761 |
|  |  | $\lambda^H_R$ (40°, 70%) | 672 | 659 | 659 | 683 |
|  |  | $\lambda^H_R$ (40°, 50%) | 685 | 668 | 667 | 697 |
|  |  | $\lambda^H_R$ (40°, 20%) | 717 | 685 | 684 | 712 |
|  |  | $\Delta\lambda^H_R$ (70%) | 55 | 55 | 56 | 60 |
|  |  | $\Delta\lambda^H_R$ (50%) | 53 | 52 | 53 | 52 |
|  |  | $\Delta\lambda^H_R$ (20%) | 49 | 45 | 47 | 49 |
|  | Specified wavelengths (nm) (350 to 450 nm) | $\lambda^L_R$ (0°, 70%) | 406 | 411 | 411 | 414 |
|  |  | $\lambda^L_R$ (0°, 50%) | 405 | 410 | 409 | 410 |
|  |  | $\lambda^L_R$ (0°, 20%) | 402 | 406 | 406 | 408 |
|  |  | $\lambda^L_R$ (40°, 70%) | 389 | 394 | 394 | 396 |
|  |  | $\lambda^L_R$ (40°, 50%) | 387 | 392 | 391 | 394 |
|  |  | $\lambda^L_R$ (40°, 20%) | 385 | 388 | 388 | 390 |
|  |  | $\Delta\lambda^L_R$ (70%) | 17 | 17 | 17 | 18 |
|  |  | $\Delta\lambda^L_R$ (50%) | 18 | 18 | 18 | 16 |
|  |  | $\Delta\lambda^L_R$ (20%) | 17 | 18 | 18 | 18 |

TABLE 2-continued

|  |  |  | Example 5 | Example 6 | Example 7 | Example 8 |
|---|---|---|---|---|---|---|
| Absorbing film (Second laminate) | Configuration | Number of layers A1, A2: Organic dye A3: Organic dye + UV-absorbing substance B1, B2: Copper phosphonate | Two layers First absorbing film: A3 (3 μm) Second absorbing film: B1 (50 μm) | Two layers First absorbing film: A2 (3 μm) Second absorbing film: B1 (50 μm) | One layer Absorbing film: A3 (3 μm) | Two layers First absorbing film: A3 (3 μm) Second absorbing film: B1 (50 μm) |
|  | Specified wavelengths (nm) (600 to 800 nm) | $\lambda^H_A$ (0°, 70%) | 608 | 609 | 619 | 608 |
|  |  | $\lambda^H_A$ (0°, 50%) | 634 | 635 | 642 | 634 |
|  |  | $\lambda^H_A$ (0°, 20%) | 669 | 669 | 676 | 669 |
|  | Specified wavelengths (nm) (350 to 450 nm) | $\lambda^L_A$ (0°, 70%) | 430 | 392 | 428 | 430 |
|  |  | $\lambda^L_A$ (0°, 50%) | 408 | 371 | 408 | 408 |
|  |  | $\lambda^L_A$ (0°, 20%) | 397 | 352 | 397 | 397 |
|  | Transmittances of reflecting film at specified wavelengths (%) | $\lambda^H_R$ (0°, 70%) | 0.5 | 0.3 | 0.2 | 1.3 |
|  |  | $\lambda^H_R$ (0°, 50%) | 1.1 | 0.3 | 0.3 | 1.2 |
|  |  | $\lambda^H_R$ (0°, 20%) | 1.2 | 0.7 | 1.4 | 1.1 |
|  |  | $\lambda^H_R$ (40°, 70%) | 17.1 | 29.0 | 36.9 | 8.4 |
|  |  | $\lambda^H_R$ (40°, 50%) | 7.2 | 20.8 | 28.2 | 2.1 |
|  |  | $\lambda^H_R$ (40°, 20%) | 0.3 | 7.2 | 10.2 | 0.4 |
|  |  | $\lambda^L_R$ (0°, 70%) | 45.7 | 70.9 | 56.3 | 59.7 |
|  |  | $\lambda^L_R$ (0°, 50%) | 43 | 71.0 | 54.7 | 54.1 |
|  |  | $\lambda^L_R$ (0°, 20%) | 34.2 | 71.5 | 46.2 | 50.3 |
|  |  | $\lambda^L_R$ (40°, 70%) | 3.7 | 70.6 | 11.9 | 16.4 |
|  |  | $\lambda^L_R$ (40°, 50%) | 2.2 | 69.9 | 8.0 | 11.6 |
|  |  | $\lambda^L_R$ (40°, 20%) | 1.2 | 67.7 | 3.1 | 4.8 |

TABLE 3

|  |  |  | Example 9 | Example 10 |
|---|---|---|---|---|
| Near-infrared reflecting film (First laminate) | Configuration | SiO₂/TiO₂ arrangement | 19 layers of each: R7 | First reflecting film R81 16 layers of each Second reflecting film R82 16 layers of each |
|  |  | Total film thickness | 6 μm | 8 μm |
|  |  | Ripple (400 to 450 nm) | Present | Present |
|  | Specified wavelengths (nm) (600 to 800 nm) | $\lambda^H_R$ (0°, 70%) | 743 | 715 |
|  |  | $\lambda^H_R$ (0°, 50%) | 749 | 719 |
|  |  | $\lambda^H_R$ (0°, 20%) | 761 | 727 |
|  |  | $\lambda^H_R$ (40°, 70%) | 683 | 659 |
|  |  | $\lambda^H_R$ (40°, 50%) | 697 | 676 |
|  |  | $\lambda^H_R$ (40°, 20%) | 712 | 684 |
|  |  | $\Delta\lambda^H_R$ (70%) | 60 | 56 |
|  |  | $\Delta\lambda^H_R$ (50%) | 52 | 43 |
|  |  | $\Delta\lambda^H_R$ (20%) | 49 | 43 |
|  | Specified wavelengths (nm) (350 to 450 nm) | $\lambda^L_R$ (0°, 70%) | 414 | 411 |
|  |  | $\lambda^L_R$ (0°, 50%) | 410 | 410 |
|  |  | $\lambda^L_R$ (0°, 20%) | 408 | 409 |
|  |  | $\lambda^L_R$ (40°, 70%) | 396 | 389 |
|  |  | $\lambda^L_R$ (40°, 50%) | 394 | 386 |
|  |  | $\lambda^L_R$ (40°, 20%) | 390 | 383 |
|  |  | $\Delta\lambda^L_R$ (70%) | 18 | 22 |
|  |  | $\Delta\lambda^L_R$ (50%) | 16 | 24 |
|  |  | $\Delta\lambda^L_R$ (20%) | 18 | 26 |
| Absorbing film (Second laminate) | Configuration | Number of layers A1, A2: Organic dye A3: Organic dye + UV-absorbing substance B1, B2: Copper phosphonate | Three layers Second absorbing film: B2 (100 μm) SiO₂ film (3 μm) First absorbing film: A3 (3 μm) | Three layers Second absorbing film: B2 (100 μm) SiO₂ film (3 μm) First absorbing film: A3 (3 μm) |
|  | Specified wavelengths (nm) (600 to 800 nm) | $\lambda^H_A$ (0°, 70%) | 608 | 608 |
|  |  | $\lambda^H_A$ (0°, 50%) | 634 | 634 |
|  |  | $\lambda^H_A$ (0°, 20%) | 669 | 669 |
|  | Specified wavelengths (nm) (350 to 450 nm) | $\lambda^L_A$ (0°, 70%) | 430 | 430 |
|  |  | $\lambda^L_A$ (0°, 50%) | 408 | 408 |
|  |  | $\lambda^L_A$ (0°, 20%) | 397 | 397 |
|  | Transmittances of reflecting film at specified wavelengths (%) | $\lambda^H_R$ (0°, 70%) | 1.3 | 0.3 |
|  |  | $\lambda^H_R$ (0°, 50%) | 1.2 | 0.3 |
|  |  | $\lambda^H_R$ (0°, 20%) | 1.1 | 0.5 |
|  |  | $\lambda^H_R$ (40°, 70%) | 8.4 | 28.9 |
|  |  | $\lambda^H_R$ (40°, 50%) | 2.1 | 13.7 |

TABLE 3-continued

|  | Example 9 | Example 10 |
|---|---|---|
| $\lambda^H_R$ (40°, 20%) | 0.4 | 7.8 |
| $\lambda^L_R$ (0°, 70%) | 59.7 | 55.7 |
| $\lambda^L_R$ (0°, 50%) | 54.1 | 54.1 |
| $\lambda^L_R$ (0°, 20%) | 50.3 | 52.2 |
| $\lambda^L_R$ (40°, 70%) | 16.4 | 3.7 |
| $\lambda^L_R$ (40°, 50%) | 11.6 | 1.6 |
| $\lambda^L_R$ (40°, 20%) | 4.8 | 0.8 |

TABLE 4

| | | | Example 1 | Example 2 | Example 3 | Example 4 |
|---|---|---|---|---|---|---|
| Infrared-cut filter | Configuration | Near-infrared reflecting film (First laminate) | R1 Ripple was absent | R2 Ripple was absent | R3 Ripple was absent | R2 Ripple was absent |
| | | Absorbing film (Second laminate) | A1 One layer Containing no UV-absorbing substance | A2 One layer Containing no UV-absorbing substance | A2 + B1 Two layers Containing no UV-absorbing substance | A3 One layer Containing UV-absorbing substance |
| | | Filter film configuration | Reflecting film (R1) Substrate Absorbing film (A1) | Reflecting film (R2) Substrate Absorbing film (A2) | Reflecting film (R3) Substrate Second absorbing film (B1) First absorbing film (A2) | Reflecting film (R2) Substrate Absorbing film (A3) |
| | Specified wavelengths (nm) (600 to 800 nm) | $\lambda^H$ (0°, 70%) | 614 | 621 | 612 | 621 |
| | | $\lambda^H$ (0°, 50%) | 638 | 644 | 635 | 643 |
| | | $\lambda^H$ (0°, 20%) | 672 | 676 | 669 | 676 |
| | | $\lambda^H$ (40°, 70%) | 612 | 618 | 607 | 620 |
| | | $\lambda^H$ (40°, 50%) | 635 | 640 | 632 | 642 |
| | | $\lambda^H$ (40°, 20%) | 658 | 663 | 661 | 663 |
| | | $|\Delta\lambda^H (70\%)|$ | 2 | 3 | 5 | 1 |
| | | $|\Delta\lambda^H (50\%)|$ | 3 | 4 | 3 | 1 |
| | | $|\Delta\lambda^H (20\%)|$ | 14 | 13 | 8 | 13 |
| | Specified wavelengths (nm) (350 to 450 nm) | $\lambda^L$ (0°, 70%) | 414 | 410 | 411 | 426 |
| | | $\lambda^L$ (0°, 50%) | 412 | 406 | 406 | 409 |
| | | $\lambda^L$ (0°, 20%) | 403 | 403 | 403 | 404 |
| | | $\lambda^L$ (40°, 70%) | 415 | 393 | 397 | 433 |
| | | $\lambda^L$ (40°, 50%) | 389 | 389 | 389 | 408 |
| | | $\lambda^L$ (40°, 20%) | 384 | 385 | 385 | 398 |
| | | $|\Delta\lambda^L (70\%)|$ | 1 | 17 | 14 | 7 |
| | | $|\Delta\lambda^L (50\%)|$ | 23 | 17 | 17 | 1 |
| | | $|\Delta\lambda^L (20\%)|$ | 19 | 18 | 18 | 6 |
| | B/G ratio (incident angle = 40°) | | 1.00 | 1.03 | 1.03 | 1.00 |

TABLE 5

| | | | Example 5 | Example 6 | Example 7 | Example 8 |
|---|---|---|---|---|---|---|
| Infrared-cut filter | Configuration | Near-infrared reflecting film (First laminate) | R4 Ripple was absent | R5 Ripple was present | R6 Ripple was present | R7 Ripple was present |
| | | Absorbing film (Second laminate) | A3 + B1 Two layers Containing UV-absorbing substance | A2 + B1 Two layers Containing no UV-absorbing substance | A3 One layer Containing UV-absorbing substance | A3 + B1 Two layers Containing UV-absorbing substance |

TABLE 5-continued

|  |  | Example 5 | Example 6 | Example 7 | Example 8 |
|---|---|---|---|---|---|
|  | Filter film configuration | Reflecting film (R4) Substrate Second absorbing film (B1) First absorbing film (A3) | Reflecting film (R5) Substrate Second absorbing film (B1) First absorbing film (A2) | Reflecting film (R6) Substrate Absorbing film (A3) | Reflecting film (R7) Substrate Second absorbing film (B1) First absorbing film (A3) |
| Specified wavelengths (nm) (600 to 800 nm) | $\lambda^H$ (0°, 70%) | 611 | 621 | 620 | 610 |
|  | $\lambda^H$ (0°, 50%) | 634 | 643 | 642 | 634 |
|  | $\lambda^H$ (0°, 20%) | 669 | 675 | 675 | 668 |
|  | $\lambda^H$ (40°, 70%) | 606 | 617 | 618 | 607 |
|  | $\lambda^H$ (40°, 50%) | 632 | 637 | 636 | 630 |
|  | $\lambda^H$ (40°, 20%) | 661 | 663 | 663 | 662 |
|  | $|\Delta\lambda^H (70\%)|$ | 5 | 4 | 2 | 3 |
|  | $|\Delta\lambda^H (50\%)|$ | 2 | 6 | 6 | 4 |
|  | $|\Delta\lambda^H (20\%)|$ | 8 | 12 | 12 | 6 |
| Specified wavelengths (nm) (350 to 450 nm) | $\lambda^L$ (0°, 70%) | 427 | 413 | 428 | 435 |
|  | $\lambda^L$ (0°, 50%) | 409 | 411 | 412 | 414 |
|  | $\lambda^L$ (0°, 20%) | 404 | 407 | 408 | 409 |
|  | $\lambda^L$ (40°, 70%) | 436 | 397 | 429 | 440 |
|  | $\lambda^L$ (40°, 50%) | 409 | 394 | 420 | 412 |
|  | $\lambda^L$ (40°, 20%) | 398 | 389 | 398 | 399 |
|  | $|\Delta\lambda^L (70\%)|$ | 9 | 16 | 1 | 5 |
|  | $|\Delta\lambda^L (50\%)|$ | 0 | 17 | 8 | 2 |
|  | $|\Delta\lambda^L (20\%)|$ | 6 | 18 | 10 | 10 |
| B/G ratio (incident angle = 40°) |  | 1.00 | 1.01 | 1.02 | 1.02 |

TABLE 6

|  |  |  | Example 9 | Example 10 |
|---|---|---|---|---|
| Infra-red-cut filter | Configuration | Near-infrared reflecting film (First laminate) | R7 Ripple was present | R8 Ripple was present First reflecting film R81 Second reflecting film R82 |
|  |  | Absorbing film (Second laminate) | A3 + SiO$_2$ + B1 Three layers Containing UV-absorbing substance | A3 + SiO$_2$ + B1 Three layers Containing UV-absorbing substance |
|  |  | Filter film configuration | Reflecting film (R7) Second absorbing film (B2) SiO$_2$ film First absorbing film (A3) | First reflecting film (R81) Second absorbing film (B2) SiO$_2$ film First absorbing film (A3) Second reflecting film (R82) |
| Specified wavelengths (nm) (600 to 800 nm) | $\lambda^H$ (0°, 70%) |  | 610 | 615 |
|  | $\lambda^H$ (0°, 50%) |  | 634 | 637 |
|  | $\lambda^H$ (0°, 20%) |  | 668 | 669 |
|  | $\lambda^H$ (40°, 70%) |  | 607 | 611 |
|  | $\lambda^H$ (40°, 50%) |  | 630 | 633 |
|  | $\lambda^H$ (40°, 20%) |  | 662 | 659 |
|  | $|\Delta\lambda^H (70\%)|$ |  | 3 | 4 |
|  | $|\Delta\lambda^H (50\%)|$ |  | 4 | 4 |
|  | $|\Delta\lambda^H (20\%)|$ |  | 6 | 10 |
| Specified wavelengths (nm) (350 to 450 nm) | $\lambda^L$ (0°, 70%) |  | 428 | 423 |
|  | $\lambda^L$ (0°, 50%) |  | 414 | 411 |
|  | $\lambda^L$ (0°, 20%) |  | 409 | 410 |
|  | $\lambda^L$ (40°, 70%) |  | 440 | 430 |
|  | $\lambda^L$ (40°, 50%) |  | 412 | 421 |
|  | $\lambda^L$ (40°, 20%) |  | 399 | 399 |
|  | $|\Delta\lambda^L (70\%)|$ |  | 12 | 7 |
|  | $|\Delta\lambda^L (50\%)|$ |  | 2 | 10 |
|  | $|\Delta\lambda^L (20\%)|$ |  | 10 | 11 |
| B/G ratio (incident angle = 40°) |  |  | 1.00 | 1.00 |

The invention claimed is:

1. An infrared-cut filter comprising:
a near-infrared reflecting film; and
an absorbing film lying parallel to the near-infrared reflecting film, wherein
the near-infrared reflecting film and the absorbing film have the following features (A) to (E):

(A) when a wavelength which is in the wavelength range of 600 to 800 nm and at which spectral transmittance of light perpendicularly incident on the near-infrared reflecting film is 70% is defined as a wavelength $\lambda^H_R$ (0°, 70%) and a wavelength which is in the wavelength range of 600 to 800 nm and at which the spectral transmittance of light perpendicularly incident on the near-infrared reflecting film is 20% is defined as a wavelength $\lambda^H_R$ (0°, 20%), the spectral transmittance of light perpendicularly incident on the near-infrared reflecting film monotonically decreases in the range from the wavelength $\lambda^H_R$ (0°, 70%) to the wavelength $\lambda^H_R$ (0°, 20%) in such a manner that the wavelength $\lambda^H_R$ (0°, 70%) is 700 nm or longer and the wavelength $\lambda^H_R$ (0°, 20%) is 770 nm or shorter and is longer than the wavelength $\lambda^H_R$ (0°, 70%);

(B) when a wavelength which is in the wavelength range of 600 to 800 nm and at which spectral transmittance of light incident on the near-infrared reflecting film at an incident angle of 40° is 70% is defined as a wavelength $\lambda^H_R$ (40°, 70%) and a wavelength which is in the wavelength range of 600 to 800 nm and at which the spectral transmittance of light incident on the near-infrared reflecting film at an incident angle of 40° is 20% is defined as a wavelength $\lambda^H_R$ (40°, 20%), the spectral transmittance of light incident on the near-infrared reflecting film at an incident angle of 40° monotonically decreases in the range from the wavelength $\lambda^H_R$ (40°, 70%) to the wavelength $\lambda^H_R$ (40°, 20%) in such a manner that the wavelength $\lambda^H_R$ (40°, 70%) is 650 nm or longer and the wavelength $\lambda^H_R$ (40°, 20%) is 720 nm or shorter and is longer than the wavelength $\lambda^H_R$ (40°, 70%);

(C) spectral transmittance of light incident on the absorbing film at an incident angle of 40° is 20% at a wavelength $\lambda^H_A$ (40°, 20%) which is in the wavelength range of 600 to 800 nm and which is shorter than the wavelength $\lambda^H_R$ (40°, 20%);

(D) spectral transmittance of light perpendicularly incident on the absorbing film is 15% or less at the wavelength $\lambda^H_R$ (0°, 20%), and the spectral transmittance of light incident on the absorbing film at an incident angle of 40° is 15% or less at the wavelength $\lambda^H_R$ (40°, 20%); and (E) an average of the spectral transmittance of light perpendicularly incident on the near-infrared reflecting film and an average of the spectral transmittance of light incident on the near-infrared reflecting film at an incident angle of 40° are 75% or more in the wavelength range of 450 to 600 nm, and an average of the spectral transmittance of light perpendicularly incident on the absorbing film and an average of the spectral transmittance of light incident on the absorbing film at an incident angle of 40° are 75% or more in the wavelength range of 450 to 600 nm.

2. The infrared-cut filter according to claim 1, wherein the near-infrared reflecting film is formed by alternately arranging two or more materials with different refractive indices in layers, and the absorbing film contains a substance having an absorption peak in the range from the wavelength $\lambda^H_R$ (40°, 70%) as defined for the feature (B) to the wavelength $\lambda^H_R$ (0°, 20%) as defined for the feature (A).

3. The infrared-cut filter according to claim 1 or 2, wherein an absolute value of a difference between a wavelength $\lambda^H$ (0°, 50%) which is in the wavelength range of 600 to 700 nm and at which spectral transmittance of light perpendicularly incident on the infrared-cut filter is 50% and a wavelength $\lambda^H$ (40°, 50%) which is in the wavelength range of 600 to 700 nm and at which spectral transmittance of light incident on the infrared-cut filter at an incident angle of 40° is 50% is 10 nm or less.

4. The infrared-cut filter according to claim 1, wherein the near-infrared reflecting film and the absorbing film further have the following features (F) to (I):

(F) in the wavelength range of 350 to 450 nm, the spectral transmittance of light perpendicularly incident on the near-infrared reflecting film monotonically increases in the range from a wavelength $\lambda^L_R$ (0°, 20%) at which the spectral transmittance is 20% to a wavelength $\lambda^L_R$ (0°, 70%) at which the spectral transmittance is 70% in such a manner that the wavelength $\lambda^L_R$ (0°, 20%) is 390 nm or longer and is shorter than the wavelength $\lambda^L_R$ (0°, 70%);

(G) in the wavelength range of 350 to 450 nm, the spectral transmittance of light incident on the near-infrared reflecting film at an incident angle of 40° monotonically increases in the range from a wavelength $\lambda^L_R$ (40°, 20%) at which the spectral transmittance is 20% to a wavelength $\lambda^L_R$ (40°, 70%) at which the spectral transmittance is 70% in such a manner that the wavelength $\lambda^L_R$ (40°, 20%) is 370 nm or longer and is shorter than the wavelength $\lambda^L_R$ (40°, 70%);

(H) in the wavelength range of 350 to 450 nm, the spectral transmittance of light incident on the absorbing film at an incident angle of 40° monotonically increases in the range from a wavelength $\lambda^L_A$ (40°, 20%) at which the spectral transmittance is 20% to a wavelength $\lambda^L_A$ (40°, 50%) at which the spectral transmittance is 50% in such a manner that the wavelength $\lambda^L_A$ (40°, 20%) is 370 nm or longer and is shorter than the wavelength $\lambda^L_A$ (40°, 50%); and (I) in the wavelength range of 350 to 450 nm, the spectral transmittance of light incident on the absorbing film at an incident angle of 40° is 60% or less at a wavelength $\lambda^L_R$ (0°, 50%) at which the spectral transmittance of light perpendicularly incident on the near-infrared reflecting film is 50%.

5. The infrared-cut filter according to claim 4, wherein an absolute value $|\Delta\lambda^L$ (50%)$|$ of a difference between a wavelength which is in the wavelength range of 350 to 450 nm and at which spectral transmittance of light perpendicularly incident on the infrared-cut filter is 50% and a wavelength which is in the wavelength range of 350 to 450 nm and at which spectral transmittance of light incident on the infrared-cut filter at an incident angle of 40° is 10 nm or less.

6. The infrared-cut filter according to claim 1, wherein the near-infrared reflecting film has the following feature (J):

(J) the spectral transmittance of light incident on the near-infrared reflecting film at an incident angle of 40° has a spectrum which has a minimum differing by 10 points or more from a baseline in the wavelength range of 400 to 450 nm, in which a half-width for the minimum is 10 nm or more, and in which, when the half-width is defined as $\Delta\lambda_c$, a maximum exists in the range from (400−$\Delta\lambda_c$/2) to (450−$\Delta\lambda_c$/2) nm.

7. The infrared-cut filter according to claim 4, wherein assuming that the infrared-cut filter is used with a given imaging sensor and that a B/G ratio representing a spectral sensitivity ratio of the imaging sensor is 1 when determined by making light incident on the infrared-cut filter at an incident angle of 0°, the B/G ratio is 0.97 or more and 1.03 or less when determined by making light incident on the infrared-cut filter at an incident angle of 40°.

8. The infrared-cut filter according to claim 1, wherein spectral transmittance of light perpendicularly incident on the infrared-cut filter and spectral transmittance of light incident on the infrared-cut filter at an incident angle of 40° do not have a spectrum that overlaps bright-line spectra of illuminant TL84 which appear in the vicinity of 440 nm, in the vicinity of 550 nm, and in the vicinity of 610 nm, that has an extremum differing by 4 or more points from a baseline, and that has a half-width of 15 nm or more.

9. The infrared-cut filter according to claim 1, further comprising a transparent dielectric substrate, wherein the near-infrared reflecting film and the absorbing film lie parallel to a principal surface of the transparent dielectric substrate.

10. An imaging optical system comprising the infrared-cut filter according to claim 1.

* * * * *